(12) United States Patent
Fraccaroli

(10) Patent No.: US 10,880,716 B2
(45) Date of Patent: Dec. 29, 2020

(54) METHOD, SYSTEM, AND APPARATUS FOR PROVIDING CONTENT, FUNCTIONALITIES, AND SERVICES IN CONNECTION WITH THE RECEPTION OF AN ELECTROMAGNETIC SIGNAL

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 0 days.

(21) Appl. No.: 16/680,470

(22) Filed: Nov. 11, 2019

(65) Prior Publication Data

US 2020/0084605 A1 Mar. 12, 2020

Related U.S. Application Data

(63) Continuation-in-part of application No. 15/424,846, filed on Feb. 4, 2017, now Pat. No. 10,477,602.

(51) Int. Cl.
| | |
|---|---|
| *H04W 4/80* | (2018.01) |
| *H04W 8/18* | (2009.01) |
| *H04W 4/021* | (2018.01) |
| *G08C 17/02* | (2006.01) |
| *H04W 4/029* | (2018.01) |

(52) U.S. Cl.
CPC .............. *H04W 4/80* (2018.02); *G08C 17/02* (2013.01); *H04W 4/021* (2013.01); *H04W 4/029* (2018.02); *H04W 8/18* (2013.01); *G08C 2201/31* (2013.01); *G08C 2201/32* (2013.01)

(58) Field of Classification Search
CPC ....... H04W 4/02; H04W 76/14; H04W 4/021; H04W 4/029; H04W 4/80; H04W 8/18; H04W 64/003; H04W 4/21; H04W 4/08; G08C 17/02; G08C 2201/32; G08C 2201/31
See application file for complete search history.

(56) References Cited

U.S. PATENT DOCUMENTS

| | | | |
|---|---|---|---|
| 6,542,748 B2* | 4/2003 | Hendrey | H04W 76/40 455/456.1 |
| 6,542,749 B2* | 4/2003 | Tanaka | H04W 4/029 455/456.1 |

(Continued)

FOREIGN PATENT DOCUMENTS

WO 2015067982 A1 5/2015

OTHER PUBLICATIONS

Martin Woolley, Bluetooth Direction Finding, Revision Date: Mar. 20, 2019.

*Primary Examiner* — Diane D Mizrahi
(74) *Attorney, Agent, or Firm* — Federico Fraccaroli

(57) ABSTRACT

The present application generally relates to a method, system, and apparatus for providing content, functionalities, and services in connection with the reception of an EM signal from other apparatuses, emitting objects, access points or base stations. In certain implementations, content, functionalities, and services can be provided in connection with positioning data. In other implementations, content, functionalities, and services can be provided in connection with permanent or recurring location-based networking sessions and/or location data. In many other implementations, devices, content, functionalities, and services are autonomous and independent from any geographical area and/or session area and/or location data.

20 Claims, 21 Drawing Sheets

(56) References Cited

U.S. PATENT DOCUMENTS

| | | | |
|---|---|---|---|
| 6,542,750 B2* | 4/2003 | Hendrey | H04W 76/40 455/456.1 |
| 6,711,414 B1 | 3/2004 | Lightman | |
| 6,819,919 B1* | 11/2004 | Tanaka | G06Q 10/10 342/357.31 |
| 7,813,741 B2* | 10/2010 | Hendrey | H04L 67/18 455/456.1 |
| 8,223,088 B1 | 7/2012 | Gomez | |
| 8,660,679 B2 | 2/2014 | Kurabayashi | |
| 8,723,888 B2 | 5/2014 | Cudalbu | |
| 8,880,101 B2* | 11/2014 | Fraccaroli | H04W 4/021 455/404.2 |
| 8,886,222 B1 | 11/2014 | Rodriguez | |
| 9,002,400 B2 | 4/2015 | Kim | |
| 9,092,898 B1* | 7/2015 | Fraccaroli | G06T 19/006 |
| 9,264,874 B2* | 2/2016 | Fraccaroli | H04W 4/21 |
| 9,286,610 B2* | 3/2016 | Fraccaroli | G06Q 30/00 |
| 10,477,602 B2* | 11/2019 | Fraccaroli | H04W 76/14 |
| 2008/0186176 A1 | 8/2008 | Hardacker | |
| 2008/0280624 A1 | 11/2008 | Wrappe | |
| 2009/0144105 A1 | 6/2009 | Blatchley | |
| 2010/0302143 A1 | 12/2010 | Spivack | |
| 2011/0022196 A1 | 1/2011 | Linsky | |
| 2011/0161875 A1 | 6/2011 | Kankainen | |
| 2011/0173576 A1 | 7/2011 | Murphy | |
| 2011/0213664 A1 | 9/2011 | Osterhout | |
| 2011/0292076 A1 | 12/2011 | Wither | |
| 2012/0019557 A1 | 1/2012 | Aronsson | |
| 2012/0079018 A1 | 3/2012 | Rottler | |
| 2012/0082039 A1 | 4/2012 | Li | |
| 2012/0092369 A1 | 4/2012 | Kim | |
| 2013/0044130 A1 | 2/2013 | Geisner | |
| 2013/0088516 A1 | 4/2013 | Ota | |
| 2013/0147838 A1 | 6/2013 | Small | |
| 2013/0187834 A1 | 7/2013 | Nohara | |
| 2013/0194141 A1 | 8/2013 | Okajima | |
| 2013/0335301 A1 | 12/2013 | Wong | |
| 2014/0055488 A1 | 2/2014 | Masters | |
| 2014/0074874 A1* | 3/2014 | Fraccaroli | G06F 16/284 707/758 |
| 2014/0118631 A1 | 5/2014 | Cho | |
| 2014/0139551 A1 | 5/2014 | McCulloch | |
| 2014/0168056 A1 | 6/2014 | Swaminathan | |
| 2014/0168262 A1 | 6/2014 | Forutanpour | |
| 2014/0267419 A1 | 9/2014 | Ballard | |
| 2014/0285402 A1 | 9/2014 | Rahman | |
| 2014/0292653 A1 | 10/2014 | Kamba | |
| 2014/0320389 A1 | 10/2014 | Scavezze | |
| 2014/0368533 A1 | 12/2014 | Salter | |
| 2015/0065176 A1* | 3/2015 | Fraccaroli | H04W 4/021 455/456.3 |
| 2015/0094097 A1* | 4/2015 | Fraccaroli | H04W 4/021 455/456.3 |
| 2015/0116316 A1 | 4/2015 | Fitzgerald | |
| 2015/0181388 A1 | 6/2015 | Smith | |
| 2015/0199547 A1* | 7/2015 | Fraccaroli | G06Q 10/10 340/10.1 |
| 2016/0005233 A1* | 1/2016 | Fraccaroli | G02B 27/0172 345/633 |
| 2018/0227959 A1* | 8/2018 | Fraccaroli | H04W 76/14 |

* cited by examiner

METHOD, SYSTEM, AND APPARATUS FOR PROVIDING CONTENT, FUNCTIONALITIES, AND SERVICES IN CONNECTION WITH THE RECEPTION OF AN ELECTROMAGNETIC SIGNAL

TECHNICAL FIELD

The present application generally relates to a method, system, and apparatus for providing content, functionalities, and services in connection with the reception of an EM signal. In certain implementations, local content, functionalities, and services can be provided in connection with temporary location-based networking sessions. In other implementations, local content, functionalities, and services can be provided in connection with permanent or recurring location-based networking sessions and/or location data. In several other implementations, content, functionalities, and services are independent of any predefined geographical areas and/or session areas and/or location data.

BACKGROUND

The teachings of U.S. Pat. No. 9,092,898 titled "Method, System And Apparatus For The Augmentation Of Radio Emissions", U.S. Pat. No. 8,880,101 titled "Method and apparatus for managing attributes and functionalities of predetermined geographical areas", U.S. Pat. No. 9,264,874 titled "Method And Apparatus For Location Based Networking Sessions", U.S. Pat. No. 9,286,610 titled "Method and apparatus for a principal-agent based mobile commerce", all having the same inventor as the present patent application, are incorporated herein by reference in their entirety.

The teachings of Pat. App. U.S. 20160005233 A1 titled "Method, System, And Apparatus For Optimizing The Augmentation Of Radio Emissions", U.S. 20150065176 A1 titled "Method and Apparatus for Managing Attributes and Functionalities of areas Exhibiting Density of Users", Pat. App. U.S. 20150094097 A1 titled "Method, System, and Apparatus For Location-based Machine-assisted Interactions", Pat. App. U.S. 20150199547 A1 titled "Method, System, and Apparatus for Adapting the Functionalities of a Connected Object Associated with a User ID", Pat. App. U.S. 20140074874 A1 titled "Method, System, and Apparatus For Location-based Machine-Assisted Interactions" all having the same inventor as the present patent application, are incorporated herein by reference in their entirety.

The teachings of U.S. Pat. Nos. 6,819,919, 6,542,750, 7,813,741, 6,542,748, 6,539,232, 6,542,749, 8,150,439 and 6,549,768 are incorporated herein by reference in their entirety.

The teachings of "GroupUs: Smartphone Proximity Data and Human Interaction Type Mining" (Digital Object Identifier: 10.1109/ISWC. 2011.28) are incorporated herein by reference in their entirety.

Furthermore, where a definition or use of a term in a document, which is incorporated by reference, is inconsistent or contrary to the definition of that term provided herein, the definition of that term provided herein applies and the definition of that term in the reference does not apply.

A geofence is a virtual perimeter for a real-world geographic area. A geofence can be generated as in a radius around a point location such as a bar or a restaurant. A geofence can be a predefined set of boundaries connecting points expressed by latitude and longitude. Geofencing has been made possible especially by the introduction of GPS (Global Positioning System) technology and the miniaturization of electronic components that have made the locationing functionality a standard feature in Mobile Phones and portable electronics in general (User Equipment or UE). Geofencing can be implemented via many other localization techniques, both indoor and outdoor.

In this application the term 'geofencing' or "geofence" is not limited to virtual fences provided by storing one or more geographical locations and parameters that can be retrieved and then compared to actual locations obtained by using GPS positioning, but shall include all the possible techniques that may serve the purpose of defining a geographical area by using digital or electronic means, such as for example the radio horizon that defines the range of a radio carrier such as, e.g., 3G, 4G, WLAN, Bluetooth and RF-ID around a fixed or mobile point. Some of these techniques are discussed in detail in the patents and applications incorporated by reference, in particular, U.S. Pat. No. 9,264,874, U.S. 20150065176, U.S. 20150094097 and U.S. 20140074874.

Geofencing technology can trigger or inhibit functionalities of location-aware apparatuses. For example, as described in U.S. Pat. No. 7,813,741 titled "System and Method for Initiating Responses to Location-Based Events" a system may provide a response to one or more location-based services applications to provide location-based services, such as email, instant messaging, paging and the like.

A social network is a social structure made up of a set of actors (such as individuals or organizations) and the ties between these actors. One of the means by which these actors can communicate nowadays is the Internet and there are many websites providing a common platform where these actors can interact. A social network provides a way of analyzing the structures of social entities.

LinkedIn, for example, is a social networking website for people in professional occupations. It is mainly used for professional networking. LinkedIn is just one of the many different social networks. Many other social networks exist and they are targeting different facets of human desire for interaction. Some popular social networks are Badoo, Facebook, Foursquare, Friendster, Google+, Myspace, Habbo, Flixter, Flickr, Douban, Myheritage, Meetup, and Classmates.com. Some of these social networks have "group forming" capability among its members.

Augmented reality is the integration of digital information with the user's environment in real-time. Unlike virtual reality, which creates an artificial environment, augmented reality uses the existing environment and overlays new information on top of it. Today, Google glass, heads-up displays in car windshields and Microsoft Hololenses are perhaps the most well-known consumer AR products. This technology is used in many industries including healthcare, public safety, gas and oil, tourism and marketing.

Augmented reality apps are sometimes written in special 3D programs that allow the developer to tie animation or contextual digital information in the computer program to an augmented reality "marker" in the real world. When a computing device's AR app or browser plug-in receives digital information from a known marker, it begins to execute the marker's code and layer the corresponding image or images.

A radio direction finder (RDF) is a device for finding the direction, or bearing, to a radio source. The act of measuring the direction is known as radio direction finding or sometimes simply direction finding (DF). Using two or more measurements from different locations, the location of an unknown transmitter can be determined; alternately, using two or more measurements of known transmitters, the location of a vehicle can be determined. RDF is widely used as a radio navigation system, especially with boats and aircraft.

RDF systems can be used with any radio source, although the size of the receiver antennas is a function of the wavelength of the signal; very long wavelengths (low frequencies) require very large antennas and are generally used only on ground-based systems. These wavelengths are nevertheless very useful for marine navigation as they can travel very long distances and "over the horizon", which is valuable for ships when the line-of-sight may be only a few tens of miles. For aerial use, where the horizon may extend to hundreds of miles, higher frequencies can be used, allowing the use of much smaller antennas.

Direction-finding techniques related to wearable equipment is described in App. U.S. 20160005233 and patent U.S. Pat. No. 9,092,898 by the same inventor as the present application. They are incorporated by reference. The techniques described, in some implementations, use antennas having asymmetric patterns. The paper "Design of U-Shape Microstrip Patch Antenna for Bluetooth Application at 2.4 GHz" published on the International Journal of Innovation and Scientific Research, ISSN 2351-8014 Vol. 6 No. 1 Aug. 2014, at pp. 92-96 describes one of these antennas with asymmetric radiation pattern. It is herein incorporated by reference.

An indoor positioning system (IPS) is a system to locate objects or people inside a building using radio waves, magnetic fields, acoustic signals, or other sensory information collected by mobile devices. There are several commercial systems on the market, but there is no standard for an IPS system.

IPS systems nowadays use different technologies, including distance measurement to nearby anchor nodes (nodes with known positions, e.g., WiFi access points), magnetic positioning, dead reckoning. They either actively locate mobile devices and tags or provide ambient location or environmental context for devices to be sensed. The localized nature of an IPS has resulted in design fragmentation, with systems making use of various optical, radio, or even acoustic technologies.

System designs usually take into account that at least three independent measurements are needed to find a location (e.g. trilateration). To compensate for stochastic errors there is usually a method for reducing the error budget significantly. The system might include information from other systems to cope with physical ambiguity and to enable error compensation.

SUMMARY

Various aspects of examples of the invention are set out in the claims.

The patent application discloses a considerable number of possible embodiments and variations of techniques including direction finding applications and location-based-services functionalities. In certain implementations, the techniques can be implemented as standalone; in other implementations, they can be implemented in a synergic combination.

BRIEF DESCRIPTION OF THE DRAWINGS

For a more complete understanding of example embodiments of the present invention, reference is now made to the following descriptions taken in connection with the accompanying drawings in which:

FIG. 2 B represents a possible data string emitted by one or more antennas.

DETAILED DESCRIPTION OF THE DRAWINGS

Example embodiments of the present invention and its potential advantages are understood by referring to FIGS. 1 through 14 of the drawings.

User Equipment is abbreviated sometimes in the application with "UE".

Figure 1:
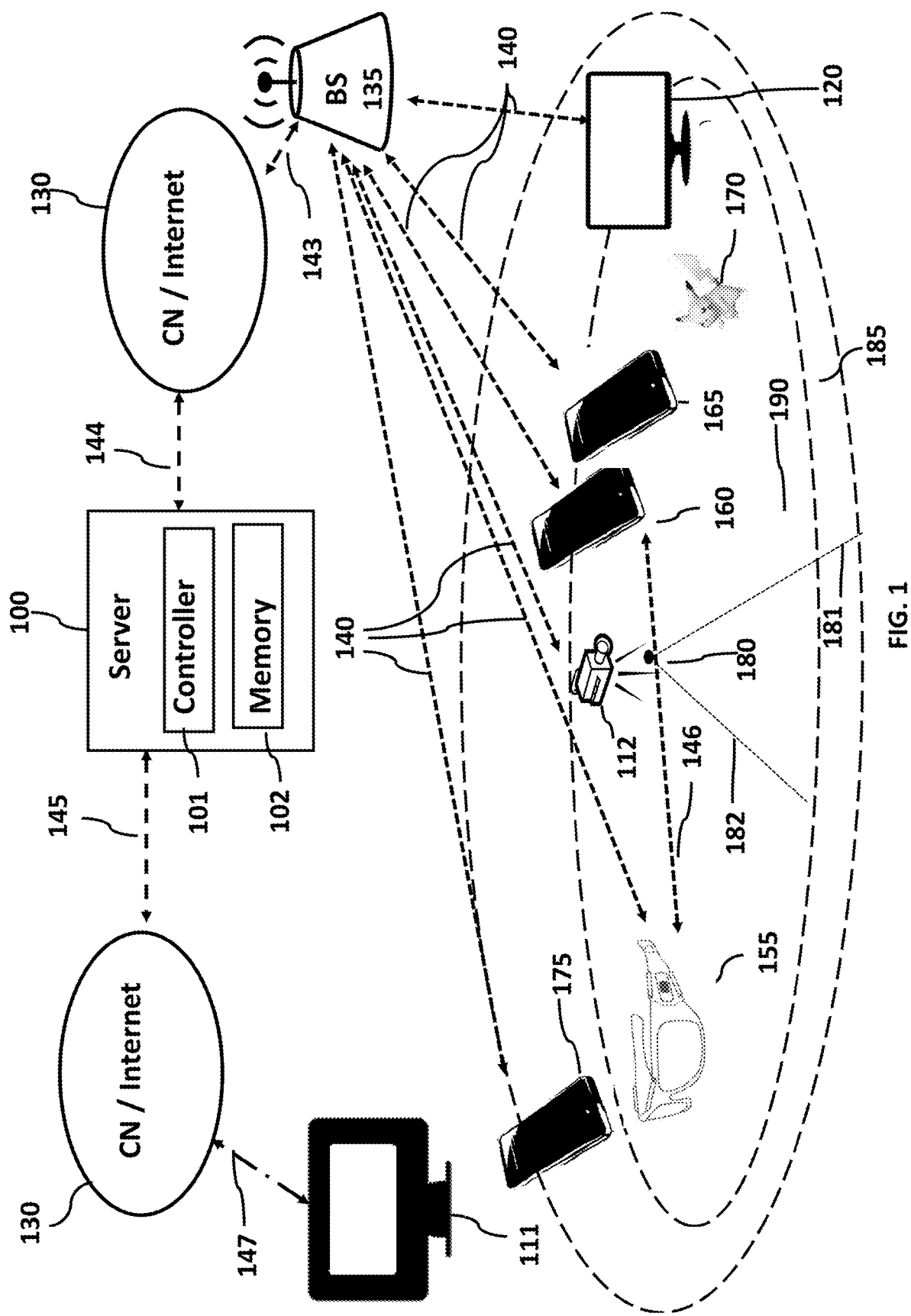
FIG. 1 represents a possible embodiment of one aspect of the invention in which one or more hardware equipment operates in connection with one or more locations and/or predefined areas.

FIG. 1 describes a possible embodiment of the invention. User Equipment 175, 155, 160, 165 can be a mobile phone, a PDA, a laptop, or a tablet or any other wireless mobile device and/or wearable augmented reality equipment such as, for example, User Equipment 155. In certain implementations, the augmented reality equipment, User Equipment 155, is capable of connecting with the Internet, directly via Radio Links 140. In other implementations, User Equipment 155 connects to proxy equipment.

User Equipment 155 can be connected e.g., with User Equipment 160 via Radio Link 146, e.g., a Bluetooth connection, and rely on it for its communications with Access Point/Base Station (AP/BS) 135 and ultimately with Server 100. In this implementation, the user of UE 155 and UE 160 can be the same. The user may wear the wearable glasses and put UE 160 in his pocket.

In other implementations, UE 155, 160, 165, 175 can perform functionalities that do not necessitate wireless connectivity and/or location awareness by UEs and/or Session Area 190 and/or Notification Area 185.

Location 180 is not to be limited or restricted to a central point or a point of symmetry in a symmetrical geometric figure such as the circles in FIG. 1 representing Session Area 190 and Notification Area 185. Both areas may have an asymmetrical shape as defined by geofencing or another method such as a radio horizon for an emitting station. Areas may be centered on a public place, an event place such as a convention or a large gathering of people sharing a common interest such as the Texas Bar Association Annual Meeting, a business place where a meeting may occur or a private address. Notification Area and/or Session Area, and/or Location 180 can be predefined or can be the result of some events such as a concentration of users in a certain location or area.

Session Area 190 can be in at least two different statuses: active status and passive status. When in an active status, mobile equipment positioned within the zone may be able to "log into" or "check-in" or "join" said location-based networking session. In some implementations, unless UEs is determined to be located within the boundaries of said active Session Area 190 the check-in shall, normally, be inhibited.

Notification Area 185 is a zone, usually surrounding Session Area 190 (or extending Session Area 190) in which user equipment can be notified of many different occurrences such as that a session area is nearby, is active, has been created, or is scheduled to turn active in the future. Said notification activity can be regulated according to time windows and statuses. As non-limiting examples, notifications may occur only during daytime (e.g., 08.00 AM-09.00 PM); or only if the session event zone is scheduled to become active within a predetermined time period, e.g., forty-eight hours; or only until a predetermined time window before the end of the active session marking an event, e.g., thirty minutes before the end of an active session.

Session Area 190 is represented in FIG. 1 as having a circular shape with Radius 182 and is centered on Location 180. Session Area 190 is an area where, in certain implementations, mobile equipment such as User Equipment 155, 160, and 165 can check-in (manually or automatically) and be part of a location-based group session event if the position of said User Equipment (UE) is determined to be within the boundaries of said Session Area 190 and if said Session Area 190 is set into an active status by the system. In other implementations, a session area centered on Location 180 may represent and be generated as a consequence of a concentration of users of a mobile application around Location 180.

An active status for a session area may imply the activation or availability of predetermined functionalities. Said functionalities may pertain to user equipment or server equipment or other equipment that is associated in any way to said session area.

Certain session areas may always be in an active status.

Certain session areas may have windows of active and passive statuses.

Certain session areas can be generated according to concentrations of users and their associated UE in a certain location when those users are sharing a common attribute.

Certain session areas can be used to enable certain functionalities and/or privileges for UEs and their associated users when they are positioned within a boundary of said session area. Moreover, session areas may correspond to places, public or private, that can be sponsored by an administrator and are used to attract users to those locations.

Certain session areas may be created by the system via an algorithm running on Server 100, once a certain concentration of users is detected by the system. Location 180 can be created automatically by the system, in one location according to various criteria. For example, Location 180 can be obtained via various methods by using the positions of User Equipment 155, 160, 165. Location 180 that can be associated with an active session area may remain anchored to a location according to various criteria. For example, in one implementation, if user Equipment 155, 160 and 165 are stationary for at least a period of time T and, e.g., are within a distance of, e.g., two times the length of Radius 182 from each other, a Location 180 may be established and calculated according to different methods.

One method to determine Location 180 could be by using the geographic midpoint, also called the center of gravity or center of mass or centroid. It is the average coordinate for a set of points on a spherical earth. In this case, the points on spherical earth are the locations of said User Equipments 155, 160, 165.

Another method can be the center of minimum distance, which is the point of absolute minimum travel distance. This method does not attempt to equalize the amount of distance traveled from the other points. This method finds the location that minimizes the combined travel distance from a set of points on an imaginary spherical earth.

Another method can be the average latitude/longitude, which is simply the mathematical average of the latitudes and longitudes of a set of points. This is equivalent to finding the midpoint on a flat rectangular projection map. When the distance between the points is less than 250 miles, this method gives a close approximation to the geographic midpoint.

The concentration of users' pieces of equipment, in one implementation, may create an active session area that can remain active or exist according to many different criteria.

For example, once a threshold users' density of users belonging to a predetermined group is reached the session area may remain active or exist only if said threshold density of users is maintained. The system may verify said condition periodically at intervals of time T. In some implementations, the threshold will be a minimum number of users within predetermined proximity from each other. In other implementations, the session area centered on the newly created Location 180 may remain active for a predetermined period. In certain implementations, Location 180 may simply mark a temporary concentration of users possessing a predetermined attribute.

In some implementations, Session Area 190 may be used irrespectively of active and passive status to perform certain background functions. The entering or associating within Session Area 190 by a user may serve the purpose of building up a statistical profile of the physical place that can be centered on Location 180, a bar or a restaurant, for example. Said statistical profile may serve the purpose of enabling searches or triggering notifications.

In certain implementations, once Location 180 has been calculated and positioned, e.g. via one of the methods described above, Location 180 can be relocated and made to correspond with a public place, a private place, or the closest location that is sponsored by the system, an administrator or a client. For example, a public place may pay a fee to have Location 180 correspond with its business address. In this case, once a certain density of users belonging to a predetermined group is determined to be located around said public place, those users that contribute to achieving the density threshold may receive an invite to congregate in a sponsored place. In some implementations, those users who do not contribute to the threshold density but are within Notification Area 185 and belong to said predetermined group might receive a notification that a Location 180 has been created that is associated with said concentration of users belonging to said predetermined group. In other implementations, if said concentration of users is determined to occur nearby a sponsored place, the system may report to users the concentration as if it actually occurred at the sponsored place.

In certain implementations, the calculation and creation of Location 180 may derive from a concentration of all users of a given mobile application above a certain threshold.

In other implementations, the calculation and creation of Location 180 may derive from a concentration of a predetermined group of users of a given mobile application above a certain threshold.

In other implementations, a notification of the availability of a predefined Location 180 (and/or an associated session area) may derive from a concentration of a predetermined group of users above a certain threshold within a predetermined distance from Location 180, e.g., within Notification Area 185. Location 180 can be, as discussed for certain implementations, a sponsored location.

The notifications can be different for a different subset of said predetermined group of users. Certain users who belong to the subset who contributes to achieving said threshold density may receive a notification of the availability of a sponsored place that is nearby. Users who are within a notification area that is calculated with reference to a sponsored place may receive a notification that users who belong to the subset who contributes to achieving said threshold density are or about to reach the sponsored place. The calculation and creation of Location 180 may derive from a concentration of a group of users of the present mobile application above a certain threshold, wherein said users share one or more common attributes. A concentration of users can be calculated, e.g., as a population density or number of pieces of equipment per unit area or unit volume.

Session Area 190 can be characterized by attributes and functionalities. Attributes pertain, e.g., to qualities of the area such as the density of a certain typology of users, e.g., users belonging to a particular group such as LinkedIn group "IP Lawyers". Attributes can be real-time attributes (a "snapshot attribute") or can be statistical attributes. As an example of a real-time attribute, if a law firm is currently having a party in said Session Area 190 a real-time attribute of said area can be the high density of lawyers belonging to said LinkedIn group of IP Lawyers. If a public place positioned in Location 180 becomes the happy hour place where said IP lawyers hang out around 4.00 P.M. every workday of the week, then Session Area 190 may statistically become the place where said group becomes prevalent (established) for said days and time window. This is an example of a statistical attribute.

Functionalities can be capabilities of a computer program or application running on UEs or Server 100 to provide a useful function, e.g., a notification trigger or other useful functionalities as will be discussed later in the application. Said functionalities can, in certain implementations, be associated with said Session Area 190 or said Notification Area 185. For example, User Equipment 175 at time T1 is located in Notification Area 185. Because of its position within Notification Area 185 at time T1 and because a certain trigger condition has been met and because User Equipment 175 may contain a software application logged on Memory 430, User Equipment 175 may receive a notification via Radio Link 140 established between User Equipment 175 and Access Point/Base Station (AP/BS) 135. Radio Links 140 represent generally links between a base station in a cellular network, (or an access point in a non-cellular network) and generic user equipment. Access Point/Base Station (AP/BS) 135 is a generic proxy for an internet connection gateway. Although throughout the present patent application said "Radio Link" nomenclature is used unvaryingly, the person skilled in the art will recognize that "Radio Link" can be associated with different kinds of digital signals and purposes for various user pieces of equipment.

In one implementation, said notification functionality may occur because at time T1 the presence of User Equipment 155, 160, 165, associated with users who belong, e.g., to LinkedIn group "IP Lawyers" within Session Area 190 raises an attribute of the area above a predetermined trigger condition. If the user of User Equipment 175 is associated with the same LinkedIn group, he may have an interest in being alerted whenever certain triggers are met and he is within a notification area associated with said session area. In other implementations, a user can create a group, for example a group of friends or a group of users who share a certain interest, for example, "parents of a third-grade class at a certain high school". The present application, with reference to FIG. 6, will discuss augmentation functionalities. Being part of one predetermined group of users or the association to one session area may affect the augmentation functionality in some implementations.

Many other examples are possible. The person skilled in the art will understand that these examples are not limiting. For example, a user can be interested in being notified about an attribute level pertaining to a group to which he does not belong to but that has some affinity with because of his professional or personal interests. For example, an IP lawyer can be interested in being alerted about the presence of an entrepreneur group who may be in need of his services. In another implementation, said notification can be independent of the Notification Zone 185 and an algorithm running, e.g., in Server 100 can send an SMS or an email or other notifications when a triggering condition pertaining to a session area's attribute occurs.

In another implementation, an attribute of the session area can be the presence of a particular user within Session Area 190 at a particular moment in time. Said user may have an interest in making his presence known when he checks-in into Session Area 190. Users can adjust their privacy settings. He can allow alerts to be delivered to other users or allow his presence to be unconcealed, even to users who are not within the boundaries of the session area. For example, an attorney can use a public place, e.g., a bar as his informal hangout place and an extension of his office space. He can do this to meet new prospective clients in informal settings. A prospective client, who may have an interest in meeting that particular attorney in an informal environment, may set up a trigger condition so that he will be alerted via an email, SMS or other means when said attorney checks-in into the session area. Prospective clients may also be alerted when they are passing through Notification Area 185 and a certain user is currently checked-in into Session Area 190. Alternatively, the user, e.g. an attorney, may set his privacy settings so that users, while browsing attributes for a session area, may be able to retrieve his personal details among the people who are currently checked-in.

For the sake of simplicity, Access Point/Base Station (AP/BS) 135 in FIG. 1 is serving both Session Area 190 and Notification Area 185. In addition, Radio Link 140 defines a generic radio link between user equipment, (e.g. 155, 160, 165 and 175) and Access Point/Base Station (AP/BS) 135. Clearly, said generic Radio Links 140 may convey different signals and serve different functions according to different scenarios.

Notification Area 185 can be an area of circular shape centered on Location 180 having a Radius 181. Many other shapes for the Notification Area 185 are possible. Notification Area 185 may not overlap with Session Area 190 but can be the area resulting from carving out Session Area 190 having Radius 182, a circle in this example, from the area having Radius 181, also a circle. The person skilled in the art will realize that many possible alternatives exist to circular shapes and the overlapping of areas.

A user in Session Area 190 might find desirable receiving an alert that Session Area 190 has switched into active status, e.g., when he is already in the session area. In addition, Notification Area 185 may or may not contain Location 180 that, in certain implementations, may represent a proxy for a fixed physical location where, for example, members of one or more predefined groups, such as the ones represented in FIG. 1 as carrying User Equipment 155, 160 and 165 can choose to interact, e.g., via a messaging functionality. Said location can be, e.g., a conference room in a company environment, a public place such as a bar or a private household hosting an event.

Notification Area 185, in one implementation, is an area enclosing and extending beyond Session Area 190. User equipment 175, while positioned within Notification Area 185, can be notified, for example, that a Session Area 190 exists, or that it is in proximity, or that it is in a certain status (for example that it is in an active status, or that it will switch to an active status in a period T1), or that it will remain in active status for a residual period T2 or that it will switch to a passive status at time T3.

While within Notification Area 185, a user of User Equipment 175 may also be able to browse the users who have already checked-in into Session Area 190. Said functionality can also be excluded e.g. if User Equipment 175 is outside of said Notification Zone 185 according to various settings. In some implementations, location-based group sessions can be restricted to members of one or more predetermined groups. These groups can be groups that have formed on social networks such as LinkedIn groups, Meetup groups or Facebook groups and did exist before the start of the location-based session event. In some implementations, the groups may just form for attending a particular session event.

In other implementations, some individuals may be given an ad hoc permission to join a specific event or groups associated with a session area.

A group can also be defined by those users who possess a particular passcode or password that may be necessary to check-in into a session area. For the purpose of this application, the word "group" shall have a general meaning. A group can be the whole body of users of a social network such as LinkedIn or Facebook, or a specific group within one of these social networks whether based on professional associations, social or cultural interests or degrees of separation within the social network. For example, a group can be the body of users who are either in a first or second-degree connection with a determined user. A group can be the collection of users of a mobile software application stored on Memory 430 who is logged in via a "Login" and a "Password" wherein said application enables the functionalities described in this patent application that pertain to the user equipment.

The scenarios pertaining to being logged in into an active session area can be numerous. As non limiting examples, the check-in within the session area or the association from outside the session area may permit the browsing of a list of other users who have checked-in into the location-based session event; it may permit the retrieving of profiles or at least portions of profiles associated with those users who have checked-in; it may also permit the exchanging of files and the sharing of common media being streamed; it may permit the possibility of requesting a face-to-face meeting with other checked-in users or the messaging during or even after the active status has ended according to predetermined settings. Said messaging capability may comprise both "one-to-one" messaging and a chat room type messaging capability.

In one implementation, users who have joined Session Area 190 may be able to contribute to a stream of a crowd generated digital media pertaining to Session Area 190.

The teachings of U.S. patent application Ser. No. 14/868,270, filed Sep. 28, 2015, titled "Method, System, and Apparatus for Providing a Mediated Sensory Experience to Users Positioned in a Shared Location" are incorporated by reference.

A Shared Ambiance Apparatus 120, e.g. as the one described in U.S. patent application Ser. No. 14/868,270, can be positioned within Session Area 190 and can provide audio and video output to users positioned within said session area. In certain implementations, Shared Ambiance Apparatus 120 may comprise a monitor that receives input from Server 100. In other implementations said Shared Ambiance Apparatus 120 might comprise any hardware capable of providing sensory input. Said User Equipment 160, 155, 165 and 175 (if authorized), may contribute content in the form of, e.g., pictures, videos, songs and commentary associated with Session Area 190. Said Session Area 190 and the content generated or contributed by users who have joined the session area can also be associated with a temporary event. Server 100 could collect contributions to the stream of media content generated or contributed during the event by User Equipment 160, 155, 165, and 175 and facilitate its displaying by said Shared Ambiance Apparatus 120.

The person skilled in the art will understand that many implementations are possible. In certain implementations, the user equipment that joined said Session Area 190 might receive the same stream of content that is played by said Shared Ambiance Apparatus 120. In another implementation, the stream could be personalized for each user equipment.

In certain implementations, the user equipment that joined Session Area 190 may receive a preview of the content that is scheduled or proposed to be delivered by Shared Ambiance Apparatus 120 and selections by users who have joined said session area might influence the stream delivered by said Shared Ambiance Apparatus 120. For example, indicia of a predetermined number of pictures, videos, songs, or comments that are about to be played (e.g., the next three songs or pictures or comments or videos in line and about to be played) can be voted upon by users who have joined Session Area 190 so that the stream of content is not only crowd-generated but also crowd mediated. For example, a user may select one of a predetermined number of options for an upcoming digital song or any sensory input.

In one implementation, not all users will have the same weight in determining the crowd-generated content. In certain implementations, certain users may enjoy a preferential status according to a hierarchy. In another implementation, an authority associated with an event or the session area, may have the means for screening or limit the crowd generated content that will be played by said Shared Ambiance Apparatus 120. For example, a user who has created an event or is an authority associated with said session area may have the capability to veto or delay or rate certain digital content causing said content or sensory output to be outputted according to a certain hierarchy.

In certain implementations, the streamed content that is generated and/or mediated can be delivered directly to user equipment, e.g., via Access Point/Base Station (AP/BS) 135.

In certain implementations, for professional networking or social networking purposes, Shared Ambiance Apparatus 120 may display professional profiles of users who decide to make portions of their professional or social profile visible by means of said Shared Ambiance Apparatus 120. In certain implementations, the profiles may be displayed according to different levels of prominence by said Shared Ambiance Apparatus 120 according to hierarchical criteria such as, for example, a degree of seniority within the mobile application, a level of "recharge" of the mobile application as will be discussed further in the application, a premium status of certain users and/or cumulative permanence within a session area.

One of the possible scenarios is, for example, a business lounge in an airport. In certain implementations, a user may decide to join a session area that comprises said business lounge. Said user may also activate a functionality associated with a mobile application, wherein his profile may become visible via said Shared Ambiance Apparatus 120 in said business lounge so that other professionals, who are in the same business lounge, may learn of the presence of said user, read a summary of his professional credentials via said Shared Ambiance Apparatus 120, and/or eventually approach him for a face to face encounter.

In one implementation, a log of all the users who did check-in automatically or manually into Session Area 190 (joined Session Area 190) can be stored on the user equipment or on Server 100 and can be retrieved by authorized users for future usage. Authorized users can be, e.g., other members of the groups who were part of the location-based group session but did not have a chance to interact with all the members who were associated with the session area during the time allocated to the event or during a time window. In another scenario, a user can be restricted to being able to retrieve the list of only those users who were checked-in at the same time when said user was checked-in. In another scenario, those lists can be available only to premium subscribers.

The person skilled in the art will recognize that many implementations are possible using the many different kinds of positioning technologies and radio carrier's standards that are available. For example, User Equipment, 155, 160, 165 and 175 may be able to communicate directly with each other and/or via Server 100 via, e.g., a 3G, 4G, 5G or WIMAX technology. These technologies are named cellular radio because of their capability to hand-over the radio link from cell to cell (base stations) when user equipment is moving. In this implementation, described in FIG. 1, digital information from and to User Equipment 155, 160 and 165 can be communicated via an Access Point/Base Station (AP/BS) 135 to Server 100 via Links 140 and Core Network/Internet Cloud 130.

Links 143, 145, 147 and 144 can be radio links or any physical means capable of transporting information, including cables. Communication between user equipment can occur via a core network infrastructure supporting any of the above-mentioned cellular standards but can also occur using non-cellular standards such as Wi-Fi and Bluetooth technology. For example, User equipment 160, 155, and 165 can use an ad-hoc Wi-Fi or Bluetooth connection to communicate directly without the support of a cellular network once a check-in, namely a reporting of a UE within the boundaries of a session area and/or its association to the session area, has occurred.

Server 100 may store a datagram in Memory 102 comprising a list of permanent, one-time only, or recurring session areas events. It may include a Controller 101 capable of comparing information (e.g. a location) received from or associated with mobile equipment such as User Equipment 175, User Equipment 155, User Equipment 160 or User Equipment 165 with at least some predefined parameters associated with an event. Said parameters and conditions, in one implementation, can be contained into a datagram on Server 100 into Memory 102. User equipment may query said Server 100 every time that data, parameters, and conditions need to be retrieved.

In another implementation, at least part of said datagram can be downloaded into user equipment and stored into Memory 431. For example, if the user equipment communicates its position to Server 100, said Server 100 may send the part of the datagram containing data, parameters, algorithms, and conditions related to events associated with the surroundings of said position to the requesting user equipment. In this case, an application and an algorithm stored into Memory 431 may generate alerts and notifications and permit check-ins and other functionalities eliminating the need for continuously pinging Server 100 for data.

Location parameters and conditions related to events, session areas, notification areas, and their functionalities and attributes could be stored on Memory 102 into a data structure, via Link 145 and Link 147 and Core Network/Internet Cloud 130 by an Administrator. Administrator Equipment 111 is depicted in FIG. 1 as fixed equipment such as a desktop computer. The person skilled in the art will recognize that Administrator Equipment 111 is not limited to desktop-type devices but can also be any mobile or wearable device capable of connecting to Server 100 via an Internet connection. Hardware equipment can be interchangeable as long as a software application can be stored, used and retrieved by a user while a login/password function is implemented. Administrator equipment can be used to provide an administrative functionality such as the creation of session area and related functionalities, e.g., the control of equipment such as Shared Ambiance Apparatus 120 or Audio/Video Input Apparatus 112.

In some implementations, session areas may not necessitate an event organizer. An administrator of the service, not depicted in FIG. 1, may designate locations, such as bars or restaurants, as permanent or recurring session areas and use embodiments of the present invention, e.g., as a tool to facilitate networking or other activities and/or functionalities in selected locations.

In certain implementations, Session Area 190 can be a sponsored place so that the joining of said area will bring some rewards and/or privileges or simply the capability of using some or all of the functionalities of a mobile application, e.g., for a certain period. For example, a mobile application associated with said sponsored place may need to be "recharged" with "energy" or level points. Said mobile application may be temporarily disabled or some of its functionalities can be inhibited or limited unless said user joins, at some point, a sponsored place (e.g., a sponsored session area) to "recharge" the mobile application. The joining may be constrained by the requirement of a UE to be within the boundaries of Session Area 190.

For example, after a predetermined period of usage, the mobile application may signal that the user needs to join one sponsored place for the application to continue to function at all or at its full capacity. If a user joins a sponsored session area, spends some time in a certain location, or purchases certain services or goods at said sponsored place (or anywhere else within the sponsored places or commercial activities in the network) the application may regain its partial or full functionality.

In another scenario, a number of "points" of a user of the mobile application or his or her "user-level" may provide a set of privileges or priorities. Sometimes a user-level may coincide with loyalty programs such as e.g., an American Airlines frequent flyer status. A user, according to levels, might have more weight in certain upcoming selections of digital media for Session Area 190. In other implementation, a user might benefit from enhanced visibility as in the example of the airport business lounge described above.

In another implementation, a user could be able to benefit from certain functionalities such as the functionalities offered by Audio/Video Input Apparatus 112 for the creation of digital content associated to Session Area 190 and/or Shared Ambiance Apparatus 120. A payment system, a subscription system, a point system, a loyalty system and/or a reward system may regulate hierarchically the usage of said apparatuses.

In certain implementations, a visual indication in the mobile application may signal to the user the time remaining for full functioning of said mobile application before said user is invited to join a sponsored place to regain a partial or full functionality of said mobile application.

In another implementation, the mobile application may simply display levels or points associated with said mobile application and/or its associated user. As discussed, said levels or points may be used, e.g., to create a hierarchy for functionalities or privileges or visibility when a plurality of users joins the same session area.

In different implementations, some functionality could be independent of a full-blown association with a session area for the scope of connecting users who are within its boundaries. Audio/Video Input Apparatus 112 could be centered on Location 180 where Location 180 is, for example, a famous touristic attraction such as the Coliseum in Rome or the balcony of Romeo and Juliet in Verona. Users of equipment such as UE 160 and UE 165, in the field of view of Audio/Video Input Apparatus 112 may use the apparatus to capture and/or share digital content in these well-known locations from a vantage point.

The system may provide users of UE 160 and UE 165 with indicia of the presence of one or more Audio/Video Input Apparatuses 112. UE 155, UE 160 and UE 165 may also receive guidance, via augmented reality-based indications or other, of a conspicuous spot within the field of view of Audio/Video Input Apparatus 112. In another implementation, physical markers on the floor may mark said conspicuous spot. In certain implementations, Augmented Reality Indicia 170 may appear in a video feed of Audio/Video Input Apparatus 112 so that, for example users of UE 160 and/or UE 165 may receive a video feed or a picture where Augmented Reality Indicia 170 appears, e.g., representing a gladiator or a Pokémon standing close to them when they are within the field of view of Audio/Video Input Apparatus 112. Said augmented reality can be static or dynamic, representing characters or symbols that are motionless or that do appear to move. In certain implementations, the video feed can be shared on social media. In other implementations, Audio/Video Input Apparatus 112 can produce pictures with or without augmented reality content.

In certain implementations, an algorithm may customize Augmented Reality Indicia 170. The customization may occur in many ways. Said algorithm may comprise image recognition functionality so that according to the image that is recognized within the field of view of Audio/Video Input Apparatus 112, Augmented Reality Indicia 170 is customized. Parameters such as gender, skin color, age, size, motion, number of users within field of view and any other data that are captured and recognized by said image recognition algorithm can be used as input for the customization of one or more Augmented Reality Indicia 170. For example, the algorithm may recognize a white skin female that is within the field of view of Audio/Video Input Apparatus 112. Said white skin female may also be receiving a video stream via UE 160. Augmented Reality Indicia 170 can be determined by the algorithm to represent a white skin Romeo character that is blended within the field of view of Audio/Video Input Apparatus 112 to position itself in a predetermined position in relation to said white skin female user.

In another implementation, the association of a UE (and a user) with Session Area 190 and/or Audio/Video Input Apparatus 112 may influence the augmentation functionality. For example, if a profile of a user, stored on Server 100, indicates that he or she is fond of a certain actor or in general, a celebrity, augmentation indicia of that celebrity can be automatically produced. Of course, this is a general concept that can be applied across many different augmentation classes.

In another implementation, an algorithm may size Augmented Reality Indicia 170 according to various parameters such as the dimensions of users within the field of view of Audio/Video Input Apparatus 112. In certain implementations, Augmented Reality Indicia 170 may be positioned by said algorithm in the foreground as compared to said white skin female that is within the field of view of Audio/Video Input Apparatus 112. In other implementations, Augmented Reality Indicia 170 may be positioned in the background as compared to live images. This may require, e.g., that the algorithm is able to recognize the edges of the image of said real-life white skin female and be capable of automatically cropping those portions of Augmented Reality Indicia 170 that are in common with the live image of said white skin female. This operation may convey the feeling that Augmented Reality Indicia 170 has actually blended into the live feed.

Users of UE that are associated with Audio/Video Input Apparatus 112 may be able to save and/or share on a social network, videos or pictures that can be blended with Augmented Reality Indicia 170. The commands for various functionalities can be provided by an ad-hoc mobile application that runs on a UE.

Said I/O of said mobile application can provide functionalities such as:

- initiating the capturing of videos or pictures;
- controlling the spatial orientation of Audio/Video Input Apparatus 112;
- controlling the zoom in or zoom out the field of view;
- selecting one or more Augmented Reality Indicia 170 among a predetermined selection to be blended with said videos or pictures; sometimes the available selection can be a premium selection or a paid selection;
- controlling, at least in part, one or more Augmented Reality Indicia 170;
- discovering one or more available Audio/Video Input Apparatus 112 that are nearby UE via location data;
- selecting and connecting to one or more available Audio/Video Input Apparatus 112;
- receiving augmented indications of markers in the field of view of Audio/Video Input Apparatus 112 for guidance to users on how to reach the best scenic spots within the field of view or within Session Area 190;
- receiving a video, and/or a picture and/or audio feed that is generated by Audio/Video Input Apparatus 112.

In one implementation, an administrator of the service may create, e.g., circular-shaped permanent sessions areas where Location 180 and/or the position of Audio/Video Input Apparatus 112 coincides with the geographical coordinates of public places in an aggregator's database. Radius 182 can be relatively small, e.g., one hundred yards or can be a radio horizon radius generated, e.g., by a Wi-Fi or iBeacon radio-emitting apparatus.

In one implementation, said Location 180 and Audio/Video Input Apparatus 112 overlap and Session Area 190 may coincide with the area of availability of one or more Audio/Video Input Apparatus 112 while Notification Area 185 coincides with an area where the availability of the service is made known.

In one implementation, a user, by means of user equipment, can instantly create an event (usually associated with a temporarily active session area) centered on the same location where he is positioned. In some implementations, if nobody, or a number that is below a predetermined threshold, joins or associates with said session area within a predetermined period, since its creation or since the starting of an event associated with said session area, the event may disappear.

In other implementations, the system may consider various levels of user's seniority (or points) to create a hierarchy of privileges in creating active session areas in or around the same place at the same time. For example, certain users may inhibit the creation of events in the same place or addressing the same audience, at the same time by virtue of their superior status as discussed above among the users of a mobile software application. The limiting and regulating of the number of session areas that are active at the same time in or around the same place can avoid congestion or overloading of information to similarly located users or users with similar profiles.

FIG. 1 represents just one of the many possible embodiments of one aspect of the present invention. In fact, Session Area 190 and Notification Area 185 could overlap or be far away from each other so that a plurality of different access points or base stations (AP/BS) could be needed to serve User Equipment 175, 165, 155 and 160 in the two different areas. Moreover, Session Area 190 and notification Area 185 could be defined not only by means of geofencing but also by many other different techniques. For example, the range of the radio communication link employed by Access Point/Base Station (AP/BS) 135 could be a way to define a circular area around an Access Point/Base Station (AP/BS) 135. If Access Point/Base Station (AP/BS) 135 was positioned in Location 180, Radius 182 can be the radio horizon of the physical carrier employed by Access Point/Base Station (AP/BS) 135. Said horizon could be defining Notification Area 185 or Session Area 190. The gradient of radio signal strength could be used for defining different and overlapping concentrically situated zones. Furthermore, the radio link employed by Access Point/Base Station (AP/BS) 135 could be of many different types, e.g. Wi-Fi, GSM, WCDMA, LTE, CDMA, RF-ID, and Bluetooth, just to cite a few non-limiting examples. A possible example concerns the usage of a Wi-Fi access point to define a session area. Memory 102 may store a datagram of network names (SSID) associated with various locations such as Wi-Fi SSID of public places such as bars or restaurants or lounges. When user equipment is in range of the Wi-Fi network and the SSID is recognized as an entry in the database, the system may then allow the checking-in into the active session area. Multiple techniques can be combined, for example, the above technique can be combined with a GPS check or a triangulation check from multiple base stations.

In some implementations, the location can be provided by iBeacon technology. An iBeacon represents a low-powered transmitter that utilizes Bluetooth low energy (BLE) proximity sensing. In a simplified form, an iBeacon transmitter performs the following functions: 1) communicate an ID code to a receiver apparatus and 2) provide means for said receiving apparatus to determine its distance from said iBeacon emitting source. An iBeacon transmits a "Here I am" type of signal from its current location. Such "Here I am" signals can be transmitted outwardly from the iBeacon as far as only a few centimeters to over 10 meters away. iBeacon signals are comprised of a Universally Unique Identifier (UUID), which can be used to distinguish what software application may "see" the iBeacon, as well as major and minor values. These major and minor values are placeholders for the developers to characterize—as they see fit—information about the iBeacons. In one commercial example, the major values may identify a product type or class and the minor values may identify a specific product individually. For example, in a retail setting, these different sets of identification codes may be used by the retailer to identify a plurality of iBeacons within a single retail store location (i.e. via the iBeacon's major values) or to identify a specific iBeacon within said retail location (i.e. via the iBeacon's minor values).

Figure 2:
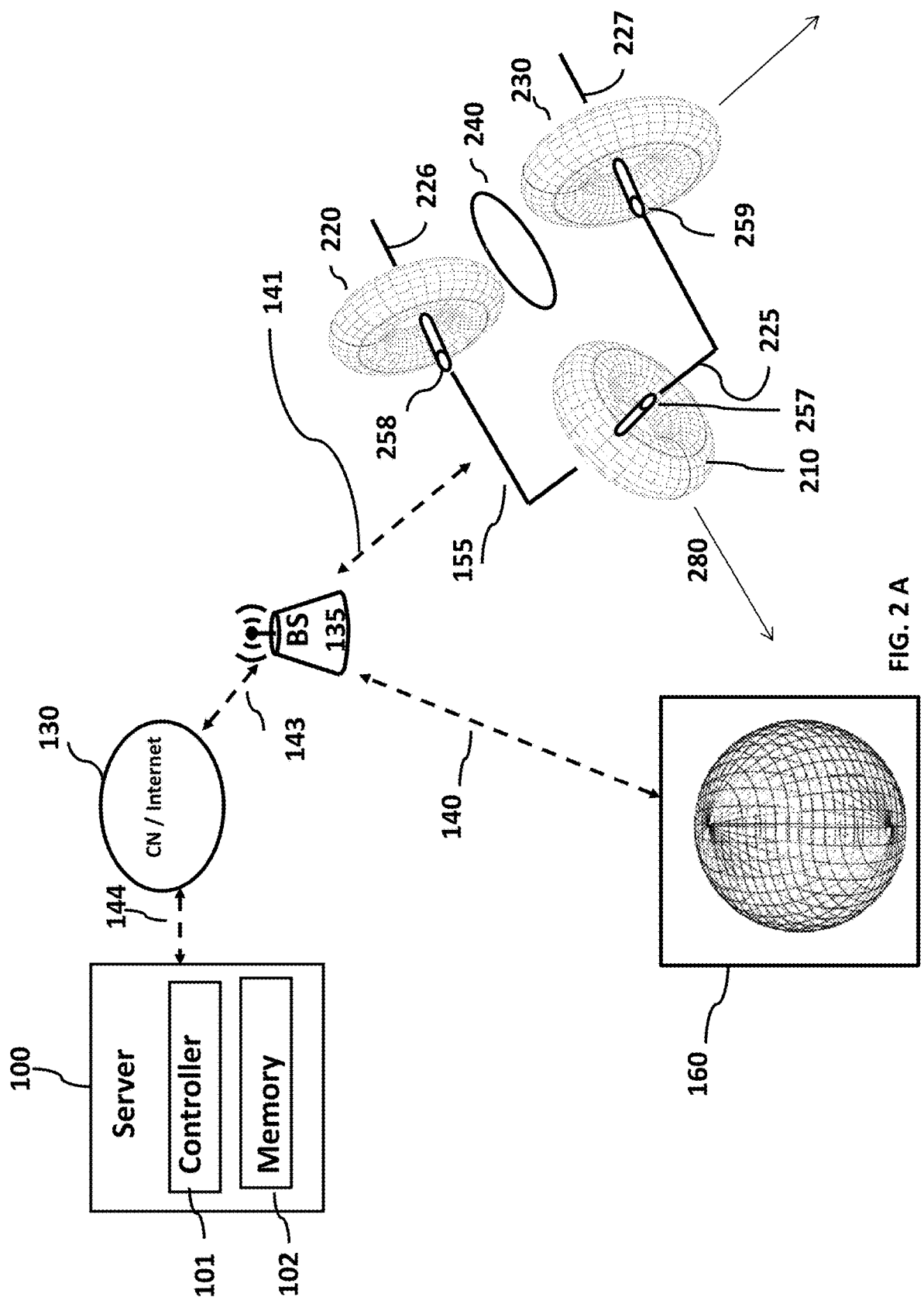
FIG. 2 A represents a possible embodiment of an aspect of the invention where a predetermined constellation of asymmetric antennas actively emits an EM signal.
Figure 2:
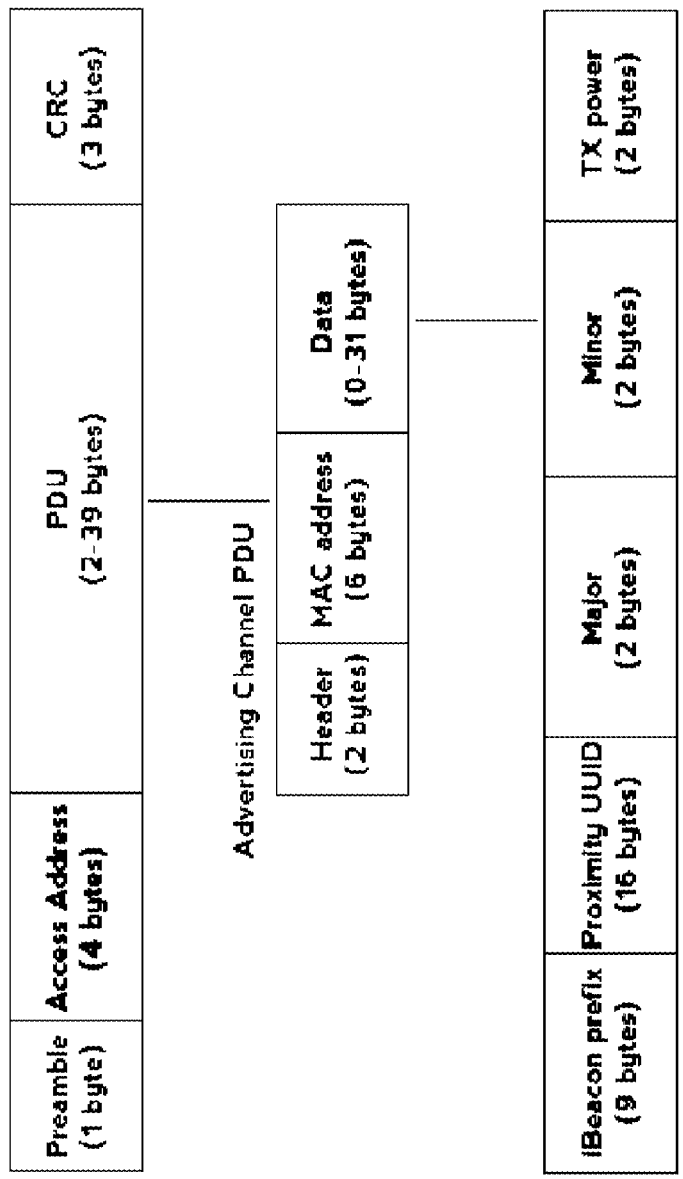

FIG. 2 A represents one of the possible embodiments of a novel functionality for a UE that is related to direction-finding capabilities and/or pairing capability. By "pairing", we mean the temporary or permanent associating of two or more hardware apparatuses so that the performance of certain functionalities involving that hardware is facilitated.

The person skilled in the art will understand that said functionality can be synergistically and advantageously integrated with a session area as will be discussed, e.g., with reference to FIG. 6. It can also be a standalone functionality that can be implemented independently from any session area, geofences, and/or the need for a position datum.

The teachings of U.S. Pat. No. 9,092,898 titled "Method, System, and Apparatus for the Augmentation of Radio Emissions" and the teachings of Pat. App. U.S. 20160005233 A1 titled "Method, System, And Apparatus for Optimizing the Augmentation of Radio Emissions" are incorporated by reference. These references describe a solution to determine when an augmented reality apparatus is keeping an emitting object within a field of view. The solution described in the abovementioned references relies on the comparison between the signals received by at least two or more antennas having asymmetrical radiation patterns such as dipole antennas. In certain implementations, User equipment such as User Equipment 155 or UE 160 may join a session area and gain access to data associated with emitting objects that are also associated with said session area using the solution described. In other implementations, User Equipment 155 may access information associated to emitting objects independently from the joining of any session area as described, e.g., in the teachings of U.S. Pat. No. 9,092,898.

In some implementations, it could be advantageous to be able to discriminate when an emitting object (a certain originating UE for example) is trying to deliver information that is addressed to another UE by aiming at said another UE. With reference to FIG. 2 A, the originating UE is User Equipment 155 and the addressee UE is User Equipment 160.

In this example, there is no constraint for UE to be augmented reality equipment, wearable equipment or head-mounted display equipment, as this solution can be applied also when the transmitting hardware is handheld equipment such as UE 165.

In a possible embodiment, two linear dipole antennas can be embedded within the frame of UE 165, for example, a hand-held smartphone where each antenna is capable of transmitting an electromagnetic (EM) signal.

In another embodiment that is represented in FIG. 2 A, at least two antennas can be mounted on eyewear. As discussed in U.S. Pat. No. 9,092,898, dipole antennas exhibit a gain pattern that is a toroid. Said toroid is symmetrical around said dipole antennas. As the person skilled in the art knows, the gain is highest at the right angles to the dipole, dropping off to a minimum value on the antenna's axis.

As shown in FIG. 2 A, Front Antenna 257 can be embedded in a front portion of UE 155, a Right Dipole Antenna 258 may be embedded within or integrated along a right side of UE 155, and a Left Dipole Antenna 259 can be embedded within or integrated along a left side UE 155.

All three antennas can be positioned along Axis 226, 227, and 225.

In this example, all three antennas exhibit radiation patterns shaped as toroids: Radiation Pattern 220, Radiation Pattern 230, and Radiation Pattern 210. The person skilled in the art will understand that antennas can exhibit a different radiation pattern without affecting the general inventive concept behind the invention as long as said radiation pattern exhibits at least some asymmetry on at least one plane. The perfectly toroidal pattern can be altered by using Radio Wave Absorber 240.

Electromagnetic absorbers are specifically chosen or designed materials that can inhibit the reflection or transmission of electromagnetic radiation. For example, this can be accomplished with materials such as dielectrics combined with metal plates spaced at prescribed intervals or wavelengths. The particular absorption frequencies, thickness, component arrangement and configuration of the materials also determine capabilities and uses.

Generally, there are two types of absorbers: resonant absorbers and broadband absorbers. The resonant absorbers are frequency-dependent because of the desired resonance of the material at a particular wavelength. Different types of resonant absorbers are the Salisbury screen, the Jaumann absorber, the Dallenbach layer, crossed grating absorbers, and circuit analog (CA) absorbers. Broadband absorbers are independent of a particular frequency and can, therefore, be effective across a broad spectrum.

In some implementations, antennas of UE 155, namely Front Antenna 257, Right Dipole Antenna 258, Left Dipole Antenna 259, can transmit contemporaneously or according to a predetermined schedule, one or more EM signals that are received by UE 160. In a first implementation, UE 160 may incorporate an omnidirectional receiving and/or transmitting antenna. The person skilled in the art will understand that this is a simplification and that the invention can function by means of one or more antennas that are not omnidirectional.

A person skilled in the art will understand that if a user is pointing Right Dipole Antenna 258 and Left Dipole Antenna 259 toward UE 160, because the gain of those dipoles will be at a minimum along Axis 226 and Axis 227, the signal received from Right Dipole Antenna 258 and Left Dipole Antenna 259 by UE 160 will be minimum. Conversely, since the gain of Front Dipole Antenna, 257 will be at a maximum since Axis 225 is perpendicular to an imaginary line connecting UE 155 with UE 160, the signal received by the omnidirectional antenna in UE 160 from Front Dipole Antenna 257 will be at its maximum.

The person skilled in the art will understand that a comparison of the sequence of signals received from the antennas of UE 155 by UE 160 at a moment in time will indicate if UE 155 is aiming at UE 160 and may indicate that a predetermined message or command is intended for UE 160. In certain implementations, the signal emitted by the antennas is emitted according to a time-division multiplexing scheme. For example, an iBeacon signal can be emitted during adjacent periods in a round-robin fashion by two, three or more antennas in UE 155.

For example, first Right Dipole Antenna 258 may send an iBeacon data string. Sequentially, Front Antenna 257 may send the same or a related iBeacon string. Then again, sequentially Left Dipole Antenna 259 may send the same or a related iBeacon string. A comparison of the RSSI strength of those strings, as sequentially received by one or more antennas at UE 160, will indicate if UE 155 is aiming at UE 160 and if the message or command from UE 155 is ultimately directed to UE 160.

In certain implementations, the sequence of RSSI values received by UE 160 may give indications of the angle that Antenna 258 is forming with Axis 280.

In one implementation, a "relationship" between consecutive strings of data transmitted may consist of some mathematical relationship between those data so to be able to check the integrity of the data received. The literature is ripe with telecommunication techniques to check the integrity of data. Some of these techniques are described in the book "Industrial Communication Technology Handbook, Second Edition" ISBN-13: 978-1482207323. By knowing the sequence of the transmitting antennas, it is also possible to resolve the 180 degrees ambiguity that is created when the antennas of UE 155 transmit in sequence. For example, it is possible to standardize the system so that the first transmitting antenna is always, for example, Antenna 258 and then, e.g., in turn 280 and 259. It is also possible to make sure that Antenna 258 is positioned to the right side of UE by means of sensors or by design of the user equipment.

In certain implementations, an iBeacon signal transmitted by the three antennas, and described in FIG. 2 B, is the same. In other implementations, it can be different and can carry an identifier indicating which of the three antennas is transmitting which data string.

In some implementations, the frequency of transmission of the strings by the three antennas is the same. In other implementations, the frequency can be different.

In some implementations, the emission of the data string by the Front Dipole Antenna 257 may deliver a payload code that will cause the downloading and reception of information that is intended for UE 160 from UE 155.

In another implementation, the payload information is delivered directly via Front Dipole Antenna 257 to UE 160 and download of content from Server 100 may not be necessary.

The downloading by UE 160 may occur via Access Point/Base Station (AP/BS) 135, Data Link 140 and 143, 144 Core Network/Internet Cloud 130 from Server 100.

The person skilled in the art will understand that, especially by reading what has been labeled as material incorporated by reference, there are many ways to ensure that UE 160 can determine when UE 155 is aimed at UE 160 and desires to establish a communication and/or make its presence known to UE 160 and/or act as a reference point for UE 160 and/or pair itself to UE 160.

One of the many possible scenarios could be the following.

User of UE 155 wants to deliver a message or a command to UE 160. UE 155 stores, at least temporarily, said message or command on Memory 102 via Access Point/Base Station (AP/BS) 135. In certain implementations, the message or command can be pre-stored, at least in part, on said Memory 102 and UE 160 may only receive an indication or command to retrieve it.

UE 155 is aimed at UE 160 and a plurality of messages, sometimes in the format represented in FIG. 2 B and sometimes in other formats, is transmitted by the three antennas: Right Dipole Antenna 258, Left Dipole Antenna 258, and Front Dipole Antenna 258.

The message sent by the three antennas can be the same for each antenna in different intervals. The message can also be different for each antenna. The message can be divided into blocks and each antenna can send a different and partial block that is part of the whole message. A comparison of the messages that are received by UE 160 will allow a determination about the fact that UE 155 is aimed at UE 160 and some content or command is available for retrieval. In certain implementations, there is no need for three antennas. For example, two antennas with an asymmetric radiation pattern on at least one plane that are positioned according to a constellation of antennas, exhibiting both a minimum and a maximum in their radiation patterns in a predefined direction, may allow a determination that the message or command is addressed to UE 160 from UE 155.

The content or command can be stored on a memory in UE 160 or can be retrieved, at least partially, from Memory 102 of Server 100.

The person skilled in the art will understand that Bluetooth Low Energy (BLE) is just one of many possible standards that can be used to implement the general principles described in this application. BLE can work in two modes of communication: Advertising (one-way discovery) and Connecting (two-way communication).

In certain implementations, iBeacons can run in advertising mode. This means they periodically send packets of data that can be received by other devices like smartphones or tablets. iBeacons behave like a beacon that is only sending a "Here I am!" signal and are not listening. This message can be transmitted in intervals from 20 ms to 10 seconds and the longer the interval, the longer the battery life. The transmission of packets in advertising mode can be activated manually.

According to the iBeacon standard, the message size can be up to 47 bytes.

FIG. 2 B shows a diagram of this message broken down into blocks.

BLE packet in advertising mode consists of: Preamble (1 byte); Access Address (4 bytes); PDU Header (2 bytes); PDU MAC address (6 bytes); PDU Data (0-31 bytes); iBeacon prefix (9 bytes); Proximity UUID (16 bytes); Major (2 bytes); Minor (2 bytes); TX power (2 bytes); CRC (3 bytes).

The PDU block contains the Data:
iBeacon prefix are 9 fixed bytes indicating that this BLE device is actually an iBeacon device;
Proximity UUID (2nd line)—is an identifier that distinguishes your iBeacons from the others. In some implementations, a mobile app software is then set up to listen just to this proximity UUID.
Major (3rd line)—is used to group a related set of iBeacons.
Minor (4th line)—is used to identify individual iBeacon.
TX power—actual TX power can be calculated as a 2's complement: 0xc5=197=>256-197=−59 dBm. TX power is the strength of the signal measured at 1 meter from the iBeacon. This number is then used to determine how close UE 160 is from UE 155 that is emitting the iBeacon signal. The calculation is based on the fact that UE 160 will know both TX power (RSSI at a distance of 1 meter from the iBeacon which is part of the message) and current RSSI (Received Signal Strength Indication that is measured).

As discussed, in an exemplary implementation, the message that the antennas transmit is sequential and the three iBeacon transmissions are synchronized. For example, the sequence could be 1) left antenna, 2) front antenna and finally 3) right antenna. The three antennas can be marked and identified in the messages' blocks, e.g., in the Major and Minor Fields of the iBeacon message they transmit as left, right, and front antennas.

In another implementation, three iBeacon messages will not be synched and a collision may at times occur depending on the frequency of retransmission of the iBeacon message by each antenna. The person skilled in the art will understand that in one implementation, three different iBeacon emitters, each one using a different antenna of the constellation of UE 155, can be used to transmit. In another implementation, the iBeacon transmitter will be unique and the messages could be transmitted in a round-robin fashion by the three antennas.

A possible scenario could be that user of UE 155, e.g., augmented reality glasses hardware, wearable hardware, or a smartphone hardware wants to communicate with user of UE 160. User of UE 155 aims his hardware towards the target hardware and enables the transmission of the antennas. An algorithm running on UE 160 will decide, by comparing the reception of the messages received by antennas in UE 155 if the content or the command is addressed to UE 160. UE 160 may retrieve the content or command from local memory in UE 160 or from Memory 102.

In certain implementations, the triggering of the transmission by antennas in UE 155 may derive from UE 155 being steady for at least a predetermined period as determined by a compass or a gyroscope. The scenario could be, e.g., UE 155 is augmented reality glasses hardware while antennas may act as passive and/or active elements. The stillness of the glasses (deriving from a user staring a predefined object) can trigger the transmission in some implementations. So for example, in one implementation, if UE 155 wants to deliver a message or command to UE 160 via Front Dipole Antenna 257, a user of UE 155 will aim at least Right Dipole Antenna 258 toward UE 160. The transmission of at least two antennas of UE 155 can be activated by a condition such as a predetermined period in which UE 155 is immobile as determined by, e.g., a gyroscope and/or a compass. In one implementation, once the payload has been delivered and/or visualized by UE 160, UE 155 can retrieve a delivery-confirmation message via, e.g., Radio Link 141.

In one implementation that will be discussed also with reference to drones in FIG. 8, UE 155 may act as a reference point for flying objects such as drones. In one implementation, UE 160 is a flying object and it will receive radio emissions from the three antennas of UE 155. The drone (in this case UE 160) by receiving zero or nearly zero signal (and associated messages) from Right Dipole Antenna 258 and Left Dipole Antenna 259, while receiving a stronger signal from Front Dipole Antenna 257 will determine that it is positioned on Axis 280 and that most likely the information is intended for it.

As discussed, the iBeacons protocol provides a way for UE 160 to determine and maintain a predetermined distance from UE 155. TX power is the strength of the signal measured at 1 meter from the iBeacon. This number is then used to determine how close UE 160 is from UE 155 that is emitting the iBeacon signal. The calculation is enabled by UE 160 knowing both TX power (RSSI at distance of 1 meter from the iBeacon, which is part of the message) and current RSSI (Received Signal Strength Indication that is measured). In another implementation, if UE 160 is a flying drone a barometer module on UE 160 can be used to set and maintain a predetermined altitude.

With the help of radio wave absorbers such as Radio Wave Absorber 240, Radiation Pattern 220 and Radiation Pattern 230 can be altered and made asymmetric, both, on a vertical and a horizontal plane. The tilting of UE 155 both, to the left or to the right, and up and down as compared to Axis 280, can be translated by UE 160 (a flying drone) into spatial moving commands that will minimize the reception of signals associated to Right Dipole Antenna 258 and Left Dipole Antenna 259.

Figure 3:
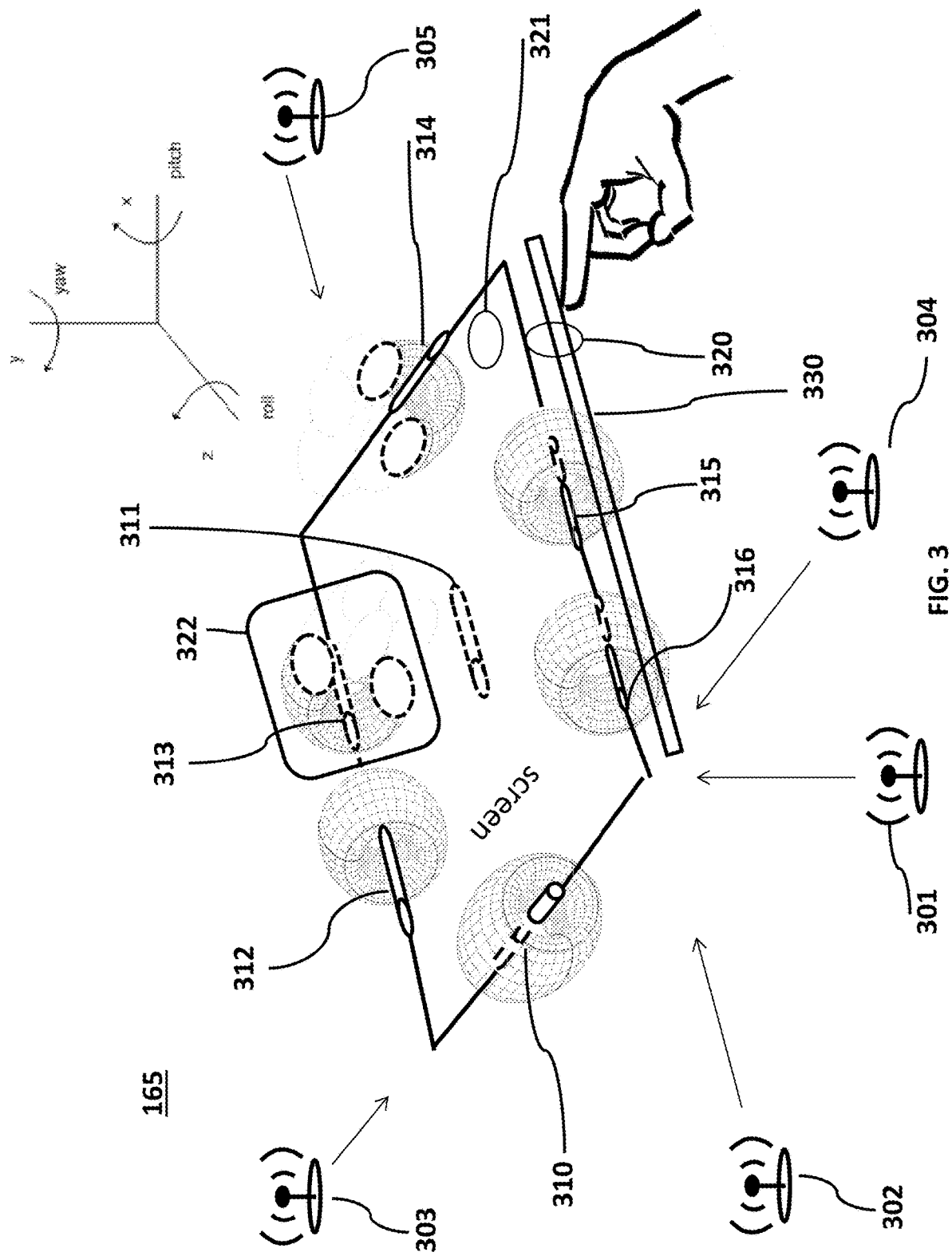
FIG. 3 is a non-limiting example of handheld user equipment that is using embodiments of a direction-based technique based on a plurality of antennas. Some of the same concepts explained with reference to this figure can be reapplied to wearable equipment.

FIG. 3 may represent an antenna and modules configuration that is embedded into a smartphone such as UE 165. In another implementation, FIG. 3 represents an antenna configuration that is embedded into a phone or tablet smart protective cover and extends the functionalities of those apparatuses. In certain implementations said smart protective cover for, e.g. UE 165, may connect to UE 165 via a USB port.

As discussed with reference to U.S. Pat. No. 9,092,898 that is incorporated by reference in its entirety, antennas that exhibit asymmetric radiation patterns can be used to determine the direction of arrival of electromagnetic (EM) waves emitted by emitting objects such as, e.g., phones, tablets, iBeacons, RF-ID (active, passive, or semi active modules) and wearable equipment. In the example of FIG. 3 the antennas are dipoles, that can be dimensioned, e.g., as ¼ of the wavelength of a Bluetooth signal that is about 2.45 gigahertz.

The person skilled in the art will understand that other antenna lengths are possible that are multiple of ¼ of the wavelength. Antennas can be positioned around the frame of a smartphone in a way to obtain the reception of the same EM wave at different strengths, angles and time according to the orientation of the antennas as compared to the direction of arrival of the EM wave. Front Antenna 310 will receive maximum signal from an Emitting Object 302, while Antennas 312, 313, 316, 315, 311 will receive minimum signal. In certain implementations, radio wave absorbers such as Radio Wave Absorber 322 can be used to produce asymmetry in the radiation patterns of the antennas so that the comparisons between EM signals as received at different antennas can be used to determine a direction of arrival of a signal as emitted by Emitting Objects 302, 301, 303, 304, 305. In FIG. 3, antenna 314 exhibits a radiation pattern oriented toward negative Y. Said radiation pattern can be obtained by means of EM radiation absorbers and/or other techniques.

In some implementations, the usage of radio wave absorbers such as Radio Wave Absorber 322 on one or two antennas that are positioned on the same axis such as Antenna 312 and Antenna 313 allows distinguishing the direction of arrival of Emitting Object 304 from the direction of arrival of Emitting Object 303. In one implementation, the comparison between the same EM signal as received at Antennas 312, 313, 316, 315 can resolve the ambiguity. The same concept can be applied to distinguish a signal arriving from Emitting Object 302 from direction of arrival of Emitting Object 305.

In certain implementations, an ambiguity front-back or left-right can be resolved by analyzing the derivative function of the signal as received at different antennas. For example, if the rotation of UE 165 to the left around Y-axis results in an increase of a received signal at Antenna 313 that is the same as compared to the increase of a signal received at Antenna 312 it means that the signal is coming from Emitting Object 302. If the same rotation results in a signal in Antenna 313 that is less strong as compared to a signal as received for example at Antenna 315, it means that the signal is originating from Emitting object 305. This technique may necessitate sing a gyroscope and/or a compass in UE 165 and calculating the derivatives of the received signals at different antennas when movements in space of UE 165 occur.

In certain implementations, Antenna 311 can be a u-shape microstrip patch antenna such as the one described in the International Journal of Innovation and Scientific Research, ISSN 2351-8014 Vol. 6 No. 1 Aug. 2014, pp. 92-96, © 2014 Innovative Space of Scientific Research Journals article that is incorporated by reference in its entirety.

In another implementation, Antenna 311 is a Yagi antenna that can be embedded into UE 165 or embedded into a smart protective case for UE 165. A Yagi-Uda antenna, commonly known as a Yagi antenna, is a directional antenna consisting of multiple parallel elements in a line, usually half-wave dipoles made of metal rods. Yagi-Uda antennas consist of a single driven element connected to the transmitter or receiver with a transmission line, and additional parasitic elements: a so-called reflector and one or more directors. It was invented in 1926 by Shintaro Uda of Tohoku Imperial University, Japan.

This design achieves a very substantial increase in the antenna's directionality and gain compared to a simple dipole. Also called a "beam antenna", the Yagi is used as a high-gain antenna. It has gain that depends on the number of elements used, typically about 20 dBi, linear polarization, unidirectional (end-fire) beam pattern with high front-to-back ratio of up to 20 dB. Directional antennas can be used, alone or in combination with absorbers, derivative calculation modules, and/or gyroscopes to determine the direction of arrival of an EM signal.

In certain implementations, when UE 165 is, e.g., a smartphone or tablet, the touching of a hand or other body parts may affect performances of the antennas both when receiving and/or transmitting. A touch sensor, such as Touch Sensor 330, may detect the position of body parts that are affecting the radiation performance of antennas that are used to detect the direction of arrival of EM radiation by UE or are used actively according to various techniques described, e.g., with reference to FIG. 2 A. A software module in UE 165 may detect the position of a user's body parts and/or how a user's body part that is touching UE 165, for example in Spot 320, is affecting, for example, Antenna 315. A software module that is running on UE 165 may produce visual indications on where to position fingers or other body parts in order to minimize their interference with functionalities associated with UE 165 and its antennas. UE 165 may also produce indications that a body part is interfering with some functionality.

In another implementation, UE 165 and/or hardware that is associated with UE 165, may operate a software module that weights and balances indications or functionalities associated with different antennas. For example, if Touch Sensor 330 detects the presence of a finger in Spot 320 a software module may exclude Antenna 315 from functionalities associated with direction-finding. In another implementation with the same scenario, a software module may exclude Antenna 315 from transmitting EM signals for facilitating functionalities discussed with reference to FIG. 2 and activate instead Antenna 316. A software module running on UE 165 may rebalance loads and indications associated with antennas when there is redundancy of antennas that can be used to perform similar functionalities. In another implementation, when there is no redundancy said software module may provide an indication that functionalities associated with antennas are not accurate. In another implementation, indications or functionalities associated with antennas may be inhibited until, for example user of UE 165 does not comply with indications by said software module such as, e.g., putting a finger in Spot 321 rather than elsewhere.

The person skilled in the art will understand that many of the concepts that have been described with reference to U.S. Pat. No. 9,092,898 and Pat. App. 20160005233 and are incorporated by reference can be reapplied to a handheld device that can be used to receive and transmit directional indications, directional messages, and/or directional commands.

In certain implementations, functionalities, commands, indications, and messages associated with hardware as described in this patent application can be restricted and/or associated with session areas as described with reference to FIG. 1 and the various patents that have been incorporated by reference. For example, indications associated with Emitting Object 302 can be inhibited unless UE 165 and/or Emitting Object 302 is determined to be located within the boundaries of a session area and have registered at Server 100.

Figure 4:
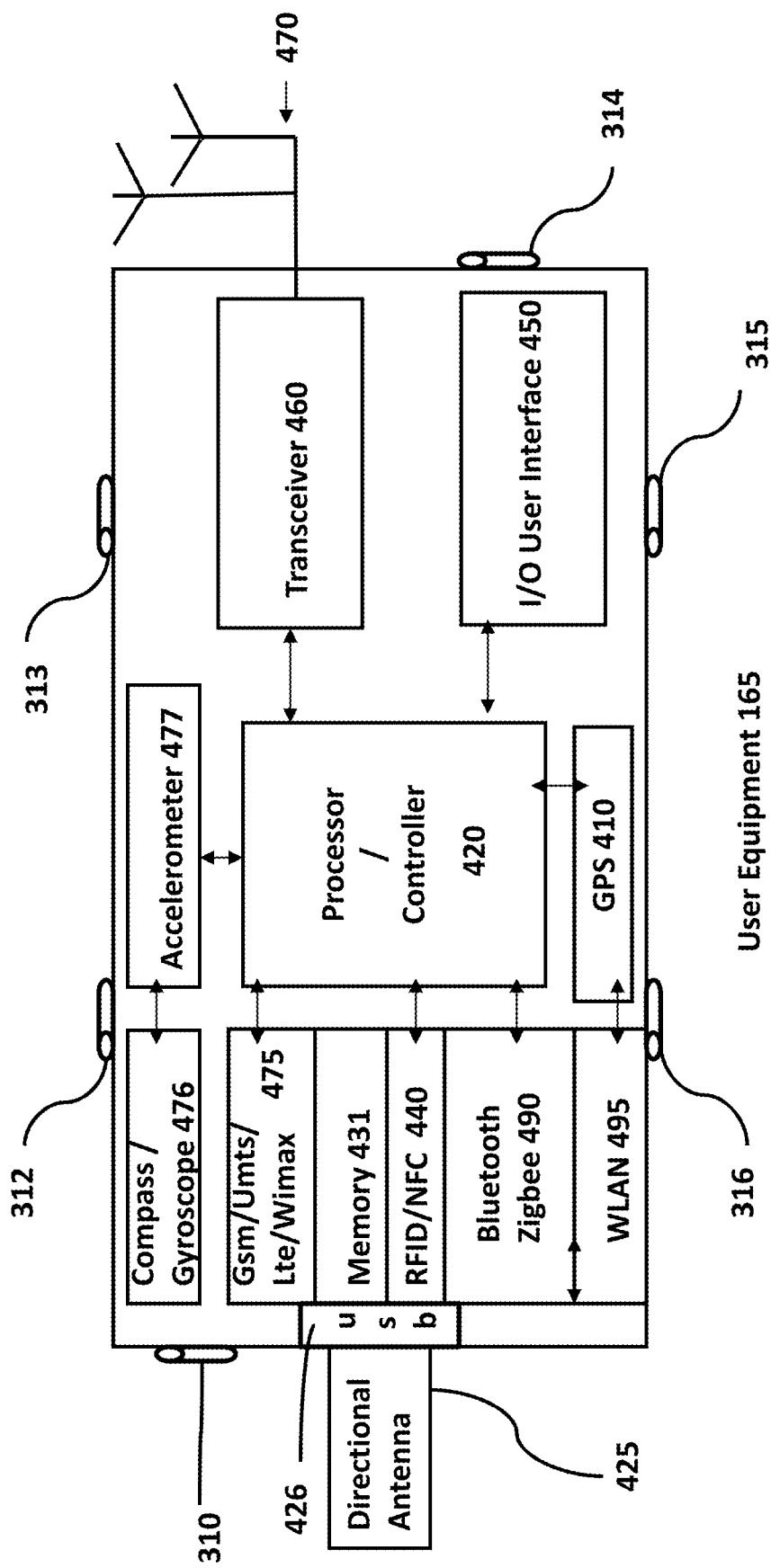
FIG. 4 represents a schematic representation of an embodiment of user equipment such as User Equipment 160, 165, 175 or 155. It may also represent, in some implementations, a schematic representation of administrator equipment since I/O user Interface 450 can provide the functionalities that will be discussed with reference to certain embodiments. Not all the modules are needed to implement some of the embodiments described in the application.

FIG. 4 provides a schematic example of a User Equipment 165 apparatus in accordance with one embodiment of the present invention. In this implementation, UE 165 represents a handheld device. Many of the modules and functionalities can be replicated in a wearable equipment apparatus.

The person skilled in the art will recognize that by virtue of a possible log in mechanism, users may employ an assortment of equipment as long as said equipment is running a software application contained in a memory such as, e.g., Memory 431 and enabling at least some of the functionalities described in this application. In practice, using a login and a password to access and run a software application stored on user equipment makes said user equipment interchangeable.

User Equipment 165 is a general example of a mobile device that users can operate. It could be a traditional mobile phone, a personal digital assistant, a laptop computer, an e-book reader, an entertainment console or controller, wearable hardware such as augmented reality headsets, a tablet computer or any other equivalent portable device that may be used to communicate, receive and transmit indications, receive and transmit commands from and to other mobile equipment or with Server 100. User Equipment 165 includes at least one Processor/Controller 420 and at least a Memory 431 comprising computer program instructions. The at least one Processor 420/Controller can be embodied by any computational or data processing device, such as a central processing unit (CPU) or application-specific integrated circuit (ASIC). The at least one Processor/Controller 420 can be implemented as one or a plurality of controllers.

Memory 431 may contain application software running on User Equipment 165. Memory 431 may also contain at least portions of a data structure containing details and parameters of events that are most relevant to the location, time and user ID profile associated with said User Equipment 165 so that the continuous pinging of Server 100 for the downloading of data or output of algorithms will not be necessary to ensure a reliable and smooth functioning. The at least one Memory 431 can be any suitable storage device, such as a non-transitory computer-readable medium. For example, a hard disk drive (HDD) or random access memory (RAM) can be used in at least one Memory 431.

The at least one Memory 431 can be on the same chip as the at least one Processor/Controller 420, or can be separated from the at least one Processor/Controller 420. The computer program instructions may be any suitable form of computer program code. For example, the computer program instructions may be a compiled or interpreted computer program. The at least one Memory 431 and computer program instructions can be configured to, with the at least one Processor/Controller 420, to cause a hardware apparatus (for example, User Equipment 165) to perform any process described herein.

User Equipment 165 may include a Radio Frequency Identification (RF-ID) and/or a Near Field Communication (NFC) Module 440 with an antenna (not shown). The RF-ID/NFC Module 440 may operate using traditional RF-ID frequencies or NFC frequencies. In one implementation these RF-ID/NFC Modules 440 contained in User Equipment 165 may send a wireless digital identifier (ID) associated with a user to an RFID reader located, e.g., in the premises of Location 180.

In one implementation, the direction detection technique explained concerning FIG. 2 A and FIG. 2 B might occur not because an emitting object is spontaneously emitting EM radiation but because, as in the case of RF-ID modules, those modules have been irradiated with EM energy by UE 165. For example, the detection of an emitting module such as an RF-IF module may occur in multiple phases: 1) the emission of an omnidirectional EM signal by UE 155; 2) the reception of the response from the RF-ID module at right Dipole Antenna 258 and Left Dipole Antenna 259 antennas for the determination of the direction of arrival of the response.

An alternative exemplary implementation can be: 1) emission of directional signal by Front Antenna 257 in the direction of Axis 280 (in this case Front Antenna 257 can be, e.g., a patch antenna instead of a dipole; 2) the reception of the response from the RF-ID module at right Dipole Antenna 258 and Left Dipole Antenna 259 for the determination of the direction of arrival of the response from the RF-ID emitting object. In FIG. 4, also Directional Antenna 425 can be used to induce a response from RF-ID modules.

An algorithm located on Server 100 may automatically check-in User Equipment 165 that is associated with said wireless digital identifier (ID). An algorithm residing on Server 100 can also associate these IDs to data structures also residing on Server 100 describing user preferences and profiles.

A check-in made by means of an RF-ID reader (or tags) can also be used in combination with Compass/Gyroscope 476 and Accelerometer 477 and/or inertial equipment to provide an accurate tracking of the position of users via inertial measurements within enclosed premises where a GPS module or other positioning systems may not work or be sufficiently precise.

For example, if the range of the RF-ID reader is short (e.g. 2 feet) the system will use the position of the RF-ID reader as the position at the time T of check-in. The system may also use Accelerometer 477 and Compass/Gyroscope 476 to track and record any subsequent movement of User Equipment 165. In so doing, the system may have a sufficiently precise position of particular user equipment in time. A location may have more than one RF-ID reader.

A precise indoor positioning system and Compass/Gyroscope 476 can be used to implement a function that can be desirable in crowded venues. For example, when a user requests a meeting with another user within Session Area 190 and said meeting request is accepted, it is desirable that I/O User Interface 450 produce an indication of where the other user is located. If the location of the two users is known with a good level of precision by the system or by a software module running on UE 165, I/O User Interface 450 may produce indicia such as an arrow pointing at the location of the user to be met and a distance value. Said functionality can be implemented at least in part by hardware components and software routines located either on User Equipment 165 or on Server 100. This situation will be discussed in another embodiment with reference to FIGS. 5 A and 5 B.

User Equipment 165 can be equipped with a Directional Antenna 425 and related circuitry that can be plugged in, e.g., into USB PORT 426. Directional Antenna 425 can be sensing the RSSI of data pertaining, e.g., to Bluetooth or Wi-Fi signal received from surrounding user equipment such as User Equipment 155, 160, 170, 175. It can also be used to transmit EM energy and activate RF-ID modules.

User Equipment 165 may also include an I/O User Interface 450. I/O User Interface 450 may allow inputting information via a touch screen or a QWERTY keyboard. I/O User Interface 450 may also include a vibrating notification module, or a speaker or a monitor or any combination thereof. User Equipment 165 may include one or more Transceiver 460 configured to operate in conjunction with one or more Antenna 470 to communicate wirelessly. In one embodiment, the Antenna Unit 470 may support beamforming and/or multiple-input multiple-output (MIMO) operations. As is known to those skilled in the art, MIMO operations may provide spatial diversity, which is to overcome difficult channel conditions and/or increase channel throughput. Antenna 470 may include antenna tuning and/or impedance matching components, RF power amplifiers, and/or low noise amplifiers. User Equipment 165 can be optimized to support multiple transceivers using multiple wireless standards.

In one example embodiment, User Equipment 165 may support simultaneous transmission of cellular (for example, GSM/UMTS/LTE/WiMAX) and non-cellular (for example, WLAN 495 or Bluetooth®/ZigBee 490) radio carriers. A Transmission Module GSM/UMTS/LTE/WiMAX 475 could be the medium by which User Equipment 165 communicates with Server 100. Alternatively, User Equipment 165 may communicate via WLAN 495 module.

Module WLAN 495 may also be a way by which the system ensures the locationing constraints associated with a session area. WLAN may be used as a proxy for ensuring that location constraints are met.

The location-based component of one embodiment of the invention can be advantageously implemented in many different ways. In one possible implementation, a GPS Module 410 may provide the location of User Equipment 165 to Server 100 via Data Link 140. When in closed environments, such as a shopping mall, the location data can be provided via other techniques. For example, choke points or grids, location indexing and presence reporting for tagged objects (such as RF-ID readers), can be used to provide location data when indoor. Other examples of techniques used to provide location are the angle of arrival, time of arrival, and received signal strength indication.

Figure 5:
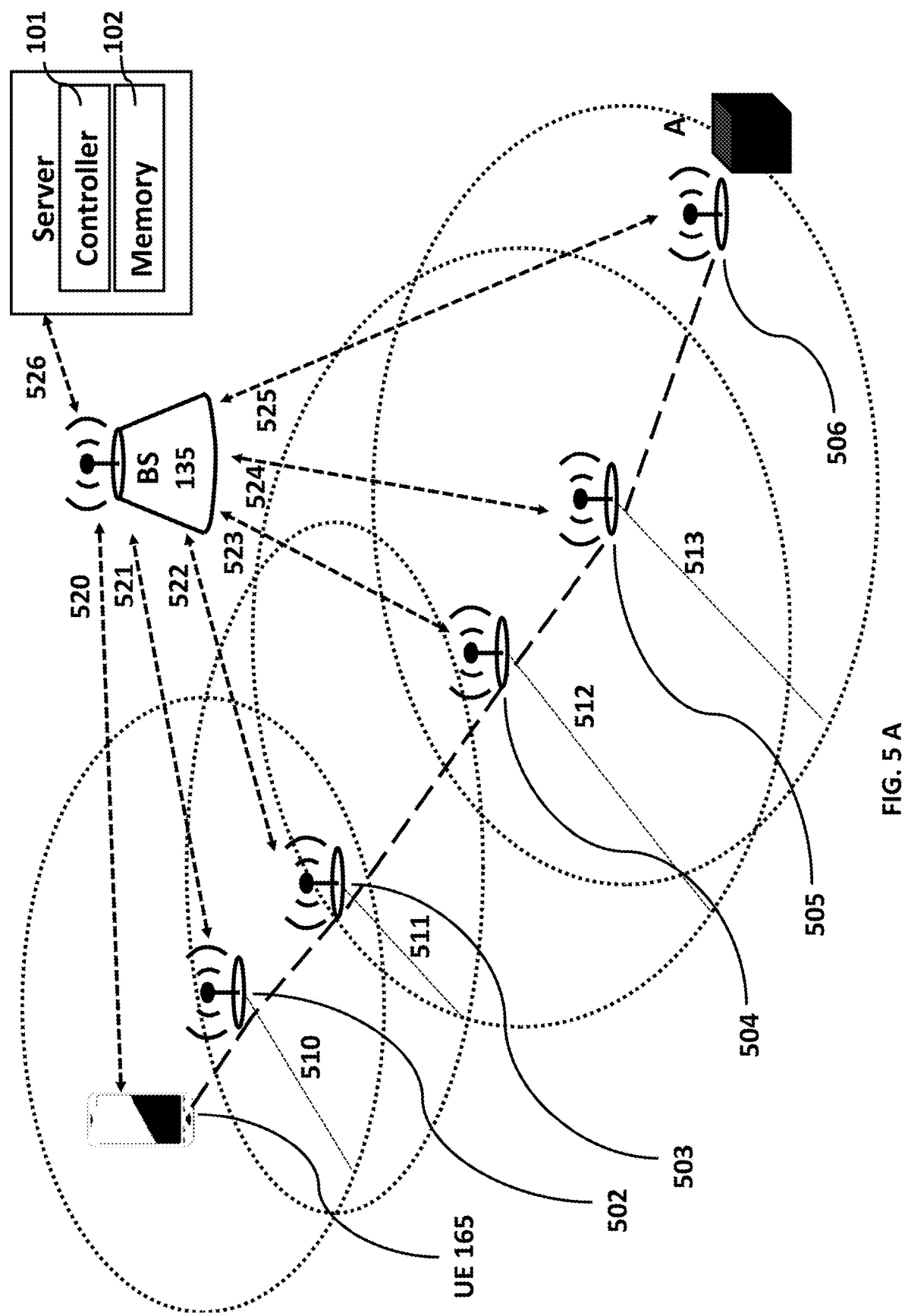
FIG. 5A represents a possible embodiment of the invention for implementing directional-based navigation.
FIG. 5B represents a possible embodiment of the invention for implementing directional-based navigation.
Figure 5:
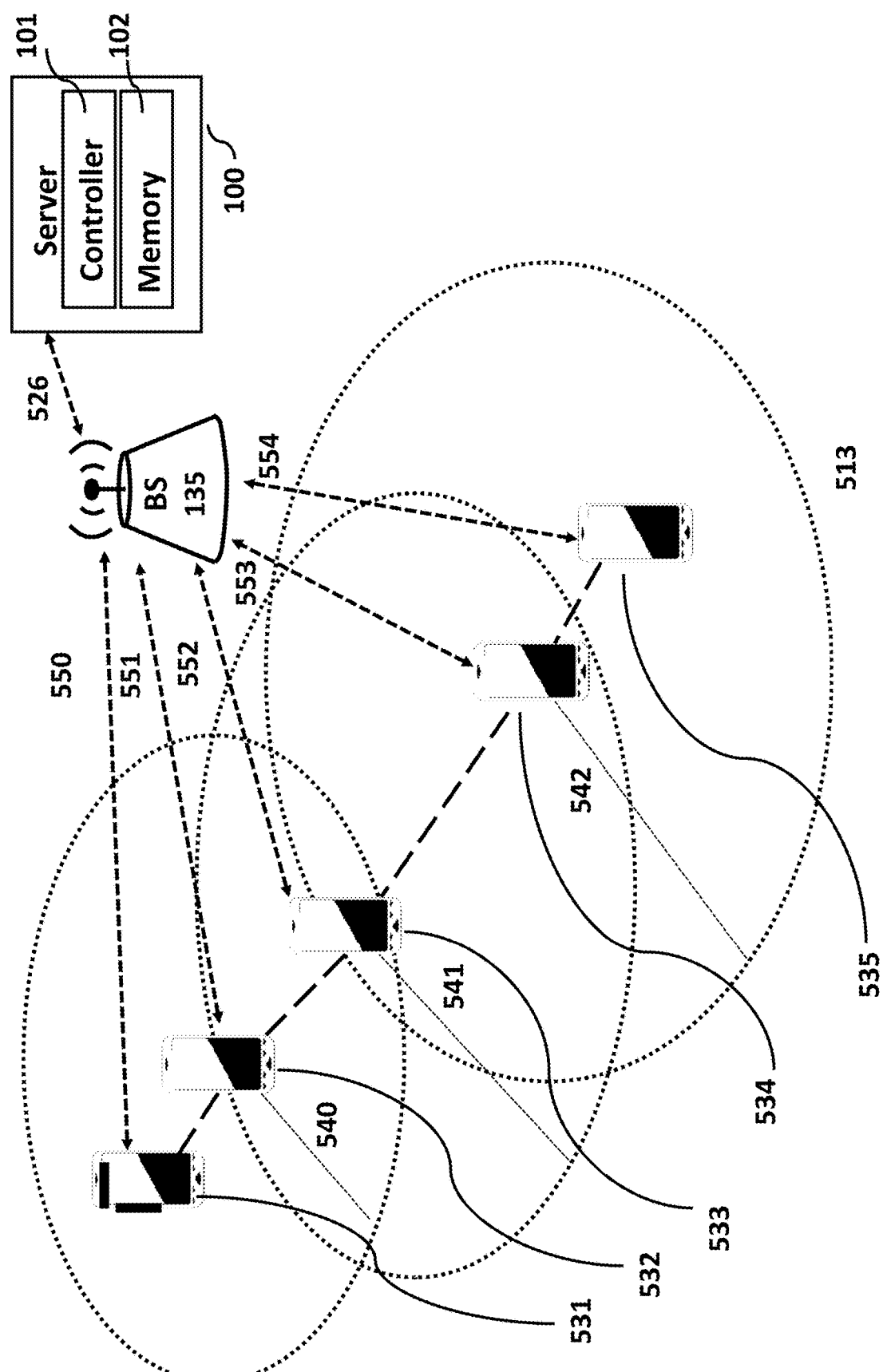

FIG. 5-A and FIG. 5-B describe at least a method to enable user equipment such as UE 165 to move from location A to Location B without necessitating a precise location data of said UE 165. As described with reference to FIG. 3, a handheld apparatus using antennas exhibiting asymmetric radiation patterns intelligently distributed in or around a user apparatus can determine the direction of arrival of an EM signal. Antennas 310, 312, 313, 314, 315, 316, 311 are examples of such antennas. The signal strengths of the received electromagnetic radiation at each antenna and their derivative function (associated with the data related to the spatial orientation of said UE 165 that can be tracked by a gyroscope/compass) can be used as an input for an algorithm stored, e.g., on Memory 431 to determine "where, how and when" to produce an output to be represented by I/O User Interface 450.

A precise indoor positioning system associated with Compass/Gyroscope 476 can be used to implement a function that can be desirable in crowded venues. For example, when a user requests a meeting with another user within Session Area 190 and said meeting request is accepted, it is desirable that I/O User Interface 450 produce an indication of where the other user is located. If the location of the two users is known with a good level of precision by the system or by a software module running on Memory 431, I/O User Interface 450 may produce indicia, such as a directional indication pointing at the final location of the destination user and a distance value to said destination user. Said functionality can be implemented at least in part by hardware components and software routines located both on User Equipment 165 and on Server 100.

FIG. 5-A represents one possible embodiment of an aspect of the present invention. As discussed in at least material incorporated by reference, FIG. 2, FIG. 3, FIG. 4, of the present application, wearable equipment or handheld equipment can be configured via software and hardware modules to detect the direction of arrival of an EM radiation of equipment such as an iBeacon module when, e.g., in advertising mode.

The EM radiation signal may come from fixed stations such as Emitting Objects 502, 503, 504, 505, 506. These Emitting Objects have EM Range 510, 511, 512, 513. In some implementations, at least some of these emitting objects have an overlapping radiation area so that UE 165 can sometimes receive the EM emission contemporaneously form two Emitting Objects when positioned within said overlapping radiation area. In certain implementations, all of these objects are iBeacons stations. In other implementations, the system and the UE can use a mix of radio standards, to acquire directional information. For example, a mix of Wi-Fi and Bluetooth stations can be used for directional guidance.

In certain implementations, as described in FIG. 5-A and FIG. 5-B, a directionality finder capability of UE 165 and an intelligent distribution of emitting objects can provide a useful and alternative technique to overcome limitations or complications associated with indoor and/or outdoor positioning and navigation. A breadcrumb technique can be used to guide UE 165 to object A represented in FIG. 5-A. This technique consists in following a trail of Emitting Objects to arrive at a location by following intermediate steps.

In one implementation, if UE 165 is, e.g., in a shopping mall and the user desires to reach location A, UE 165 can send an inquiry to Server 100. Server 100 by means of Controller 101, Memory 102 and an algorithm stored therein, will retrieve and calculate the sequence path of objects that UE 165 must follow to reach location A. UE 165 may receive said sequence via Link 520. In case UE 165 deviates from said sequence path of Emitting Objects (EO) or an Emitting Object in the sequence becomes not available, UE 165 may request and receive an updated path from Server 100. In certain implementations, UE 165 may not need to ping Server 100 for updates because UE 165 may download in part or in its entirety the database of emitting objects for the area in which it is located. Updates and recalculations to reach the desired location may also occur at least in part locally at UE 165 and or on Server 100.

In an exemplary embodiment, UE 165 will be directed in sequence toward Emitting Object 502, Emitting Object 503, Emitting Object 504, Emitting Object 505, and Emitting Object 506 to reach location A. The navigation system's UX-UI may consist in providing a directional indication toward the next waypoint in the sequence of emitting objects. When UE 165 can receive the EM emission of the next emitting object in the sequence, an algorithm may calculate the time in which to switch the UX-UI indications from the current indication of the previous EO to the next EO in the current breadcrumb trail according to certain parameters such as, e.g., the RSSI of the next emitting object.

In certain implementations, the Emitting Objects can be controlled, programmed, or configured by means of Links 521, 522, 523, 524, and 525. The Emitting Objects can be programmed to emit EM energy at predetermined levels or using predetermined emission sectors. They can be programmed to convey predetermined information to the user. They can even be activated only when needed. For example, the query originated by UE 165 to reach Location A may direct Server 100 to activate those EOs that are useful and needed to create the trail. Server 100 can also regulate the emission power of said EOs. In certain implementations, EOs can emit EM signals according to sectors. So for example, the same fixed EO can emit an EM with an ID code in one sector and another ID code in another sector.

Emitting Objects can have functionalities such as the reception of surrounding signals from nearby Emitting Objects or User Equipment. This information can be conveyed to Server 100 and/or UE 165. In one implementation, if one of the Emitting Objects such as, e.g., Emitting Object 504 stops functioning said failure could be recorded by surrounding Emitting Objects 503 and 505 and then conveyed to Server 100 and/or UE 165. An algorithm stored in Memory 100 may direct Emitting Objects 503 and 505 to increase their emission power to compensate for said failure. In certain implementations, UE 165 may continuously update Server 100 on which neighboring Emitting Objects UE 165 is capable of receiving. Server 100 may direct Emitting Objects to increase or decrease their emission power to facilitate navigation and/or repair broken or missing links useful to the navigation as reported by UE 165 and/or Emitting Objects.

In certain implementations, Emitting Objects 502, 503, 504, 505 and 506 do not communicate with Server 100 but their position is known to Server 100. An algorithm in Memory 102 or Memory 431 will function according the assumption that the data associated with EOs are correct and updated.

FIG. 5-A represents an embodiment where all Emitting Objects are fixed. The person skilled in the art will understand that this is a simplification. In fact, in certain implementations, some links in the chain of emitting objects may come, at least temporarily, from Emitting Objects that are mobile such as a UE apparatus when they are useful to assist the navigation of a user. To support this functionality, in certain implementations, said UE apparatus may report to Server 100 the list of Emitting Objects (neighbor objects) it is able to receive. In another implementation, the Emitting Objects report to Server 100 the reception of said UE apparatus and neighboring EOs. In a situation where two Emitting Objects receive said UE apparatus but cannot receive each other, said UE apparatus could be used according to an algorithm on Server 100 or UE 165 to bridge a gap in the chain that is needed for the directional navigation. The person skilled in the art will understand that hybrid scenarios are possible where fixed and movable equipment contributes to acting as reference points during directional navigation. The handover, namely when UE 165 stops providing directions with reference to an old Emitting Object and starts providing directions with reference to a new Emitting Object, can be controlled by an algorithm in UE 165 or alternatively in Server 100 via Links 520 and 526.

FIG. 5-B represents a dynamic embodiment of what described in FIG. 5-A. In this implementation, the emitting objects are UE hardware that is not fixed but can move around, such as UE 532, 533, 534 and 535. At least some of these UE emits an EM signal such as a Bluetooth signal having radio horizon Range 540, 541, and 542.

In certain implementations users of UE 531, 532, 533, 534 and 535 have all joined a common session area and/or event and/or session. This may allow an algorithm in Server 100 to rely on UE 531, 532, 533, 534, and 535 to enable directional navigation, from hardware, software and a privacy/legal standpoint.

In one implementation, a user of UE 531 wants to meet with user of UE 535. UEs 531, 532, 533, 534, 535 may continuously or periodically update Server 100 on which neighboring UEs and or Emitting Objects they are capable of receiving (neighbor list). When Server 100 receives a request from user of UE 531 to meet with user of UE 535, it may provide a first indication of which neighboring UE user should follow that is useful to get closer to the final destination, e.g., UE 540. Along the breadcrumb path and over time, the list of UEs can vary according to many parameters. In certain implementations, UE 531, 532, 533, 534, 535 may provide to Server 100 with not only a list of surrounding emitting neighboring equipment via Links 550, 551, 552, 553, 554, that can be used to extrapolate a path but also with indications associated to the strength of the EM signals received. Therefore, for example, while choosing between two UEs that can both receive UE 533 an algorithm in Server 100 or in UE 531 may indicate as most useful the one that reports a stronger signal received from UE 533 because it is closer to the next step in the trail. The iBeacon standard has also a distance determination algorithm built-in that can be used for improving the efficiency of the sequence of UEs that needs to be followed to reach the final destination or the destination user (e.g., UE 535).

Generally, an optimum breadcrumb trail can be determined by the least number of UE/Emitting objects to reach the destination but a reading of RSSIs between said UE/Emitting objects (how strong they receive each other that is also correlated to distance between said UE/Emitting objects) can be part of the algorithm to provide said optimum breadcrumb trail.

As discussed in the previous example of FIG. 5-A, hardware can be both movable and fixed and hybrid scenarios are possible. Again, all or part of the data can be downloaded to UE 531 and UE 531 can perform all or part or none of the calculations needed for the directional navigation.

In certain implementations, UE belongs to closed classes and or groups so that only equipment and/or users that support directional navigation within a predetermined group can benefit from the support of mobile equipment within the same group or class. One of the reasons is that, for example, UE may have to report periodically to Server 100 the list of surrounding UEs (the ones that are within their radio horizon, for example, Bluetooth radio horizon) to be able to support and be supported for the directional navigation functionality. In certain implementations, the reporting of said list in one area or within a certain mesh network can be activated according to different scenarios: on-demand, need for, or according to various algorithms. The person skilled in the art will understand that the number of hops to reach a final destination EO may range from just one to as many are needed to include UE into a neighbor list.

In one implementation, the system or a UE may request the activation of the reporting of the neighbor's list to Server 100 for all the UEs within a predefined distance from said UE. In another implementation, there is no predetermined distance but the requirement of reporting may expand with a geometric progression from the originating UE until a predetermined destination UE is reported to be part of at least one of the neighbor's list of the geometrically expanding group generated by the query. In another implementation, the query may be limited to a predetermined number of hops or branches from the originating UE. If the destination UE is not contained within any of the neighbors' lists, the query may return a null value. In other implementations, the query may be defined not only by an instant search but also by a search that lasts for a period. If within said period, one of the UEs that is part of the geometrically expanding group (or simply by a group of UEs that are part the service) reports the reception of said destination UE as a neighbor, originating UE will be alerted and/or a directional breadcrumb path can be provided.

Figure 6:
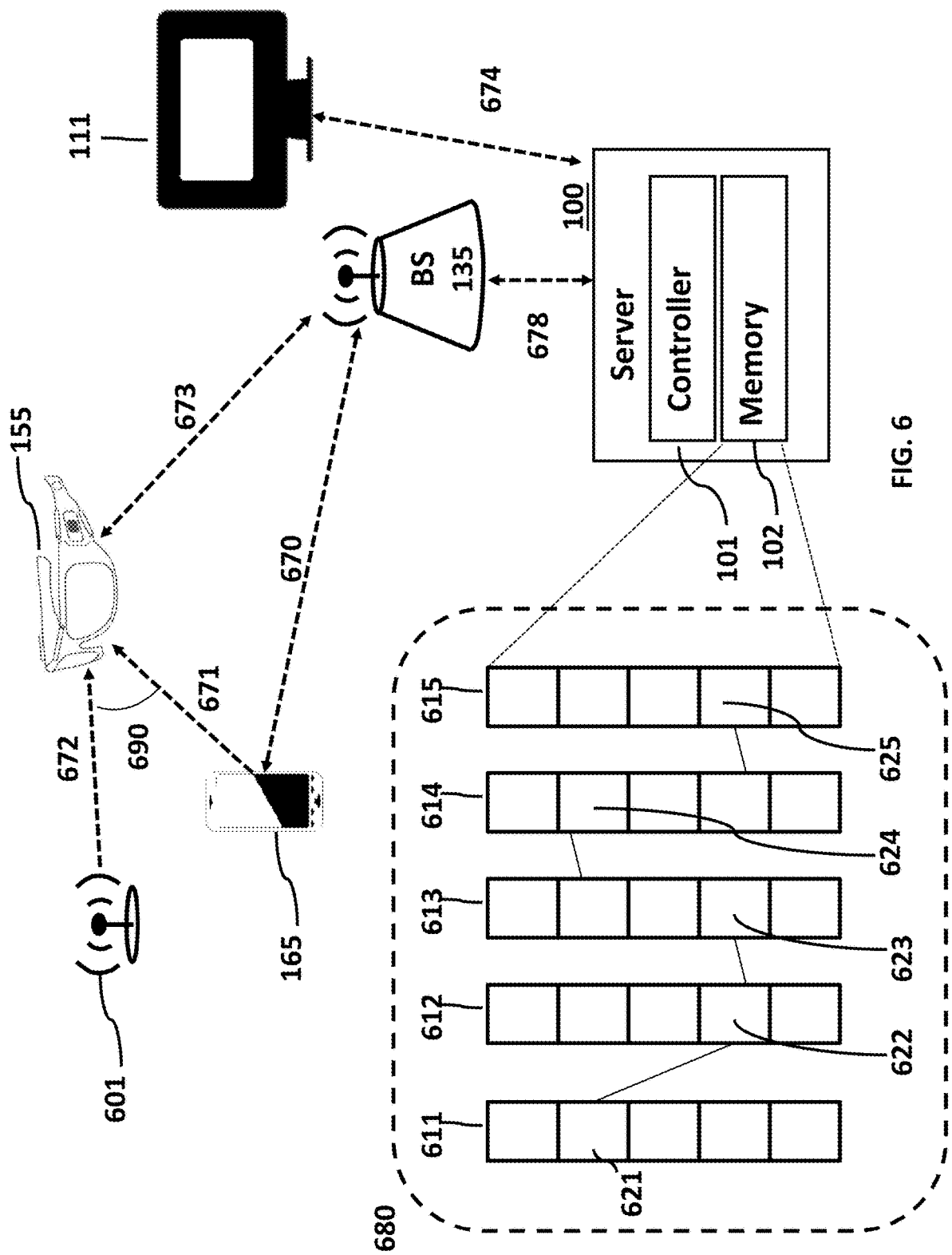
FIG. 6 is a non-limiting example of a method, equipment, and apparatus for adapting the functionalities of UEs to various parameters, profiles, and criteria.

FIG. 6 represents one implementation of a system for directional augmented reality and/or directional navigation that is based on parameters and/or classes. In one implementation, UE 155 is augmented reality glasses that work according to the principles described with reference to FIG. 2 A and described in the literature that is incorporated by reference such as U.S. Pat. No. 9,092,898 and Pat. App. U.S. 20160005233 A1.

In other implementations, UE 155 can be a handheld device working according to the principles described in FIG. 3 of the present application. Both classes of apparatuses (handheld and wearable) may contain modules such as a positioning module, a gyro module, a compass module that can be used to support a vast array of functionalities described also in the following paragraphs.

In one embodiment, the argumentation indicia that are outputted by UE 155 when Emitting Object 601 is in the field of view of UE 155 may depend not only from a code associated with the emitting object (either static or in motion such as user equipment) but also from a contemporaneous reading of a compass module in UE 155. For example, an augmented indication to turn to the right may occur if the compass module of UE 155 reads a direction of arrival of the EM wave having a value between 240 degrees and 300 degrees while Emitting Object 601 is in the field of view of UE 155. Equivalently an indication to turn left may occur if compass module of UE 155 reads a direction of arrival compass value between 60 degrees and 120 degrees while Emitting Object 601 is in the field of view of UE 155.

In another implementation, the augmentation indicia may depend not only from a code associated with the emitting object (both static and dynamic such as user equipment) but also from a geofenced area in which UE 155 is located, such as Session Area 190 or more generally from the position of UE 155.

In another implementation, the augmentation indicia may depend from not only a code or other information associated with the emitting object (both static and/or movable objects such as UEs) but also from a membership-to-a predetermined-group-of-users parameter to which user of UE 155 and/or user of UE 165 belong. For example, the user of UE 165 may be paying a fee for his information or an advertisement to be augmented by 155.

In another implementation, the augmentation indicia may depend not only from a code associated with the emitting object (both static and in motion such as user equipment) but also from the cinematic qualities of the emitting object. This can be accomplished in many different ways. The following examples are not exhaustive.

UE 155 may detect the motion of UE 165 and therefore it enables the augmentation of the EM signal it receives from UE 165. In another implementation, only if UE 165 detects a movement of itself via for example its own Compass/Gyro 476 and/or its Accelerometer 477 it will emit the EM signal that is necessary for the augmentation by UE 155.

In another implementation, UE 165 will transmit an EM signal that will contain data pertaining to UE 165 such as for example cinematic data of UE 165. This signal can be transmitted via Link 671 directly to UE 155. In one implementation, at least one data block of data will contain data and parameters pertaining to cinematic data. Said cinematic data, when received by UE 155, will enable and/or influence augmentation functionalities of UE 155 related to UE 165.

In another implementation, UE 165 may provide instantaneous or semi-instantaneous data pertaining to its status, e.g. cinematic data or position data to Server 100 via Link 670. UE 155 via Link 673 may retrieve these data when needed. Alternatively, data provided by UE 165 will affect augmentation related to UE 165. UE 155 will retrieve via Link 673 only the effects of such influence.

In certain implementations, the augmentation functionality may occur according to a Hierarchy. Augmentation Classes 611, 612, 613, 614 and 615 represent classes of augmentation such as for example, professional networking, games, dating, sightseeing information, and cinematic data and related information that are associated to code or an ID. Many other classes are possible. The same ID or code that is received by UE 155 via Link 671 or Link 672 may belong to multiple classes and UE 155 could be associated with multiple classes.

In order to avoid conflicts, a Hierarchy of classes can be established so that a class will have priority in the augmentation over another class. User associated with UE 155, user associated with Emitting Object 601, user associated with UE 165 and/or an Administrator of the service controlling Server 100 can establish a hierarchy among classes. The augmentation may occur according to the class that is on top a hierarchy of classes.

In another implementation, the hierarchy may involve a hierarchy among users. For example, two users that compete for augmentation of UE 155 may be subordinated to each other. In another implementation, the augmentation hierarchy may involve a seniority system among users, a premium user system, or a point system among users. If a plurality of equipment is within Angle 690 in the field of view of a user of UE 155 and they do compete for augmentation by UE 155, said hierarchy among users and/or apparatuses, and/or classes may resolve which emission UE 155 will augment.

In certain implementations, once the augmentation associated to an emitting object has been outputted, a timer might be initiated so that the same augmentation is not outputted for a predetermined time. In certain implementations, when two augmentation indicia compete for output the one that has been displayed most recently may take a lesser priority.

In certain implementations, the final augmentation may depend on multiple steps. For example, UE 165 may emit a code or an ID that may fall under Augmentation Class 611 and said ID be comprised within boundaries defined at Location Memory 621, e.g. augmentation for a dynamic object such as a mobile phone. The next step could be investigating Augmentation Class 612, e.g. pertaining to geographical areas, to check for example if the position of UE 155 affects the augmentation. If UE 155 is in one area as defined by Location Memory 622, the augmentation might be affected. For example, it is allowed.

The next step could be to check for conditions represented in Augmentation Class 613. For example, the augmentation could be different according to the fact that the user associated with UE 165 is a male or a female. This occurrence can be communicated to Server 100 via Link 670 and Link 678. The augmentation by UE 155 could be different depending on a male versus a female being associated with UE 165.

The person skilled in the art will understand that Augmentation Classes 614 and 615 could be used as additional modifiers of the ultimate augmentation. Data included may pertain to both the augmenting apparatus UE 155 and/or the emitting apparatus such as Emitting Object 601 and UE 165.

Examples may include data received from hardware modules such as location modules, gyro modules, and compass modules of both emitting hardware and augmenting hardware. In another embodiment, they may derive from data or selections in user profiles associated with Emitting Object 601, UE 165 and/or UE 155.

Other examples may include conditions and data associated with an administrator of a service that can be inputted in Memory 102 via Link 674.

For example, the user of UE 165 may be activated by a company as an agent for that company. This is described and incorporated by reference in U.S. Pat. No. 9,286,610 and US 2015-0199547 A1 concerning both location-based services and customization of connected objects such as augmented reality equipment. In FIG. 6 Administrator Equipment 111 represents said administrator.

In one implementation, an administrator of a service or a company may activate UE 165 as an agent for that company. UE 155 may output augmentation indicia indicating that user of UE 165 is an agent and a representative for a product, a service or a company. As discussed, with reference to Augmentation Classes and Location Memories, Location Memory 624 in Augmentation Class 614 main contain data related to products, authorizations and spatial boundaries associated with UE 165. Augmentation Class 615 and Location Memory 625 may concern preferences for augmentations for products, services, and companies of a user of UE 155.

The person skilled in the art will understand that the augmentation indicia that will be outputted by UE 155 may depend from the concurrent occurrence of many parameters and factors where the final augmentation can be the result of a condition/event/parameters tree that may involve, in sequence or in parallel, a plurality of different Augmentation Classes and Location Memories.

Conditions, boundaries, parameters, and data in Augmentation Database 680 contained in Memory 102 can be updated periodically or continuously by administrators, users, and hardware/software systems or equipment (both manually and/or automatically). As discussed, in certain implementations, portions of Augmentation Database 680 and/or actuation algorithms can be distributed among a plurality of hardware and memory modules to improve efficiency.

Figure 7:
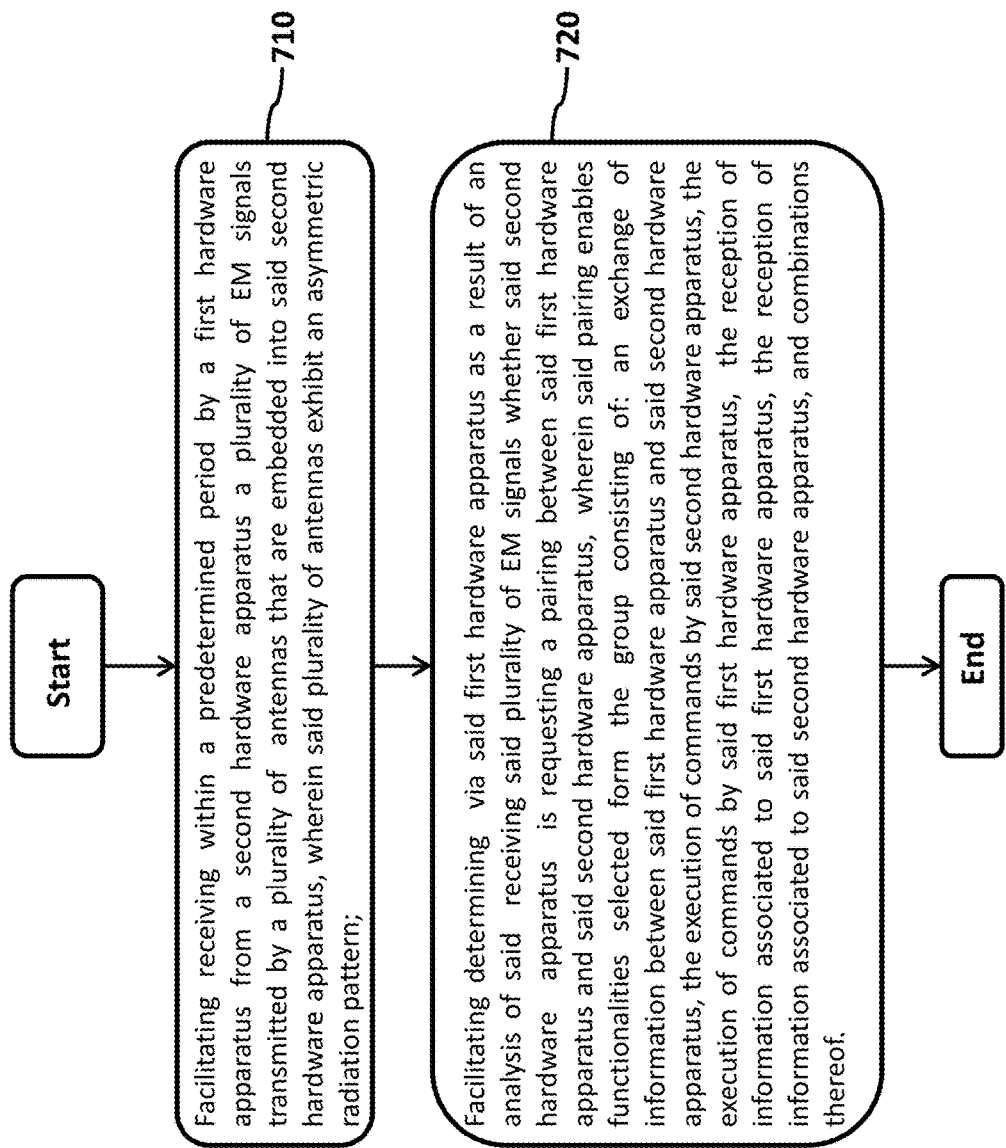
FIG. 7 describes a method for implementing an embodiment of the present invention that is based on the active transmission of the constellation of antennas.

FIG. 7 represents a method for one embodiment of the present invention in which transmitting hardware (embedding a plurality of antennas that are strategically positioned in said transmitting hardware) enables, at least temporarily, the pairing of said transmitting hardware with receiving hardware. The method comprises 1) facilitating receiving within a predetermined period by a first hardware apparatus from a second hardware apparatus a plurality of EM signals transmitted by a plurality of antennas that are embedded into said second hardware apparatus, wherein said plurality of antennas exhibit an asymmetric radiation pattern; and 2) facilitating determining via said first hardware apparatus as a result of an analysis of said receiving said plurality of EM signals whether said second hardware apparatus is requesting a pairing between said first hardware apparatus and said second hardware apparatus, wherein said pairing enables functionalities selected from the group consisting of: an exchange of information between said first hardware apparatus and said second hardware apparatus, the execution of commands by said second hardware apparatus, the execution of commands by said first hardware apparatus, the reception of information associated to said first hardware apparatus, the reception of information associated to said second hardware apparatus, and combinations thereof.

Figure 8:
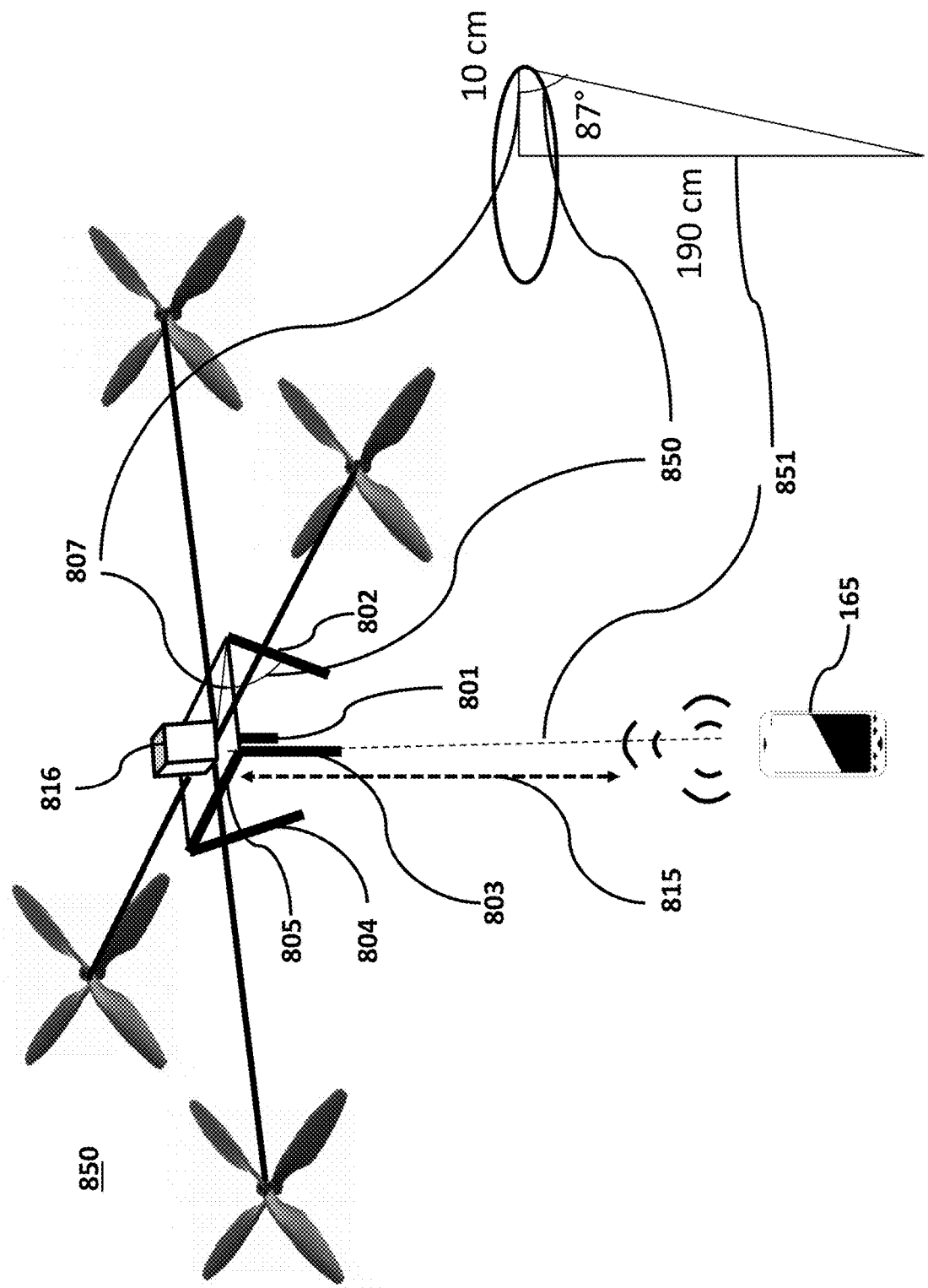
FIG. 8 describes methods, systems, and apparatuses for implementing various embodiments of the present invention that are based on using a constellation of antennas to inform and/or control a movable object and/or user equipment.

FIG. 8 represents a method, system, and apparatus of one embodiment of the present invention related to drones and more in general to any hardware equipment that is capable of positioning. The comparison of RSSI of an EM signal such as a Bluetooth signal emitted by UE 165 as received by Antennas 801, 802, 803, 804 can be used by an algorithm in Logic Module 816 of Drone 850 enabling the locking of Drone 850 into a predetermined relative position as compared to the position of UE 165.

A an example The person skilled in the art will understand that if Radius 807 is the radius of a circumference on a horizontal plane encompassing the endpoints of the four Antennas 803, 804, 801, 802, and said circumference has a radius of 10 centimeters and said four antennas are all positioned at an Angle 850 that measures, e.g., 87 degrees (Angle 850 is reproduced to the right and it subtends said Radius 807), by means of trigonometry calculations, when all four antennas are aiming at EM source UE 165, Drone 850 is positioned on an imaginary line (Vertical Line 851) over UE 165 at a distance of approximately 190 centimeters.

The person skilled in the art will understand that if Antennas 801, 802, 803, 804 all receive a minimum signal (ideally zero) and, e.g., Antenna 805 (a control antenna) receives maximum signal it means that Drone 850 is positioned vertically above a user of UE 165 at a height of about 190 centimeters. It should be also apparent that not all antennas need to be inclined at the same angle. If it is desired that Drone 850 positions itself in front of user or, e.g., on an imaginary circumference in the air centered on said Vertical Line 851, antennas can be inclined at different angles and an algorithm running in Logic Module 816 may produce control signals so that Drone 850 positions itself to minimize and/or equalize RSSI received at Antennas 801, 802, 803, 804.

In another embodiment, a measurement from a barometer module in Drone 850 feeding elevation data to Logic Module 816 may help the stabilization algorithm to position Drone 850 in a predetermined position in relation to UE 165. In another embodiment, a radar module on the drone can be used to stabilize Drone 850 at a selected altitude.

In another embodiment Link 815, connecting UE 165 with Drone 850 may permit the exchange of cinematic data from UE 165 to Drone 850 and vice versa. For example, if Drone 850 is positioned at a predetermined spot so that RSSI received at Antennas 801, 802, 803, 804 is equalized and/or proximate to zero, it may happen that UE 165 moves to the right. The cinematic data can be recorded by the Compass/Gyroscope 476 module and/or Accelerometer 477 module. Said cinematic data can be communicated via Link 815 to Logic Module 816 so that Drone 850 will be able to maintain a predetermined position not only by means of RSSI readings at antennas and barometric readings but also via cinematic data received directly from UE 165 so that all movements of UE 165 can be translated into a spatial correction datum by Drone 850. The result will be that Drone 850 may move along with UE 165 maintaining its relative position. The person skilled in the art will also know that RSSI readings can also be translated into distance readings by means of the iBeacon standardization protocol.

Figure 9:
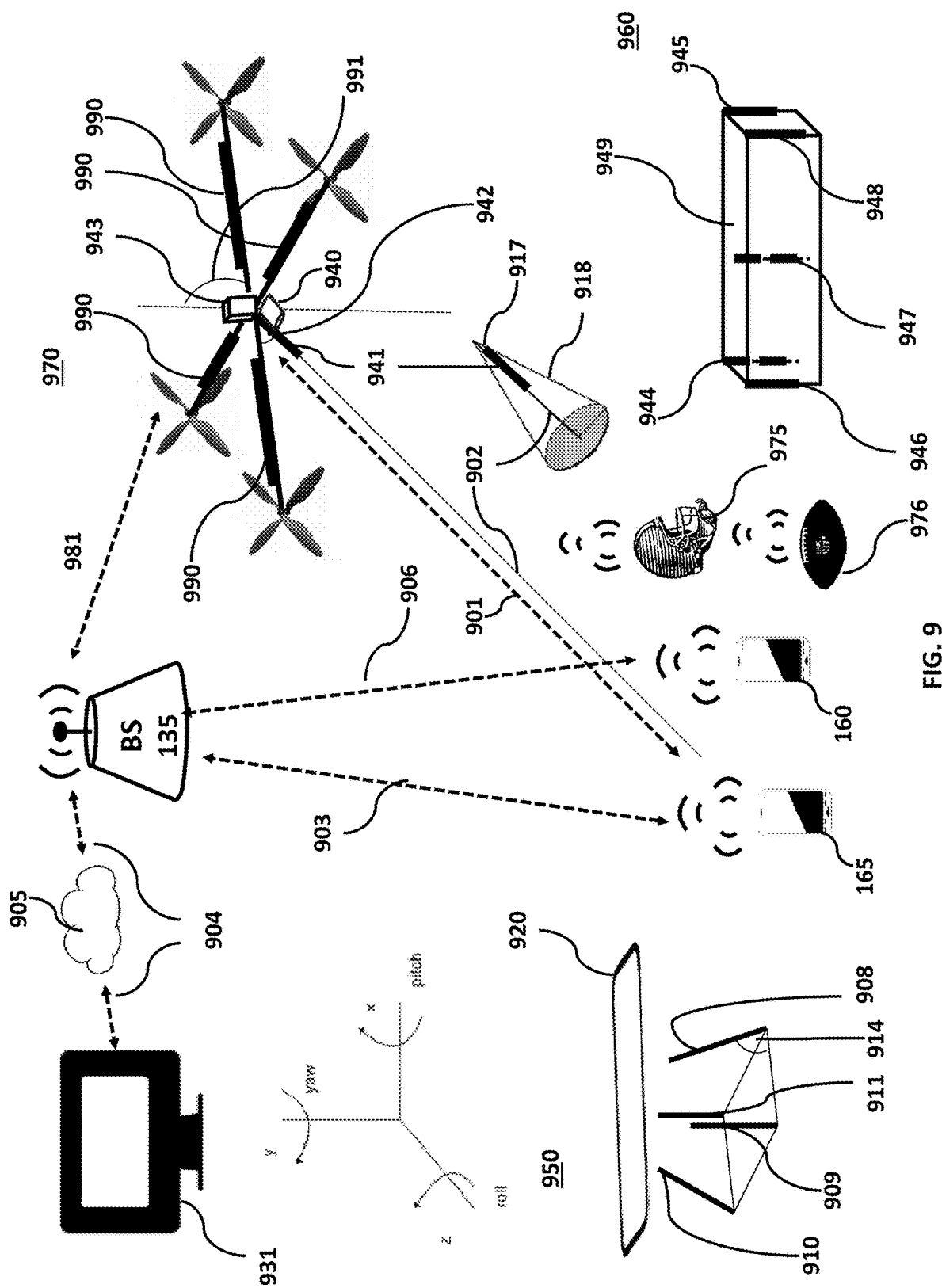
FIG. 9 describes various methods, systems, and apparatuses for implementing various embodiments of the present invention that are based on using a constellation of antennas to inform and/or control movable objects and/or user equipment.

FIG. 9 is another embodiment of one aspect of the present invention for a drone that can also maintain a fixed relative position in relation to UE 165 or other equipment. In some regards, the usage of one antenna tilted toward UE 165 is a simplification as compared to FIG. 8. In this implementation, Antenna 941 is tilted of a predetermined Angle 942. Angle 942 is the complementary angle to the angle that is formed between Antenna 942 and an imaginary vertical line intersecting said antenna's endpoint. When Antenna 942 receives a value of RSSI lower than a predetermined threshold this will signal to Logic module 943 that Drone 970 is in position, namely, it is on Axis 902. Said threshold value of RSSI can be coupled with a barometric reading or a radar reading from a sensor on Drone 970 to maintain a predetermined elevation. Inputs from a barometer module in Drone 970 will signal to Logic Module 943 that Drone 970 is at the predetermined elevation. In some implementations, the distance between UE 165 and Drone 970 can be maintained via RSSI readings of other antennas that are translated into a distance by Logic Module 943. As discussed with reference to FIG. 8, Link 902 may also signal cinematic data of UE 165 so that those cinematic data can be replicated by Drone 970 (translated into spatial corrections) to maintain its position in relation to UE 165 or any other EM source that can be installed, e.g., on a moving vehicle. Therefore, for example, if the user of UE 165 is running, his cinematic data can be translated into spatial corrections for the drone to maintain continuously a fixed relative position between UE 165 and Drone 970. This method can be applied in conjunction or independently from the method for determining the direction of arrival of an EM source. In certain implementations, the drone can be manually positioned in a certain relative position and then the transmission of cinematic and/or inertial data can be activated from a reference object so that Drone 970 is spatially locked into said relative position.

The person skilled in the art will also understand that a user, in certain implementations, can substitute UE 165 with an ad-hoc EM source generator and/or a transmitter of cinematic data that can be more compact and/or wearable than a smartphone.

In certain implementations, Video Camera 940 can be aligned with said Antenna 941 to Axis 902 so that pictures and videos of, e.g., user of UE 165 can be taken by Video Camera 940 by means of user's inputs on I/O User Interface 450 or automatically, for a predetermined period, or at the occurrence of predetermined conditions. Said predetermined conditions can include a value threshold of RSSI received by Antenna 941, inputs from the user of UE 165, cinematic data received by UE 165, position data, input from an administrator of Drone 970, wherein Drone 970 can also be wirelessly connected to a Base Station such as BS 135.

Said videos, pictures, or digital data relating to, for example, readings by means of digital and analog sensors, can be stored on a memory on Drone 970 or downloaded via Link 901 or other wireless link or cable connection into UE 165 or Server 100 for use by user of UE 165 or Drone Administrator 931 or another entity such as, e.g., the owner of a vehicle equipped with an EM source module.

In certain implementations, Drone 970 and/or Drone 850, are equipped with a GPS and are wirelessly connected to a Base Station 135 and/or the internet via Link 981. In certain implementations, drones can be sent remotely by an administrator of those drones to perform a service for the user of UE 165 or more generally for a user associated with an EM source module.

In certain implementations, the user of UE 165 can request a drone to a Drone Administrator 931 by sending a request via a software app together with his position to Drone Administrator 931. Drone 970 or Drone 850 may fly toward the position indicated by said user and when in proximity of said position and/or within range of a wireless signal emitted by UE 165 and/or within a certain geofenced area, said drones might perform certain tasks for the benefit of user of UE 165 and/or Drone administrator. Said geofenced area might be centered, e.g., on current position of user of UE 165 or on a position indicated by said user or said administrator. Said tasks may include the capturing of video and/or pictures of user of UE 165 or other subjects such as houses. Said video or pictures or digital media can also be streamed to user of UE 165 or Drone Administrator in real-time for subsequent selection, sharing or storing.

In one exemplary implementation, we can imagine, for example, NFL football players having drones tasked with following their performances during a game. Said drones can be allocated different elevations so that they will not interfere with each other. The visual field locking on selected football players functionality and other functionalities can be provided by a small EM source carried by those players, e.g., in Helmet 975. In another implementation, said EM source can be contained in Ball 976 that is used to play the game, for example a soccer ball or an American Football ball. In this case, the drone can automatically follow the action and can be oriented, positioned and focused so that its camera's field of view follows the action without the constant intervention of a human operator. Those drones may also have the capability to switch their locking functionality from one player to another player and/or reposition themselves around a player and/or an EM source. Said switching functionality can be enabled by algorithms capable of aligning and/or positioning Drone 970 according to an ID associated with each player and/or helmet so that Drone 970 can switch its locking from one player to the other or to the ball that is used during the game.

The person skilled in the art will understand that a drone flying over a football field while players are playing should comply with any safety requirements. Drones should have backup systems so that in case of a failure of one or more components, a safe retrieval of the drone is possible. For example, it should be able to safely fly and land using a subset of its propellers. In case of crash landing, certain modules, such as automatic parachutes or airbags should deploy to minimize the risk of hurting nearby humans on the ground. In certain implementations, drones can be contained in spherical and light cages so that in case of forced landing the danger to nearby humans is minimized. In certain implementations, a drone experiencing a failure or flying below a predetermined altitude may emit a loud sound so that humans on the ground are alerted of its impending crash or its presence. In certain implementations, drones can be confined to geofences positioned to the side of the playing field so that a crash will minimize the probability of hurting nearby humans.

The person skilled in the art will understand that the condition that Antenna 941 receives an RSSI data below a predetermined threshold (or ideally zero) from an emitting source translates into Drone 970 being positioned, e.g., on a horizontal circumference in the sky centered on a vertical axis that intersects the EM source. The elevation and the dimensions of said circumference are dependants from Angle 942 and from a predetermined elevation parameter. In certain implementations, Angle 942 can be variable according to settings and inputs of drone administrator. The person skilled in the art will also understand the interdependence of drone elevation, Angle 942 and radius of said circumference where Drone 970 or Drone 850 can move maintaining, e.g., an ideal value of RSSI received by at least one dipole antenna tilted at a predetermined angle. The dipole antenna is just one of the many possible examples of an antenna exhibiting an asymmetric radiation pattern.

As discussed, the value of RSSI is ideally zero in certain implementations if a dipole antenna is aiming at the EM source. In certain implementations when more than one antenna receives RSSI from the same source, variations of RSSI can be translated into horizontal translations of the EM source on the ground. Logic Module 816 or Logic Module 943 may receive readings from multiple antennas on the drone and translate changes of RSSI at different antennas into cinematic repositioning commands for the drones via predetermined algorithms so that a fixed relative position between drone and EM source is maintained, or at least so that the drone maintains a position on said previously described imaginary circumference in the sky.

In certain implementations Antenna 941, e.g. a dipole, is positioned on the axis of Right Cone 918 having Apex 917. A plurality of dipole antennas can be strategically positioned on the surface of an ideal Right Cone 918, wherein said plurality of dipole antennas has their axis intersecting Apex 917. When Drone 970 is in position and locked on one EM source, Antenna 941 that is positioned on the axis of Right Cone 918 will ideally receive a value of RSSI proximate to zero, while all other antennas that are strategically positioned on the surface of Right Cone 918, will ideally receive a value of RSSI that is approximately the same. For example, said antennas can be equally spaced on the surface of the cone. When the emitting source of EM radiation moves away from its ideal relative position, different antennas will experience variations in the value of RSSI. Antenna 941 will also experience an increase of RSSI, while different antennas on the surface of Right Cone 918 will experience either a decrease or an increase of values of RSSI from an emitting source on the ground. The derivative of RSSI values at different antennas can be used by Logic Module 943 to infer spatial corrections so that Axis 902 maintains its aiming toward the electromagnetic source.

In certain implementations, spatial corrections of the drone can be supplemented by cinematic data such as accelerations and decelerations or position data that are transmitted from the EM source item (e.g. UE 165) to the drone directly via Link 901 or indirectly via Link 903 and Link 981 when the EM source is equipped with a GPS or a Compass or a Gyroscope or an Inertial Navigation Module or another module. Any cinematic translation of EM source on the ground may translate into an equivalent cinematic translation of drone on a plane at a predetermined altitude.

In other implementations, video recognition algorithms can aid the lock-in functionality when the target on the ground is recognized and followed via algorithms that use image data. As discussed, an RSSI value received by antennas on the drone can be used to derive a value of the distance from the EM source by using, for example, the iBeacon standard that translates RSSI data in distance values.

In certain implementations, the elevation of the drone can be maintained via a radar system. In other implementations via a barometer, in other by means of combinations of other different techniques such as, e.g., readings of RSSI at Antenna 941 and Antennas 990.

In certain implementations, certain functionalities of Drone 850 or Drone 970 can be handed over to user of UE 165 for a certain period and at certain conditions. For example, user of UE 165 can rent the usage of the drone for a certain period and/or within a predetermined area. User of UE 165 can be handed over certain functionalities of the drone such as the possibility of controlling its cinematic or the possibility of controlling its sensors and/or its digital media modules (e.g., video camera's aiming controls, zooming or other) by Administrator 931. This can be done automatically or via a manual handover.

In certain implementations, drones may come equipped with modules that can be used by the user to perform certain functionalities. Modules can be interchangeable and can be used for different purposes.

Examples of modules are:
a chemical or organic pesticides module used for spraying in agriculture;
a medical equipment module for providing life-saving equipment as e.g., a heart attack first aid equipment;
a human transportation module so that a user of UE 165 can request transportation from its present position or future position to another predetermined position; in this case Drone 970 or 850 may receive user of UE 165's position via Link 981, approach UE 165, e.g., via one of the homing methods based on EM signals, load user of UE 165, and finally transport user to a predetermined destination;
a payload transportation module system that will carry items from one user to another user.

The examples given are by no means exhaustive.

In one implementation, Drone 970 is controlled and/or dispatched either automatically or manually via inputs, parameters, and/or instructions coming from Drone Administrator 931 equipment. Many of the dispatch and control processes can be automatic so that Drone Administrator 931 can also be a server storing a series of algorithms and instructions in a memory that are executed by a processor that perform tasks and routines under the constraint of parameters and inputs of a human administrator and/or various data and sensors. For example, if the weather conditions are prohibitive (i.e., outside of preset parameter and boundaries) for the flying of a drone, the request for the services of Drone 970 by the user of UE 165 can be denied or delayed.

A service server can be tasked with keeping track of data pertaining to originating user, drone data, destination user data, instant conditions and more. Drone 970 can provide data to Drone Administrator 931 and/or service server concerning its mileage range, battery levels, weather conditions, any data collected by drone sensors, faults indications, payload weight, and more. These data can be transmitted via Link 981, BS 135, Cloud 905 and Links 904 and can be used by a server service to control Drone 970 and satisfy safety and operational requirements. Cloud 905 is representative of networks of computing equipment and/or communication equipment that may enable the communications needed for the services herein described.

In one implementation concerning the delivery of a package to another user, the user of UE 165 who wants to deliver a package in town may request the delivery services of Drone 970 to Drone Administrator 931. Once the request is initiated, the position of originating equipment (UE 165) and destination equipment (UE 160) are communicated to the delivery system. The delivery system using all or part of the data that are available may task one of a fleet of drones to perform the service. User of destination equipment UE 160 may be alerted that a drone will be delivering a payload at approximately time T. Availability of destination user may be requested to initiate the delivery procedure. In some implementations, user of destination equipment may indicate a time and/or a location of availability and the loading, transportation, and delivery operations may be synchronized and scheduled to fulfill destination user's window and place of availability. In other implementations, originating user may be dictating the conditions and parameters that will primarily influence the loading and delivery operations. In other implementations both originating user and destination user may influence said loading and delivering operations.

In certain implementations, originating user and destination user can be the same. For example, a husband needs a drone to retrieve car keys from his wife at home since he lost his car keys. Drone 970 can be tasked with 1) approach wife's location, e.g. home, 2) be loaded by wife with keys, and 3) fly to recipient husband location to deliver a copy of the keys. The person skilled in the art will understand that the possibilities and case scenarios are endless. A drone administrator may receive a request for service, configure Drone 970 for said specific service and indicate to the system the availability of Drone 970 for said service. In certain implementations, the owner of the drone and the administrator of the service may not even be the same.

An owner of a standardized drone may indicate its availability for rental of the drone to perform predetermined services in an area around where the owner of the drone lives. The administrator may simply activate the drone for performing services within its fleet of drones for rent. Owner of drone may perform drone maintenance and indicate drone availability and drone's data.

An exemplary flow of information for a delivery service may be similar to the following.

User of UE 165 will request a delivery service of a payload to the user of UE 160.

Data on the current location of the user of UE 160, Drone 970 and UE 165 will be used to task a potential drone that is currently located in a convenient location and has the capability and range to perform the service.

User of UE 160 will be alerted of the potential delivery at his current location and will be asked to confirm time/location availability.

User of UE 165 will be alerted of the potential pick up at his current location and will be asked to confirm time/location availability.

Once confirmed, Drone 970 could be approaching UE 165 position for pick up via GPS coordinates or other techniques. During the final approach, Drone 970 could be using EM homing techniques toward UE 165 as described in the current patent application. The drone may maintain its position on Axis 902 and may descend. If Drone 970 is unable to receive EM signal from UE 165, Drone 970 may signal to the system and to UE 165 its inability to receive EM signal from UE 165.

The person skilled in the art will understand that EM homing procedures can be optional and landing may occur relying on traditional navigation techniques such as GPS. One of the reasons for Drone 970 inability to receive EM signal from UE 165 could be that UE 165 is located indoor.

The user of UE 165 may be signaled that he needs to move outdoor (on a balcony for example) to be able to load Drone 970 with a payload. Once the drone is loaded, user of UE 165 may signal to the system that Drone 970 is ready to fly to the location of user of UE 160 (receiving user).

In certain implementations, with a user-to-user package transportation system, the system may alert originating user and/or destination user of the approaching of Drone 970 to their current position so that originating user and/or destination user can position themselves in an open space for activating or facilitating homing procedures toward their respective User Equipment. The homing may consist, e.g., in GPS based and/or EM-based techniques.

In certain implementations, the homing procedure can be hybrid. Once Drone 970 is positioned in a homing position as compared to UE 165, for example, a position that minimizes RSSI at antenna 941, Drone 970 may initiate and compute descending trajectory to keep maintaining the reception of RSSI by Antenna 941 to the minimum.

In certain implementations, once destination user holds Drone 970 in a predetermined manner and/or it senses it is safe to do so, its propellers may turn off automatically. In another implementation, UE 165 may direct to Drone 970 to perform a vertical landing on the ground once he determines it is safe to do so.

In certain implementations, Drone 970 and/or users of a service such as the one described above can be paired with Landing Pads 950 or Landing Pad 960 instead of utilizing user equipment for the final approach.

Landing Pad 960 can be equipped with Antennas 944, 945, 946, 948 and/or antenna 947. These emitting antennas can be perpendicular to plane XZ. By comparing the RSSI received from emitting antennas in Landing Pad 960 and 970, by antennas installed on Drone 970, such as Antenna 941 and Antennas 990, Logic Module 943 can compute a descending trajectory so that Drone 970 can land on Pad 949.

In one alternative implementation, Landing Pad 950 can be equipped with Antennas 910, 909, 911, 908. These emitting antennas may form Angle 914 with plane XZ. By comparing the RSSI received by antennas on Drone 970, Logical Module 943 can compute a descending trajectory so that Drone 970 can land on Pad 920.

These are just examples of active landing pads that can be used to provide homing capabilities to drones that are equipped with one or more antennas and a logic module capable of deriving directions from RSSI measurements at said one or more antennas. The person skilled in the art will understand that many different techniques can be used by a drone to navigate from and to preset destinations and waypoints and to approach landing pads and/or users. Examples of techniques are inertial navigation, map comparisons, photography-based techniques, GPS based techniques and others such as inertial techniques. In one implementation, the techniques described in FIG. 5A and/or FIG. 5 B can be used by Drone 970 to navigate between users or between locations. For example, a network of Wi-Fi access points may cover a whole city and a drone could be able to move from one access point to the next access point without the constant need of precise location data. The same example can be used for a network of users emitting, for example, Bluetooth signals. Drone 970 may be able to fly from one originating user to a destination user via intermediate users using in a "bread crumb trail" that can be provided and updated by the system as described in FIG. 5 A and FIG. 5 B.

In certain implementations said Drone 970 might include a 360 degrees video camera that may consist of one array of N cameras covering a 360-degree angle whose outputs can be digitally merged and synchronized.

Examples of airborne sensors that can be carried by a drone can include sensors measuring and analyzing light, sound, pollution, chemical components, and others. In certain implementations, the arms hosting the propellers of Drone 970 may host Antennas 990 that can be used for positioning and/or homing purposes. In certain implementations, said arms are laying in a horizontal plane such as plane ZX. In that case, Angle 991 that measures the angle between arms of Drone 970 and the vertical axis of the drone is 90 degrees. In another implementation, the drone's arms can be movable and Angle 991 can assume values that are greater or smaller than 90 degrees. In certain implementations, Angle 991 may be dependent on the flying altitude of the drone and can be adjusted to enable the best performances in calculating RSSI values for homing and navigational purposes.

The person skilled in the art will understand that, for example, by changing the value of Angle 991 that is the angle at which Antennas 990 are positioned on the drone's arms with respect to the vertical axis of the drone, some of Antennas 990 will receive a higher RSSI value as compared to other Antennas 990, depending from their relative position, as compared to UE 165, UE 160 or Landing Pads 950 and 960. These differences and variations in RSSI at different antennas can be used to feed positioning and orientation algorithms.

Figure 10:
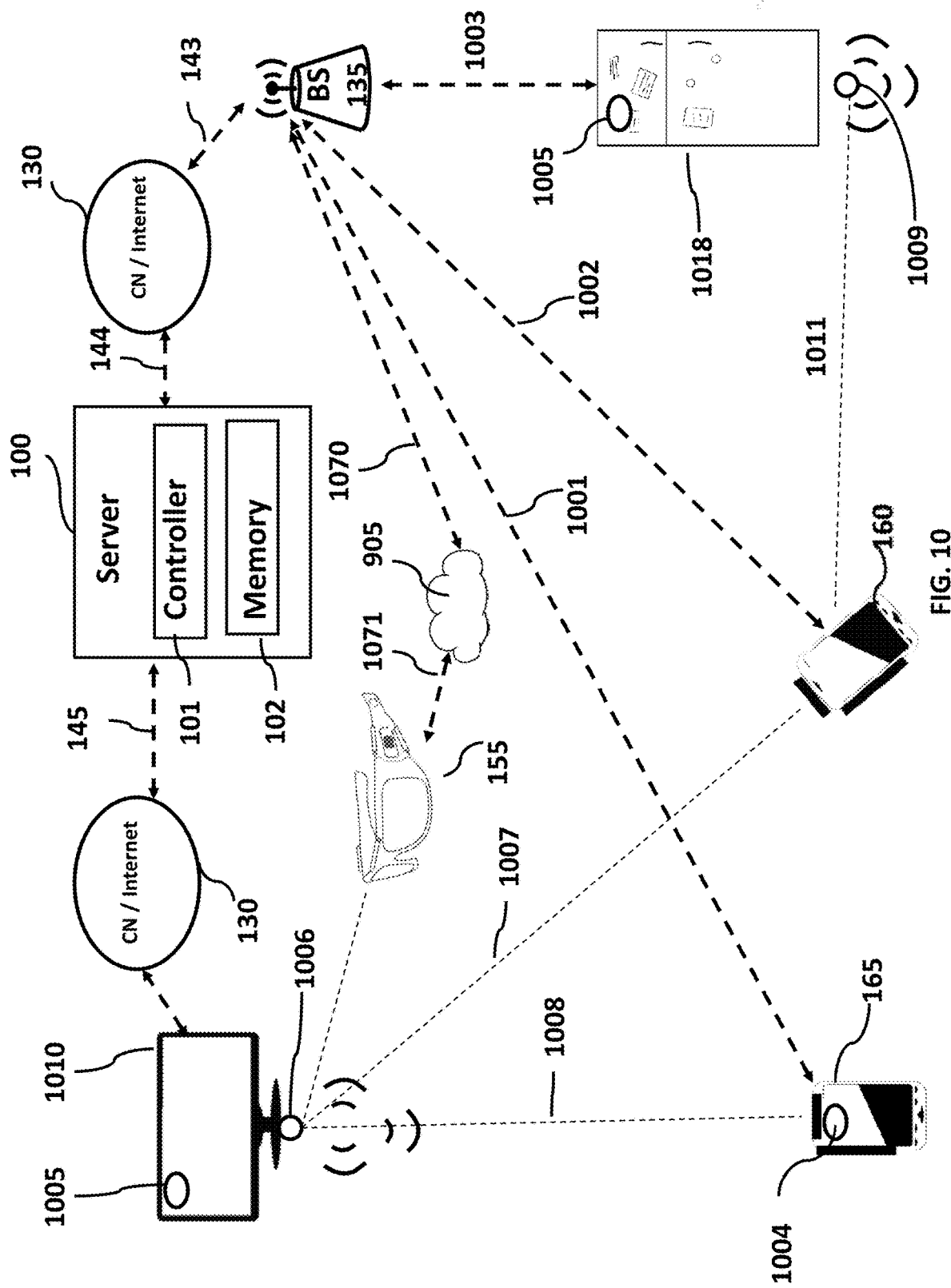
FIG. 10 describes various methods, systems, and apparatuses for implementing various embodiments of the present invention that are based on using a constellation of antennas to seamlessly inform, and/or pair and/or control connected objects and/or user equipment.

FIG. 10 represents another embodiment of one aspect of the present invention that exemplifies a few concepts where common household appliances are the target devices. The same inventive concepts can logically be extended to other current and future appliances as well as to any device or machine that is connected to the internet such as, e.g., connected cars.

In certain implementations, UE 165 and UE 160 may adopt without limitations the concepts that are described in FIG. 3, where, e.g., dipoles are orthogonally positioned into a smartphone so that when at least one dipole receives an RSSI that is proximate to zero or below a predetermined threshold, and another dipole an RSSI value that is above a predetermined threshold, an algorithm can determine that UE 165 and/or UE 160 are aiming at, for example, Connected TV 1010 on Axis 1008 or Axis 1007. In certain implementations, Connected TV 1010 is associated to EM Source 1006 that emits a signal ID representative of the Connected TV 1010. In certain implementations, if UE 165 is aiming at Connected TV 1010 for at least predetermined period, UE 165 and Connected TV 1010 are automatically paired and UE 165 may either receive information about Connected TV 1010 or can download a menu so that certain functionalities that are pertinent to Connected TV 1010 can be controlled by user of UE 165 until Connected TV 1010 and UE 165 are paired.

In another implementation or scenario, the pairing may not be automatic but it may occur according to predetermined algorithms. UE 165 may determine that multiple connected devices are aligned with Axis 1008 and it may represent to the user a list of possible devices with which to pair via Visual Indicator 1004. In a certain implementation, user may choose which of the devices to pair within a predetermined period.

In another implementation, once UE 165 determines it is aiming at EM Source 1006, it may send a request to Connected TV 1010 via Link 1001 for pairing. Connected TV 1010 may represent via a Visual Indicator 1005 a code that user of UE 165 may have to punch in to enable the pairing. This can be used to avoid connected objects to be inadvertently or maliciously paired with user equipment that should not be paired, for example from an adjacent room of a Hotel. In certain implementations, once a pairing has occurred, for example with UE 165, EM Source 1006 may cease to transmit so that other UEs, e.g. UE 160, cannot pair with the same connected object until UE 165 un-pairs from Connected TV 1010 and EM Source 1006 resumes its transmission. In other implementations, a connected object can be paired with multiple UEs.

The un-pairing may occur according to many algorithms. In one implementation, a device can remain paired only for a predetermined period, and then a pairing must occur again by aligning the device with the EM source so that the system of antennas in the device complies with a predetermined combination of threshold RSSI for the system. In another implementation, a manual un-pairing via UE 165 may provoke such un-pairing.

In another implementation, the un-pairing may occur because another device takes over the control of the connected object. This may occur because, e.g., UE 160 has a higher status as compared to UE 165. Hierarchies of users and equipment can be created so that "Ubi Major Minor Cessat" (where there is the major, the minor becomes negligible) and the lower status apparatus will un-pair when a higher status apparatus asks for its paring to the same connected object. In certain implementations, the un-pairing may occur via the same procedure with which the pairing has occurred, namely the alignment of the device to the EM source for a predetermined period.

In certain implementations, when a device is paired, there is no need for alignment of the device to the EM source by the user to receive information or to control the connected objects. In other implementations, the alignment can be a prerequisite for sending commands and/or receiving information from the connected object.

In certain implementations, the first time a UE is paired to a connected object such as Connected TV 1010 or Connected Refrigerator 1018, software can be downloaded to UE 160 or UE 165 so that, for example, the interaction with these connected objects is sped up in the future having UE already downloaded drivers or interaction menus. Said software may stay on said user equipment permanently or only for a predetermined period unless a new pairing or a new interaction with the connected object does not prolong said permanence of said software on UE. In other implementations, interaction needed software may already be present in said user equipment so that after the pairing there is no need for downloading additional software or data specific to said connected object.

Connected Refrigerator 1018, is also an example of a connected object that can be paired, at least temporarily with UE 165, 160 or 155 and may allow users of said equipment to receive information or control said connected objects.

In certain implementations, the pairing and un-pairing can be instantaneous so that, e.g., by orienting UE 160 toward either Connected TV 1010 on Axis 1007 or by orienting UE 160 toward Connected Refrigerator 1018 on Axis 1011, different menus and information will appear that will concern either the connected TV or the connected refrigerator according to the orientation of UE. In certain implementations, devices will not be paired or un-paired according to orientation of UE but software running locally on UE 160, will represent the different controlling menus according to which connected object is aimed at without the need to send any information or request via Link 1002 to change the representation of the menu on UE 160 from TV to Refrigerator until there is an actual need to communicate with Server 100.

As a matter of illustration hereinafter follows an exemplary flow of data, instructions, and commands to allow the 1) pairing, 2) usage and 3) un-pairing of UE 160 with a connected appliance such as Connected Refrigerator 1018. The person skilled in the art will understand that some steps can be skipped, modified or added to augment the usability, security and/or safety of the following embodiment.

User of UE 160 activates a software application to activate the algorithms for the EM direction-detection via antennas strategically positioned in said hardware.

User aims UE 160 toward EM Source 1009 on Axis 1011. If UE 160 determines that UE 160 is positioned for at least a predetermined period on axis 1011, UE 160 may send a request to Server 100 via Links 1002, 143, 144 and Core Network/Internet Cloud 130 to download software and/or data to be able to control/receive information concerning the connected object (Connected Refrigerator 1018). Once the software/data have been downloaded and Server 100 has given permissions to UE 160 receive information or to control Connected Refrigerator 1018, in this implementation, there is no need for UE 160 to keep aiming toward Axis 1011. UE 160 may now be able to control or receive information about the connected object unless certain conditions intervene, for example, another UE is requesting the control of the connected object. In certain implementations, the pairing can be multiple, i.e. multiple UEs could be able to control or receive information pertaining to the same connected object.

To cause the un-pairing, the user of UE 160 may aim again its device toward Axis 1011 and could be prompted to confirm the un-pairing via a visual prompt. In certain implementations, Connected Refrigerator 1018 may also un-pair from UE 160 if UE 160 pairs with another connected object. Server 100 may trigger the new pairing with the new connected object and the un-pairing from the old connected object.

In certain implementations, the same connected object can be paired to more than one device. For example, UE 160 and UE 165 can be paired to the same Connected TV 1010. Visual Indicator 1005, both on Connected TV 1010 and Connected Refrigerator 1018, can produce indications of what commands are produced and/or indicate the user who is responsible for those commands. As discussed, in the case of multiple pairings certain hierarchies and protocols can be followed so that higher-level users may have a higher influence over connected objects as compared to lower level users.

Many of the techniques applied to mediate the influence of users over connected objects are discussed in U.S. Pat. Nos. 8,489,119, 8,909,256, 9,148,484, 9,473,582 of the same inventor. They are incorporated by reference in their entirety. The person skilled in the art will understand that the same disclosures and patented concepts can be advantageously applied in some embodiments of the present invention.

A technique to associate a connected object to a user profile is described in US 2015-0199547 A1, so, for example, a smartphone or augmented reality glasses can be working according to preferences, settings, permissions, and hierarchies that are associated to an individual user who is wearing or holding said smartphone and/or eyewear according to one of the many embodiments that are described in the above-mentioned patent application.

The patent application is incorporated by reference in its entirety.

FIG. 10 describes two cases of house appliances. A connected Refrigerator and a connected TV. The emitting EM source that is associated with connected appliances or connected objects can be turned on or off manually or according to various algorithms and parameters. For example, a movement sensor may sense that a user is in the proximity of Connected TV 1010 and can activate EM Source 1006 and/or EM Source 1009 for at least a predetermined period. In other implementations, the EM source can be activated according to other parameters. For example, if EM Source is part of a Connected Car, said EM source may emit only if the car (connected object) is moving or is active (e.g., engine running) or according other parameters. The person skilled in the art will understand that many different scenarios are possible for different connected objects and purposes. For example, EM Source may start emitting only if receives information about surrounding devices having the capability to pair with them. For example, let us imagine that in a street there are contemporaneously connected taxi and UE 165. Server 100 may receive information concerning the position of said UE 165 and said connected taxi. One algorithm may determine that user of UE 165 is trying to pair with the connected taxi and EM source on connected taxi may start emitting. This can be determined via one or more of the following methods, alone or in combination with others.

UE 165 may signal via Link 1001 that a pairing (directional finding) application has been activated in the proximity of connected taxi.

UE 165 may signal that it is held steady by the user horizontally on a horizontal plane (signaling the user is aiming at something with his UE).

An inertial measurement unit and/or a gyroscope signal that UE 165 (or UE 155) is worn, handled or carried.

On the other hand, the direction-finding capability of a UE can also be activated locally according to local software that detects user activity in relation to said UE. For example a software in UE 165 may determine that the positioning of UE 165 is quasi-horizontal (as illustrated in FIG. 3) for at least a predetermined period, and/or that the touching/holding by user of said UE 165 corresponds to a predetermined algorithm by means, for example, of Touch Sensor 330.

The above-mentioned methods can activate the direction-finding capability of UE and/or an EM emission of a nearby EM Source.

An exemplary implementation with a connected car may consist in 1) a user aiming his UE toward said car (e.g. a taxi that is, e.g., within the visual range of said user), 2) receiving information about the rating of the driver, 3) requesting the services of the taxi so that the driver receives a position and/or a picture of the requesting user.

In a forward-looking scenario, when cars are capable of autonomous driving will be street legal, an implementation with a connected & autonomous car may consist in 1) a user aiming his UE toward said connected & autonomous car (e.g. within the visual range of said user), 2) initiating a request for services to said connected & autonomous car to approach via autonomous driving said user by communicating to said connected & autonomous car user's current position and user's desired destination.

The person skilled in the art will understand that many of the concepts described above can be implemented when the user equipment is eyewear such as UE 155 that is connected to Server 100 via Cloud 905. Cloud 905 is representative of networks of computing equipment and communication equipment that may enable the services and communications needed for those services herein described. For example, UE 155 can connect to a smartphone that can link UE 155 to Server 100.

Figure 11:
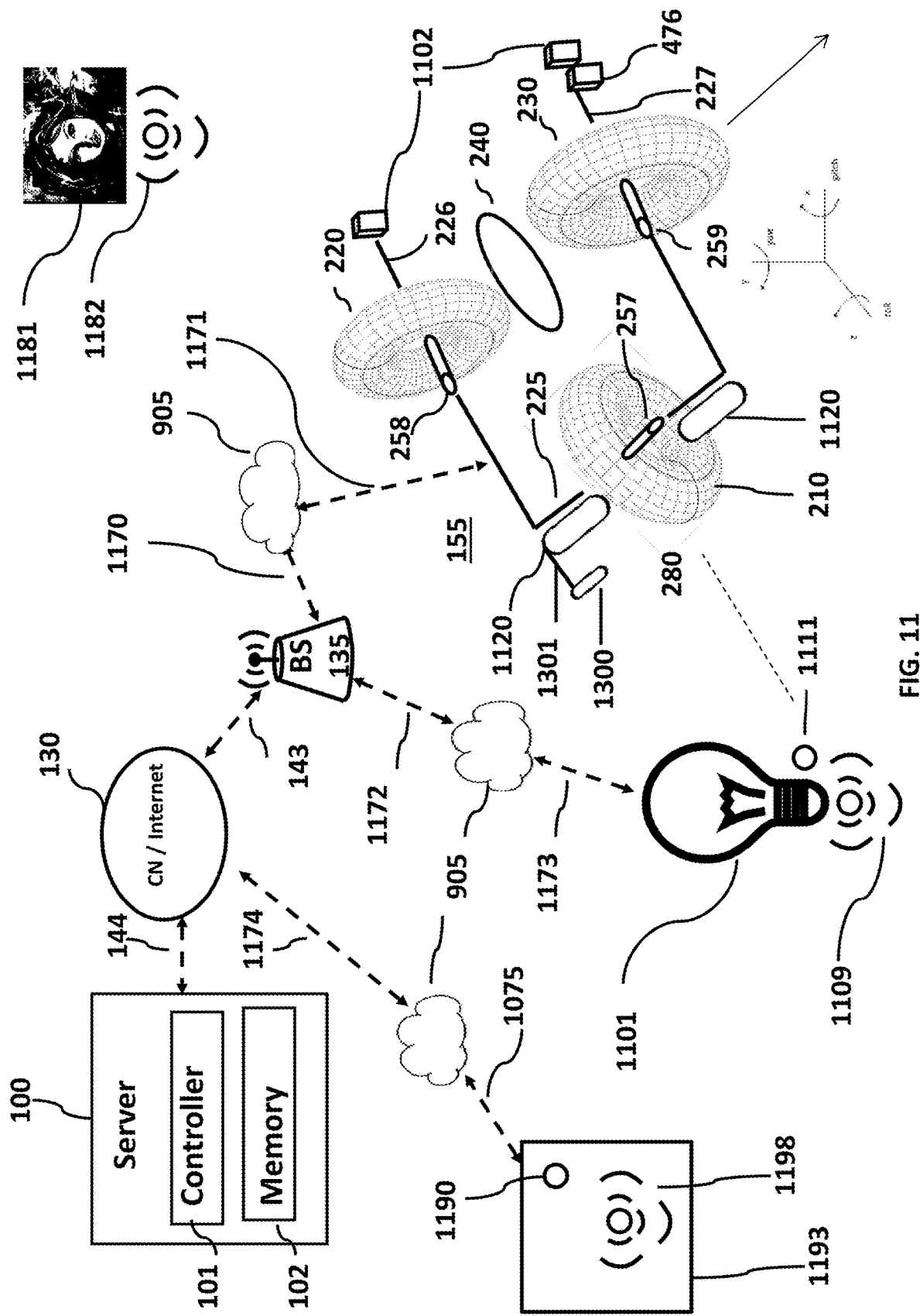
FIG. 11 describes various methods, systems, and apparatuses for implementing various embodiments of the present invention that are based on using a constellation of antennas to seamlessly inform and/or control and/or pair connected objects and/or user equipment when said user equipment is wearable equipment.

FIG. 11 represents one possible embodiment where UE 155 is eyewear and can be used, e.g., at least to control the switching "on and off" of a connected Light Bulb 1101 or to receive information and data related to an object. The person skilled in the art will understand that this basic example is representative of a universe of applications ranging from controlling settings of appliances, such as thermostats and TVs, to control blinds, open doors, operate elevators and much more. Many examples are possible and the very basic example of a light bulb is just a very basic illustrative example.

In this exemplary version of the AR glasses, Lenses 1120 are regular glass lenses and the glasses can be used both to control functionalities of connected objects and/or to receive information about connected objects and/or unconnected objects.

In certain implementations, a Mini Display 1300 can be added in the field of view of UE 155. Said Mini Display 1300 can be attached to Lever 1301 that is attached to a hinge of UE 155. Said hinge can be movable or fixed. If it is movable, in one implementation, said Mini Display 1300 can be raised and lowered into the field of view of UE 155. If it is movable, data connectors on Lever 1301 will be aligned with those on the hinge of UE 155 when Mini Display 1300 is in position and in the field of view of UE.

In some implementations, when a visual augmentation is available, UE 155 may provide an acoustic indication to the user to prompt said user to lower Mini Display 1300 into its field of view. Said acoustic indication can be enabled or disabled.

A first example is about an unconnected object.

Augmentation may also consist of audible data that are conveyed to user via Audio Modules 1102. In some implementations, audible data is information about people or objects to help, for example, users who are visually impaired. For example, some users may broadcast a Bluetooth signal with an ID that is associated to their name via their smartphone or an iBeacon wearable badge so that when a user who is wearing UE 155 is looking (aiming) at those users, he will be able to hear, via Audio Modules 1102, the name of said user or other information associated to said user via Link 1171, 1170 and so on up to Memory 102. In other implementations, an EM Source can be in connectivity mode and deliver the content to UE 155' user only when UE 155 is aligned to said EM Source, e.g. 1182. This can be accomplished by UE 155 signaling to Server 100 that it is aligned with EM source and Server 100 directing EM Source to deliver the content.

In certain implementations, UE 155 may store content received by UE 155 but it may deliver it to the user of UE 155 only when UE 155 is aligned with the EM source and/or fulfills some other conditions. A possible scenario is this. A user entering a room will start collecting IDs data of nearby iBeacons via his UE 155. Those IDs will be reported to Server 100 that will send the content associated with those IDs already to UE 155. Only when user of UE 155 fulfills the directionality condition, UE 155 will deliver the content to user. This is a sort of pre-fetching from Server 100 to ensure a better user experience. In other implementations, the content can retrieved locally directly from emitting objects in connectivity mode.

An exemplary scenario can be provided with objects that can be recognized by a visually impaired person via the directional-based technology coupled with audio augmentation. In one implementation, the scenario is a museum and the glasses can be used to provide an explanatory audio file about Art 1181 to a visitor whenever he aims his wearable equipment UE 155 at EM Source 1182 in a museum. In this implementation, Art 1181 is an unconnected object. As discussed with reference for example to FIG. 6, the audio file that can be received at UE 155 about Art 1181 does not need to be the same for all users. For example, the audio file that is played by UE 155 can be in the language of the user according to a user profile that is stored in Memory 102.

Returning to the example of Light Bulb 1101, in one implementation, said audible data that is received via Link 1170 and 1171 can be instructions on how to operate the appliance that is in line of sight of a user wearing UE 155. In certain implementations, EM source that is associated with Light Bulb 1101 is placed nearby the appliance such as, for example, EM Source 1109. Visual Indicator 1111 may provide visual feedback and/or instructions to user when UE 155 is paired with Light Bulb 1101.

In other implementations, connected objects and EM sources are not placed in the same place. For example, Light Bulb 1101 can be controlled and operated when user aims with his user equipment at Control Panel 1193 that is hosting EM Source 1198 and Visual Indicator 1190. In this case, user of UE 155 may not aim at the appliance but to Control Panel 1193 and it may receive visual feedback or instructions on how to operate the appliance via Visual Indicator 1190 or, as discussed, via acoustic feedback delivered via Link 1171.

As a basic example of the technology, here follows one of the many possible logical flows on how to dim and/or turn on and off Light Bulb 1101.

User aims UE 155 toward EM Source 1109 for a predetermined period. A system of antennas with asymmetric radiation patterns receives EM energy from EM Source 1109. If said system of antennas receives RSSI values from said source that are below and/above predetermined thresholds it may proceed to the next steps.

UE 155 via Links 1171, 1170, 143, 144 communicates to Server 100 that it is requesting control of Light Bulb 1101 by communicating the ID received by EM Source 1109. If allowed by permissions and hierarchical rules an algorithm will allow the pairing of UE 155 with Light Bulb 1101. This pairing can be communicated to user via Visual Indicator 1111 by means of Links 144, 143, 1172, 1173 so that, for example, a light may turn from red to green for at least a predetermined period when the pairing is active.

In certain implementations, to control Light Bulb 1101 software running on UE 155 must at least initially determine that UE is aimed at EM Source 1109. If said software determines that said condition of initial alignment is satisfied it may translate up-down and left-right movements of the head into commands that are sent to Server 100 first and in the end to Light Bulb 1101 through Links 1171, 1170, 143, 144, 1172, 1173.

As an example, an Up movement of the head (i.e. UE goes from alignment with EM Source to UP position) that is recorded by Compass/Gyroscope 476 may correspond to a command to Light Bulb 1101 to turn on. Vice versa, a down movement from alignment to Down position may correspond to a command to Light Bulb 1101 to turn off. The dimming of the light may correspond to movements to the left or to the right of UE 155. The person skilled in the art and certainly a UX-UI expert will understand that the possibilities are numerous. For example, visual Indicator 1111, e.g., a monitor can display submenus so that the movements of UE 155 will allow the navigation into complex menus. Voice commands can be integrated into UE 155 so that, e.g., when a voice command is coupled with the alignment of UE 155 to an EM Source linked to a connected device said connected device would obey to the voice commands of the user. Voice commands may also work after the pairing between connected objects and UE without the need for alignment. Visual Indicator 1111 may indicate the user that is paired.

In one implementation, the user may aim at Light Bulb 1101 for a predetermined period, user may receive a green visual indication that light bulb is ready to receive a command, the available commands can be visualized via Visual Indicator 1111 and user can speak one of said available commands. Said command may travel from UE 155 to Server 100, converted from a voice command into an actuator command and travel again from Server 100 to Light Bulb 1101 so that for example Light Bulb 1101 may turn off when user pronounces the word "off".

A more complex example is an elevator equipped with Control Panel 1193. Visual Indicator 1190 may provide visual feedback that UE 155 is paired (EM 155 is aligned or has been aligned to Source 1198) and that floors 1 through 10 are available as voice commands. User pronounces "ten" and said command will translate into a command for the elevator to move to the tenth floor. In certain implementations, Visual Indicator 1190 and/or Visual Indicator 1111 may be integrated or substituted with an audio indicator. The person skilled in the art will understand that visual feedback, options, menus, can be substituted and/or integrated with audio indicia to benefit people with vision disabilities.

As discussed, the possibilities for implementations are numerous and the examples are just explanatory samples. For example, Server 100 does not need to be remote or even exist. Connected objects, unconnected objects and/or system intelligence can be placed in the vicinity of each other, for example a plurality of modules inside an elevator.

Voice recognition, movement recognition, decisional algorithms, can occur and be distributed according to many different implementations. For example, the voice command can be translated into an actuation command in Server 100, UE 155, Control Panel 1703 or elsewhere. Software, profiles, permissions, restrictions, algorithms, processing functionalities and others can be distributed across the system from UE to Server 100 or concentrated in a few modules within the same hardware.

Permissions to operate or receive information about connected objects or unconnected objects (as in the case of Art 1181), modalities of operations of said connected/unconnected objects, hierarchies of operation, personalization of menus or commands or feedbacks can all derive from profiles associated to users. For example, not all connected objects can be available to all users. Modalities of interaction, permissions or information can be different for different users. One way to associate UE 155 with a user profile is described in Patent Application US 2015-0199547 A1 that is incorporated by reference herein.

Let us imagine for example that the user is now in the proximity of an unconnected object such as Art 1181. UE 155 has been paired with said user' profile. When UE 155 is aiming at EM Source 1182, UE 155 may send to Server 100 both an ID related to Art 1181 and an ID related to said user. A datagram contained in Memory 102 may associate settings, permissions, or preferences of said Art 1181. If one of the preferences in the profile is, for example, the German language, Server 100 will select a German audio file to be played via said Audio Modules 1102. In different implementations, for the audio file to be played, UE 155 may or may not need to maintain its aiming toward EM Source 1182 once the pairing has been established. Emitting objects might be part of groups so that, for example, once permissions and preferences have been established with one emitting object may be established with all of the emitting objects in the group, for example all the emitting objects associated with all the artworks in a museum. Also, as discussed before, once an authorization or pairing has been established with one of the emitting objects of the group a pre-fetching can occur so that UE 155 will download all or part of the content associated with other emitting objects in the group.

The same concept can be applied concerning session areas and events. UE 155 may pre-fetch content associated with users who are associated with a session area or to an event so that the delay between aiming UE 155 at an EM Source and outputting of the augmentation is minimized. In other implementations, the content can be pre-fetched by using position of users and/or emitting sources so that relevant is already stored on UE 155 before being eventually outputted. The same concept can be applied using IDs of surrounding emitting objects such as Bluetooth sources of nearby users. UE 155 may preload content associated with those sources for a smoother user experience. UE 155 may also provide indications to user on where to aim with his head or Smartphone to output that content once it has been downloaded, e.g., left, right, up, down indications.

In other implementations, in the elevator example, when the user aims at EM Source 1198 in Control Panel 1193, only permitted floors are presented as an option to the user who is paired to UE 155. In other implementations, the aiming to EM Source 1198 for at least a certain period may result in an automatic command, e.g., "close door".

Figure 12:
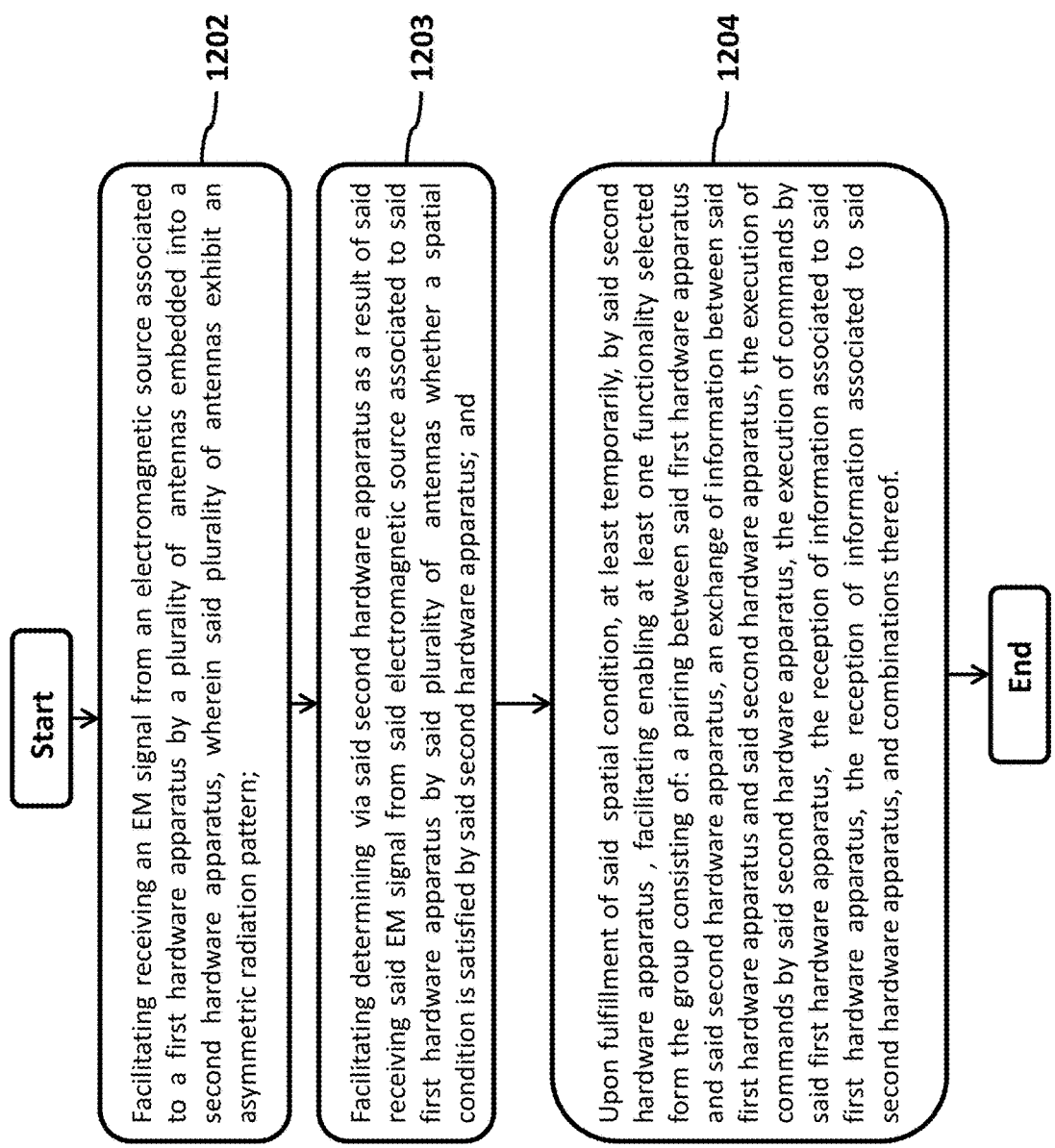
FIG. 12 describes at least a method for implementing several embodiments of the present invention that are based on the reception by a constellation of antennas of an EM signal associated with a connected object. Said method can be enabled by instructions stored on one or more memory modules.

FIG. 12 describes at least a method for implementing several embodiments of the present invention that are based on the reception by a constellation of antennas of an EM signal associated with a connected object. Said method can be enabled by instructions stored on one or more memory modules. Said memory modules may comprise instructions for—facilitating receiving an EM signal from an electromagnetic source associated to a first hardware apparatus by a plurality of antennas embedded into a second hardware apparatus, wherein said plurality of antennas exhibit an asymmetric radiation pattern, 1202;—facilitating determining via said second hardware apparatus as a result of said receiving said EM signal from said electromagnetic source associated to said first hardware apparatus by said plurality of antennas whether a spatial condition is satisfied by said second hardware apparatus, 1203; and—upon fulfillment of said spatial condition, at least temporarily, by said second hardware apparatus, facilitating enabling at least one functionality selected form the group consisting of: an exchange of information between said first hardware apparatus and said second hardware apparatus, the execution of commands by said second hardware apparatus, the execution of commands by said first hardware apparatus, the reception of information associated to said first hardware apparatus, the reception of information associated to said second hardware apparatus, a pairing between said first hardware apparatus and said second hardware apparatus, and combinations thereof, 1204.

Figure 13:
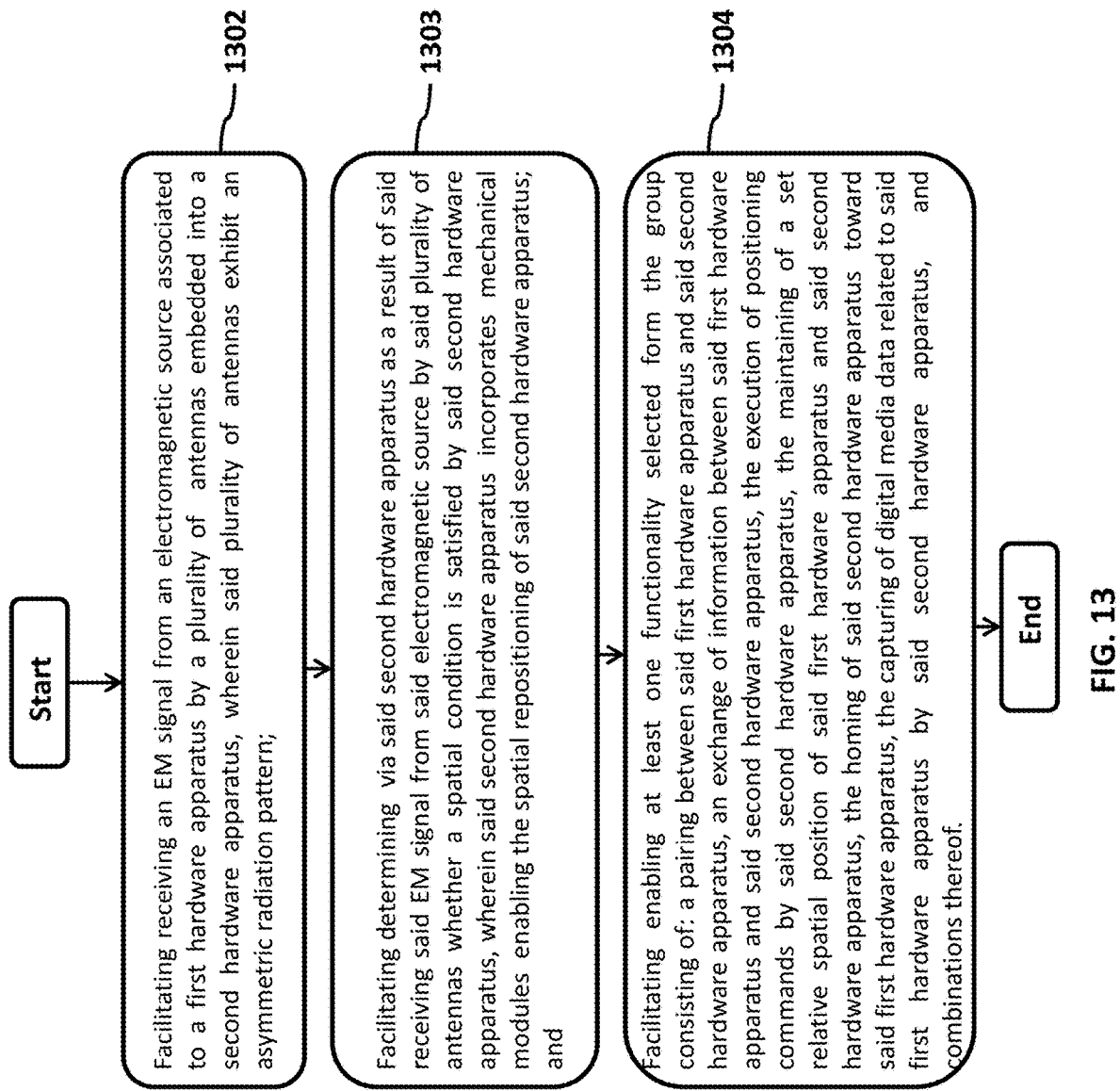
FIG. 13 describes at least a method for implementing several embodiments of the present invention to influence the relative position of two objects. Said method can be enabled by instructions stored on one or more memory modules.

FIG. 13 describes at least a method for implementing several embodiments of the present invention to influence the positioning of a movable object according to algorithms and commands. In certain implementations, the method can be used to maintain a fixed relative position between two objects. Said method can be enabled by instructions stored on one or more memory modules. Said memory modules may comprise instructions for—facilitating receiving an EM signal from an electromagnetic source associated to a first hardware apparatus by a plurality of antennas embedded into a second hardware apparatus, wherein said plurality of antennas exhibit an asymmetric radiation pattern, 1302;—facilitating determining via said second hardware apparatus as a result of said receiving said EM signal from said electromagnetic source by said plurality of antennas whether a spatial condition is satisfied by said second hardware apparatus, wherein said second hardware apparatus incorporates mechanical modules enabling the spatial repositioning of said second hardware apparatus, 1303; and—facilitating enabling at least one functionality selected form the group consisting of: a pairing between said first hardware apparatus and said second hardware apparatus, an exchange of information between said first hardware apparatus and said second hardware apparatus, the execution of positioning commands by said second hardware apparatus, the maintaining of a set relative spatial position of said first hardware apparatus and said second hardware apparatus, the homing of said second hardware apparatus toward said first hardware apparatus, the capturing of digital media data related to said first hardware apparatus by said second hardware apparatus, and combinations thereof, 1304.

Figure 14:
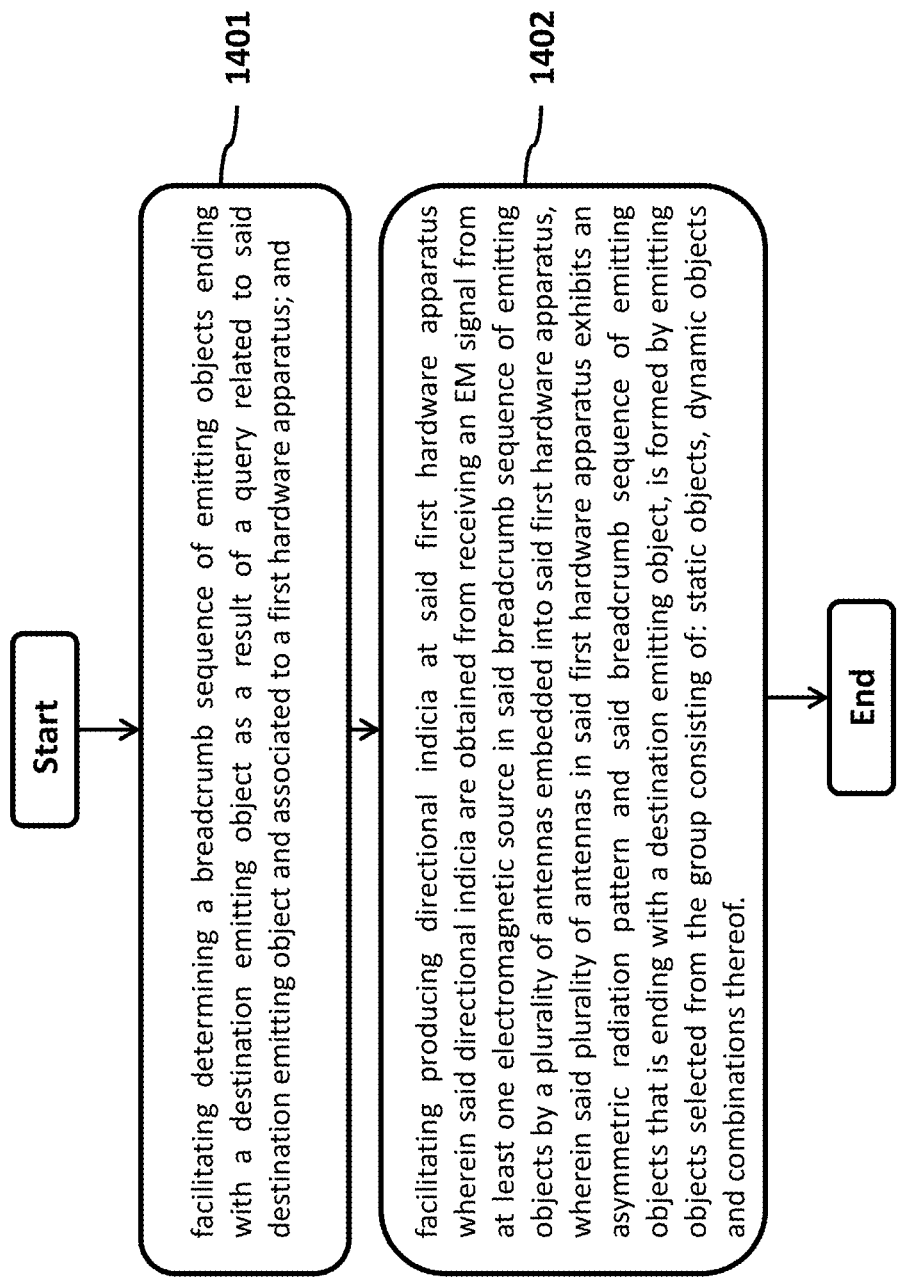
FIG. 14 describes at least a method for implementing several embodiments of the present invention to enable directional navigation. Said method can be enabled by instructions stored on one or more memory modules.

FIG. 14 describes at least a method for implementing several embodiments of the present invention to navigate from and to emitting objects using at least one directional finding technique. Said method can be enabled by instructions stored on one or more memory modules. Said memory modules may comprise instructions for:

facilitating determining a breadcrumb sequence of emitting objects ending with a destination emitting object as a result of a query related to said destination emitting object and associated to a first hardware apparatus, 1401; and—facilitating producing directional indicia at said first hardware apparatus wherein said directional indicia are obtained from receiving an EM signal from at least one electromagnetic source in said breadcrumb sequence of emitting objects by a plurality of antennas embedded into said first hardware apparatus, wherein said plurality of antennas in said first hardware apparatus exhibits an asymmetric radiation pattern and said breadcrumb sequence of emitting objects that is ending with a destination emitting object, is formed by emitting objects selected from the group consisting of static objects, dynamic objects and combinations thereof, 1401.

Figure 15:
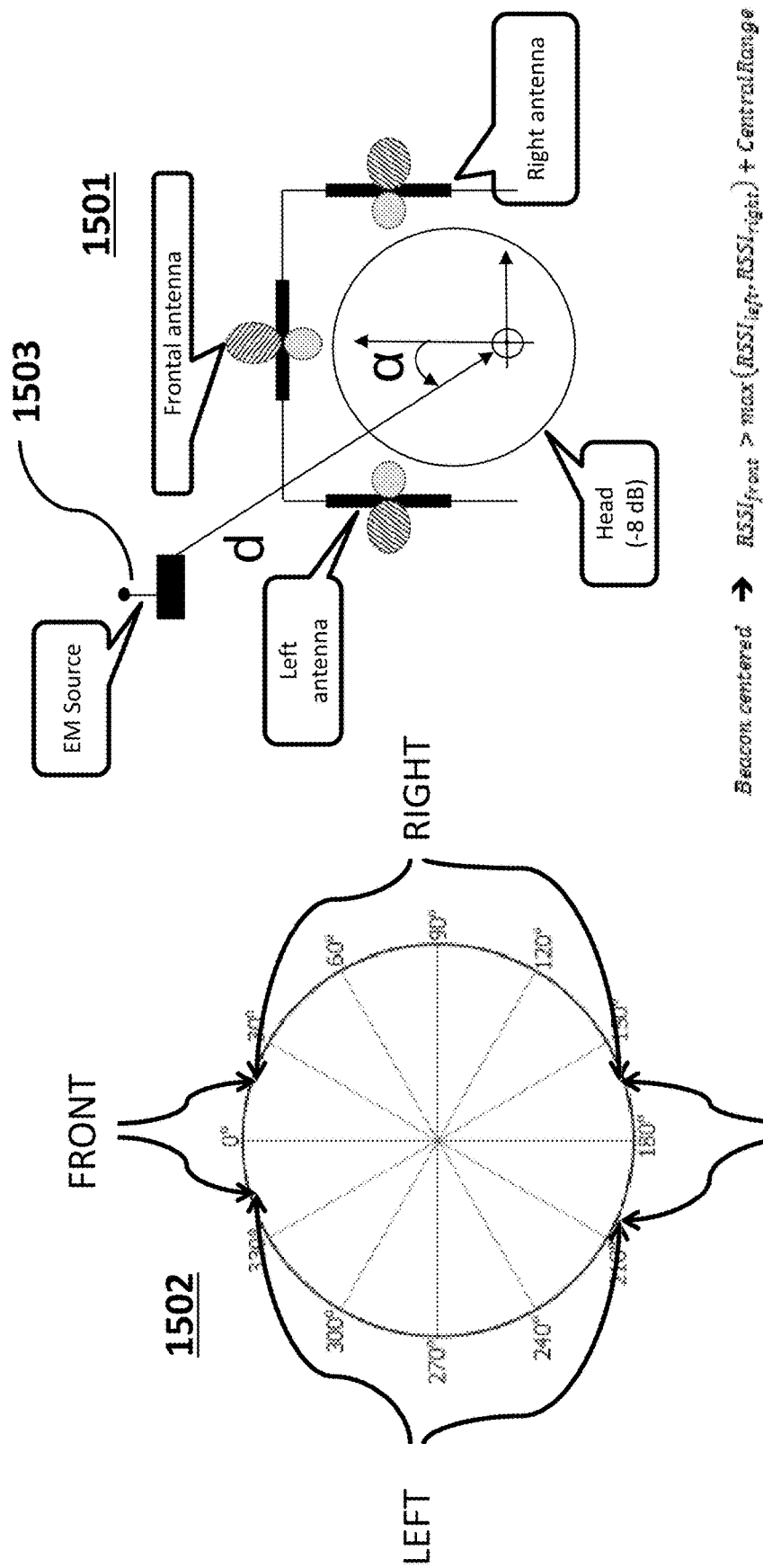
FIG. 15 describes a simplified model of three antenna glasses and a model graph defining exemplary sectors over a 360 degrees angle.

FIG. 15 represents a simplified depiction of the THREE ANTENNA GLASSES 1501. The simplified version of the glasses depiction represents the ideal case where the radiation pattern for the three antennas is identical and ideal and the head adsorbs 8 dBs.

This is a very ideal and simplified scenario. In real life, the hardware components such as processors, cables, and electronic components that must be included in the wearable distort and affect the ideal doughnut-shaped radiation patterns of model dipole antennas. Actual antennas do not typically exhibit perfectly shaped doughnut-shaped ideal radiation patterns. The person skilled in the art knows that many factors do influence the shape of the radiation patterns of antennas and the reception of EMITTING OBJECT 1503 by the three antennas is in practice very uneven over a 360 degrees horizontal plane. This is described with reference to FIG. 16 by actual measures of received RSSI at the three antennas over three BLE channels 37, 38, 39.

In one implementation, we can use an exemplary algorithm to detect when the glasses aim at EMITTING OBJECT 1503 that is positioned in the field of view of the glasses (FRONT) at an angle as described in GRAPH 1502. The field of view spans, e.g., approximately from 345 degrees to the left to 15 degrees to the right (FRONT or field of view). It can be wider or narrower.

In one implementation we can use this exemplary algorithm.

EMITTING OBJECT 1503 is in FRONT if
$RSSI_{front} > \max(RSSI_{left}, RSSI_{right}) + \text{CentralRange}$
where
$RSSI_{front}$ is the RSSI measured at the front antenna.
$RSSI_{left}$ is the RSSI measured at the left antenna.
$RSSI_{right}$ is the RSSI measured at the right antenna.
CentralRange is a constant value indicating a threshold.
$\max(RSSI_{left}, RSSI_{right})$ is the maximum value of RSSI detected at either left or right antenna.

CentralIndex is introduced to determine which beacon is the centered beacon in the presence of multiple emitting beacons.

CentralIndex is defined as $\text{CentralIndex} = RSSI_{front} - \max(RSSI_{left}, RSSI_{right})$ If CentralIndex is higher than the threshold value, CentralRange the described above outputs that the BLE beacon is in the FRONT sector.

CentralIndex is equivalent to and is sometimes referred to as FrontalIndex (f_index).

In general, the higher the value of CentralRange and the lower is the possibility of false positives (false detection of an emitting object that is not actually in the field of view/FRONT of the glasses). Generally, the higher the value of CentralRange and the narrower becomes the field of view angle/FRONT where an EMITTING OBJECT 1503 is detected in FRONT. GRAPH 1502 represents an arbitrary partition of the 360° angle that will be used later on to train a Support Vector Machine. Other partitions are certainly possible.

In the presence of multiple emitting objects, a comparison between absolute RSSI values can be performed to determine which one is the closest beacon, assuming that the beacons emit with the same strength.

In general, it is not enough to simply consider absolute RSSI values to determine the centeredness of a beacon. The environment plays a role in absorbing or amplifying the receiver Bluetooth signal, thus injecting several undesired variability effects into the absolute RSSI value. Specialized literature warns that comparing absolute RSSI values of different beacons is an inaccurate procedure and may lead to misleading results.

The aforementioned algorithm may consider absolute RSSI values only when multiple beacons have a similar FrontalIndex. In this case the comparison between the absolute $RSSI_{front}$ values will lead the visualizer (hardware dedicated to outputting the emitting objects when determined to be placed in a certain sector, such as FRONT) to show the closest emitting object. If more beacons are located in the field of view/FRONT but at different distances, the hardware will visualize the closest one.

Considering the absolute values of $RSSI_{front}$ is often not enough for determining which emitting object is the most centered (closest to 0°). On the contrary, by using the FrontalIndex much more accurate results can be obtained in terms of orientation. In our experiments setting Central-Range=10 generates good results in terms of detecting which beacon is the most centered beacon.

In some implementations such as e.g. breadcrumb navigation or interesting objects notifications, it is desirable to be able to determine not only if an emitting object is into the field of view (FRONT) but also in which sector of the GRAPH 1502 an EMITTING OBJECT 1503 can be allocated (FRONT, LEFT, RIGHT, BACK or/UNDEFINED). This can be done with artificial intelligence and machine learning techniques.

GRAPH 1502 represents an arbitrary partition of the 360° angle. The person skilled in the art will use graphs in FIG. 16 as a guide in establishing an appropriate partition of the 360° angle so that differences among the three different antennas can be exploited.

Figure 16:
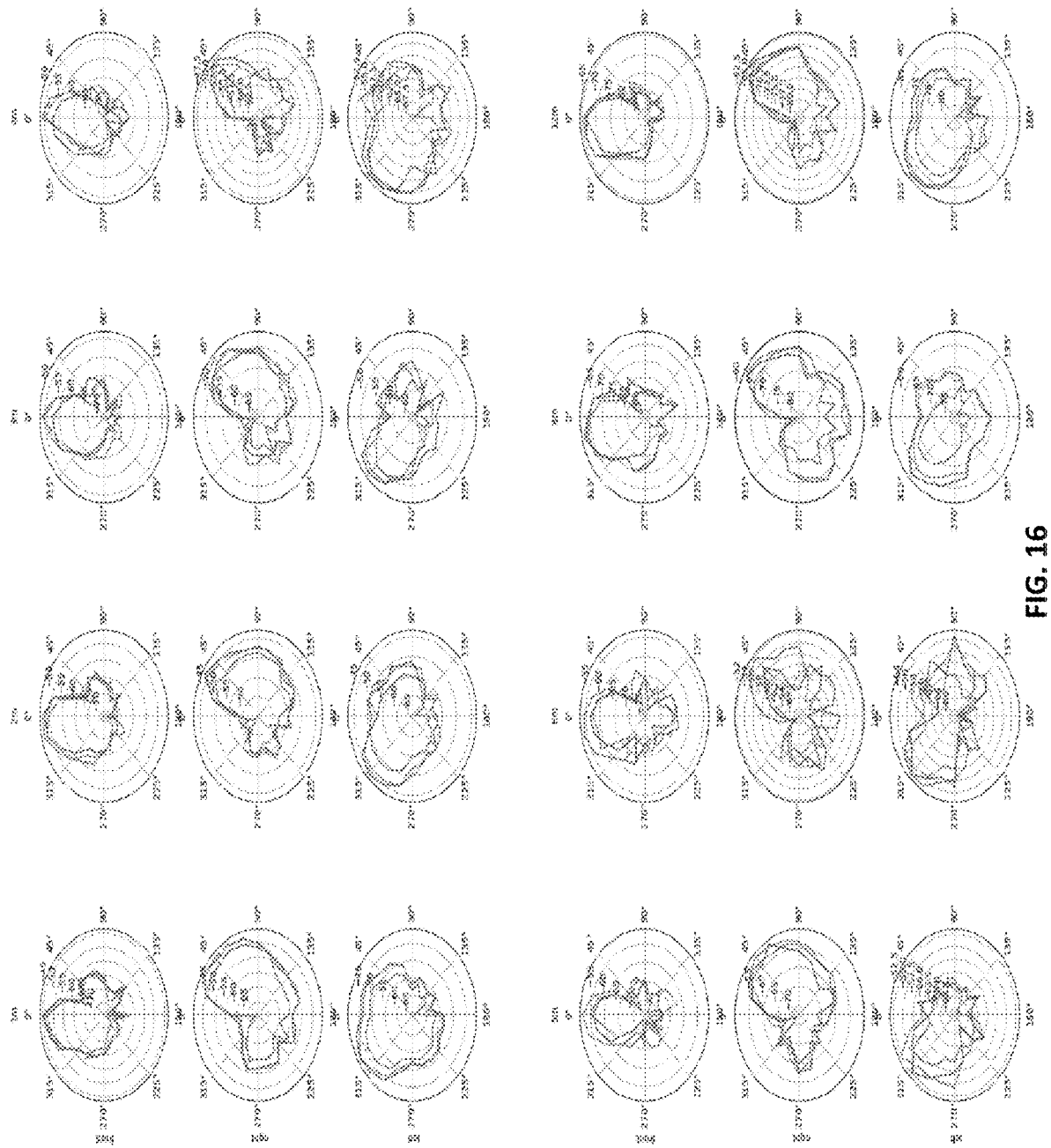
FIG. 16 describes real measurements for RSSI values detected at the three antennas over three channels.

FIG. 16 represents real measurements of RSSI for a real hardware apparatus of the kind THREE ANTENNA GLASSES 1501. These graphs are built by measuring the RSSI values at the three antennas (front, right, and left) at various distances (1, 2, 3, 4, 5, 6, 8, 12 meters) for BLE channels 37, 38, 39.

The observation of the graphs suggests that a machine learning algorithm based on Support Vector Machine and the Hidden Markov Model (Viterbi) can be employed to decide if an EMITTING OBJECT 1503 is located in either one of these exemplary sectors: Front: [345° to 15°], Left: [195° to 345°], Right: [15° 165°], Undefined: [anything else i.e. back or Undecided].

As discussed, sectors can be selected in different ways (different partitions of the 360° angle) and can be used to collect data to train a Support Vector Machine.

In one implementation, to build the matrices for the algorithm we can collect and buffer data over a 100 milliseconds window for each of the three antennas on the three BLE channels 37, 38, 39 by measuring the RSSI values received. If we have data for all three antennas on all three channels we can provide a sample for the decision algorithm. The sample is a 6-dimensional vector [l_index37, r_index37, l_index38, r_index38, l_index39, r_index39]. Where:
l_index37=frontRSSI37−leftRSSI37
r_index37=frontRSSI37−rightRSSI37
l_index38=frontRSSI38−leftRSSI38
r_index38=frontRSSI38−rightRSSI38
l_index39=frontRSSI38−leftRSSI38
r_index39=frontRSSI38−rightRSSI38 l_index37 stands for left index (a difference between RSSI values) for channel 37. The person skilled in the art can simply deduct the remaining acronyms.

Figure 17:
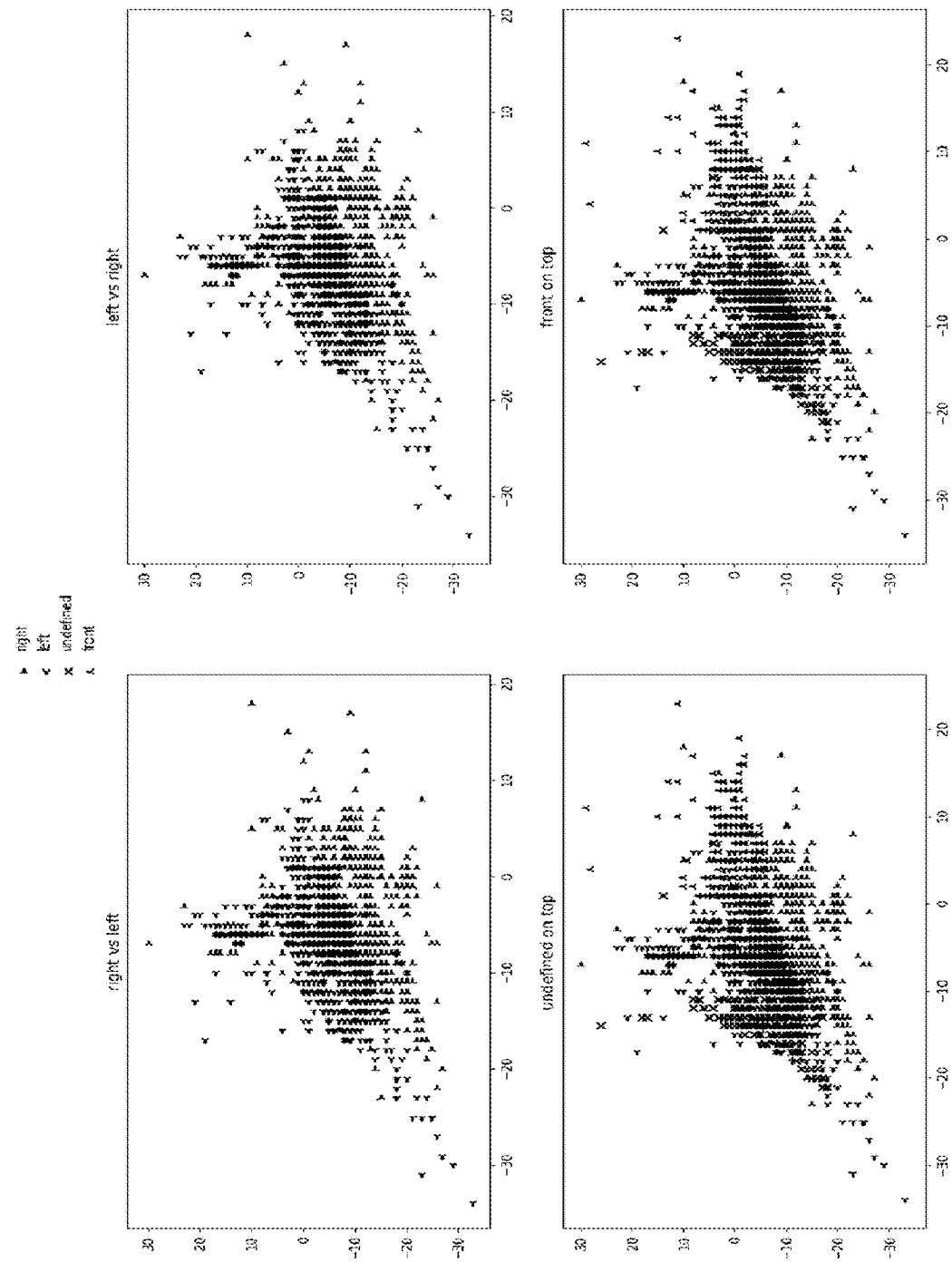
FIG. 17 describes the data collected on a bidimensional space for one channel.

FIG. 17 represents the data collected on a bidimensional space for one channel.

On X-axis we depict l_index while on Y-axis we depict r_index.

The decision algorithm can be determined using Support Vector Machine and Hidden Markov Model concepts.

We can establish four classes such as for example Front: [345° to 15°], Left: [195° to 345°], Right: [15° 165°], Undefined: [anything else]. 0° represents the EMITTING OBJECT 1503 when it is perfectly in front and in the middle of the field of view.

We can construct four matrixes W having dimensions 1×6 (six values that can be calculated by means of a Support Vector Machine and have been trained by the data collected and associated with the four sectors: Front, Left, Right, Undefined/Back).

These four matrixes W are associated with the four classes: Front, Left, Right, Undefined. The training for the Support Vector Machine can be done by collecting data in very heterogeneous environments, outdoors, indoors et cetera.

We can multiply said four matrixes W (once they have been determined) by the instantaneous inputs (a six-dimensional vector X) that are obtained by the data collected by the antennas.

In one implementation, the algorithm is: WX+C=c, where C is the margin of error and c is the decision whether the input fits one of the four classes we are monitoring.

A visualizer may provide an output ONLY when we determine a state other than class Undefined.

To avoid false positives (the erroneous allocation of a radiating object to any of classes Front, Left or Right) we can allocate weights to classes. For example: Front—0.2, Left—0.2, Right—0.2, Undefined—0.4.

These weights may represent the error margin so that the Undefined class will be predominant within the subdivision of the hyperspace among classes.

To improve the performance we can also employ a Kernel such as an rbf or a poly. The kernel is a mathematical function that adds spaces to a vector to better distinguish the points. It is used when the classes are not linearly separable.

rbf: $\exp(y\|x-x'\|2)$ where y is specified

Poly: $(y<xx'>)d$ where d is the degree of the polynomial.

Other model parameters, such as "Penalty Parameter" or "Decision Function Shape" can be decided.

The Penalty Parameter is a margin of error, namely the space contiguous to the hyperspace boundary for which the values are not considered.

The Decision Function shape represents the way in which the hyperspace boundaries are decided. There are generally two ways: ovo(one vs one), e ovr (one vs rest).

The predictions of the Support Vector Machine in a window of two seconds can be used as observations for the Hidden Markov Model (HMM).

The states of HMM are F(front), R(right), L(left), U(undefined).

Figure 18:
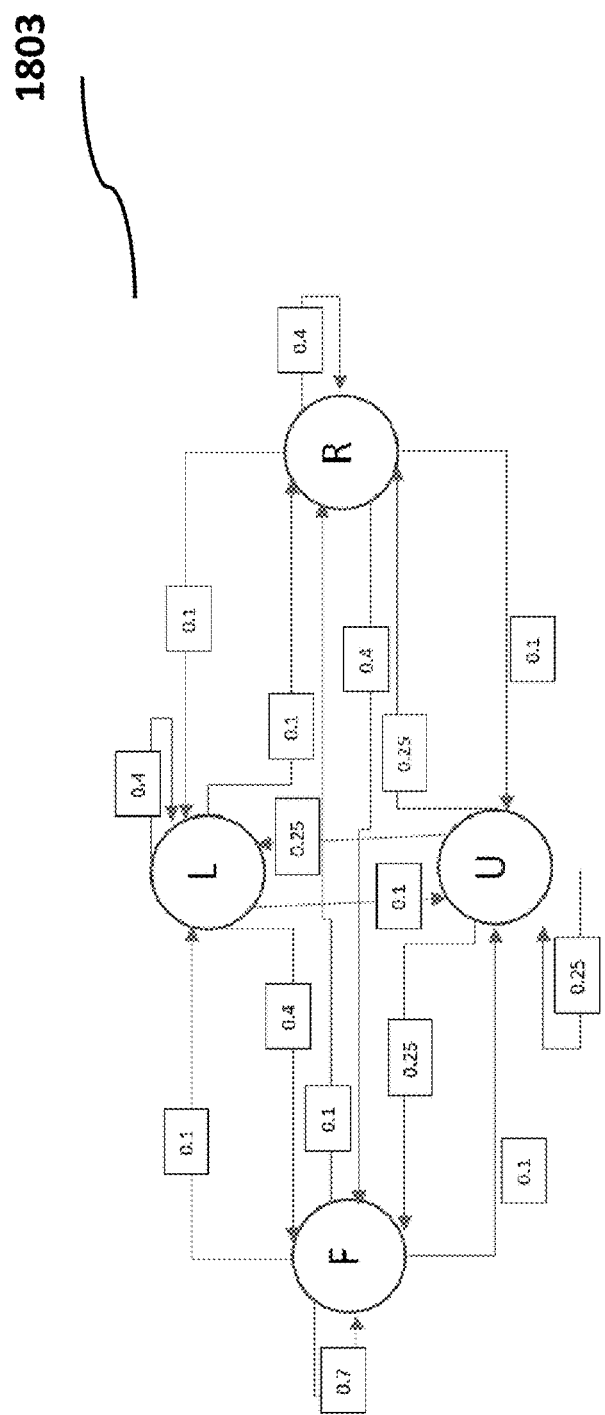
FIG. 18 represents some exemplary Hidden Markov Model parameters.

FIG. 18 represents some exemplary Hidden Markov Model parameters.

X (observable states)=[f l r u]

Z (hidden states)=[F L R U]

Π (start probability vector)=[0.1, 0.1, 0.1, 0.7]

A (Transition Probability Matrix) 1802

$\Theta_t$ (Probability of an Observable Matrix) 1801

Transition Probability Matrix Design 1803 represents the probability of switching from one state to another within [F(front), R(right), L(left), U(undefined)].

Figure 19:
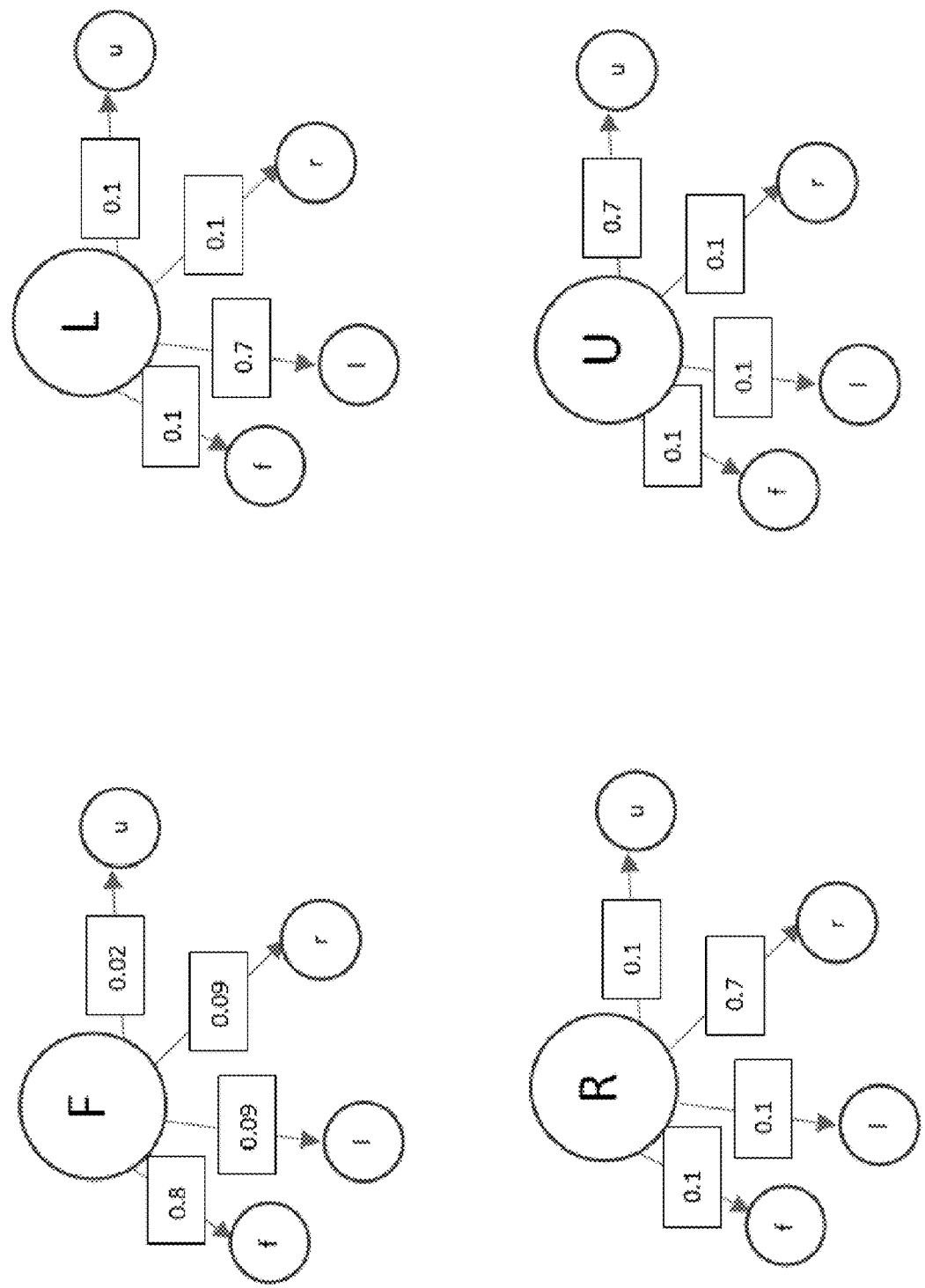
FIG. 19 represents four schemes for the observed probability.

FIG. 19 represents four schemes for the observed probability.

These four schemes summarize the $\Theta_t$ (Probability of an Observable Matrix) 1801. In probability and statistics, a realization, observation, or observed value, of a random variable, is the value that is actually observed (what has actually happened).

Using the Viterbi algorithm we can determine the chain of states over a two seconds window. The last state detected after a two seconds window has elapsed can be used as the output for the algorithm that will be one of these states: [F(front), R(right), L(left), U(undefined)]. F(front), R(right), L(left) indications can be provided to the user indicating that the radiating object is most likely in one of these sectors.

U(undefined) comprises the back sector and can be defined as anything else that does not belong to the F(front), R(right) or L(left) classes. In one implementation it can be ignored by the user since it will not produce any output.

In certain implementations or situations, the user may want to force the algorithm to produce an output. For example, a user might intentionally and knowingly be aiming the wearable glasses toward a radiating source that he knows or suspects being part of the system. The radiating source could be, e.g., a person having a cellular phone with Bluetooth in active mode. In optimal conditions, such as e.g., absence of multipath, the algorithm could and should automatically output content associated with that cell phone or cause the glasses to pair with an IoT or radiating object (such as a Bluetooth lamp) that is positioned at 0°. Because of thresholds the outputting might not occur in order to prevent false positives.

However, the user can force the system to perform a best-effort routine and force the providing of content associated with a radiating object or the pairing with a radiating object. One way to force the algorithm to provide a best-effort output is to provide an input command such as for example, a voice command ("pair") or to press a button on the wearable when the radiating object is positioned at 0°.

In one implementation of the best effort routine, the command may trigger the system ranking a whitelist of f_index(es) (front indexes) received by the wearable. The higher ranking f_index of a radiating object can be associated with the object positioned at 0°. The association may, in certain implementations, last until the wearable's accelerometer or gyroscope detects that the head has moved away from the position in which the command was given.

Embodiments of the present invention can be implemented in software, hardware, application logic or a combination of software, hardware and application logic. The software, application logic and/or hardware may reside on mobile computer equipment, fixed equipment or servers that may not always be owned or operated by a single entity. If desired, part of the software, application logic and/or hardware may reside on multiple servers and equipment in charge of different processes.

In this patent application, some social networks have been mentioned. The person skilled in the art will understand that these are just a few of the many possible examples. For example, a service provider who is running a service that is implementing at least some of the functionalities described in this application may provide the users with the possibility of creating user profiles within the service.

For example, certain augmentations or functionalities may work only when a user is logged in with a social account such as Match.com (for dating purposes) or LinkedIn (for professional purposes), or Facebook (for social purposes). A service provider may also provide users with the tools and interface for importing the profiles that said users have formerly created in well-established social networks such as LinkedIn, Facebook, Match and many others, once users' authorizations have been obtained.

The person skilled in the art will understand that the same hardware can be reused to perform very different functionalities in different circumstances when, e.g., software in Memory 102 associates different codes that are wirelessly received by UE 155 with those different functionalities as explained, at least in part, with reference with FIG. 6. For example, UE 155 can be used to produce augmentation indicia when it receives a predetermined code from an emitting object that is associated with augmentation. UE 155 can be used to control a connected object when it receives a predetermined code that is associated with controlling a connected object. Once a pairing has been established the connected object can be controlled via a sequence of logical steps and sub-menus that can be navigated by UE 155. UE 155 can be used to produce navigation indicia when it receives a predetermined code from an emitting object that is associated with navigation. The same can be said for a handheld device such as UE 165. The same hardware can produce very different functionalities because of very different software routines running on Server 100 or, at least in part, locally on the user equipment in some implementations.

The person skilled in the art will understand that the "pairing" of two objects means the coupling of said objects. Said coupling can be recorded in a location memory in a server and/or in a location memory in either one or both of those two objects.

In an example embodiment, the application logic, software or an instruction set is maintained on any one of various conventional computer-readable media. In the context of this application, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or can be combined. As technology advances, new equipment and techniques can be viable substitutes for the equipment and techniques that have been described in this application.

The term "plurality" in this patent application shall mean one or more.

Although various aspects of the invention are set out in the independent claims, other aspects of the invention comprise other combinations of features from the described embodiments and/or the dependent claims with the features of the independent claims, and not solely the combinations explicitly set out in the claims. The above-described exemplary embodiments of the invention should not be viewed as limiting but merely as explanatory. There are several variations and modifications, which may be made without departing from the scope of the present invention as defined in the appended claims.

What is claimed is:

1. A method comprising:
    enabling the reception of an electromagnetic signal from an electromagnetic source associated to a first hardware apparatus by a plurality of antennas embedded into a second hardware apparatus, wherein said plurality of antennas exhibit, at least in part, an asymmetric radiation pattern;
    enabling determining, at least in part by exploiting said asymmetric radiation pattern, via said second hardware apparatus as a result of said reception of said electromagnetic signal from said electromagnetic source associated to said first hardware apparatus by said plurality of antennas whether a spatial condition is satisfied by said second hardware apparatus; and
    enabling, upon fulfillment of said spatial condition, at least temporarily, by said second hardware apparatus, at least one functionality selected form the group consisting of:
    an exchange of information between said first hardware apparatus and said second hardware apparatus, the execution of commands by said second hardware apparatus, the execution of commands by said first hardware apparatus, the reception of information associated to said first hardware apparatus, the reception of information associated to said second hardware apparatus, a pairing between said first hardware apparatus and said second hardware apparatus, and combinations thereof.

2. The method of claim 1, wherein said at least one functionality is affected, at least in part, by a location datum.

3. The method of claim 1, wherein said first hardware apparatus is an audio/video (AV) apparatus.

4. The method of claim 1, wherein said determining whether said spatial condition is satisfied is obtained, at least in part, by comparing the data value of the signal strength of said electromagnetic signal as received at one antenna of said plurality of antennas with the maximum data value of the signal strength of said electromagnetic signal as received at least at one or more other antennas of said plurality of antennas such that when said maximum data value as received at said one or more other antennas is lower by at least a predetermined value as compared to said signal strength of said electromagnetic signal as received at said one antenna then said spatial condition is deemed satisfied.

5. The method of claim 1, wherein said first hardware apparatus outputs via a visual display content that is associated to a user profile connected to said second hardware apparatus.

6. The method of claim 1, wherein once said pairing has occurred, said second hardware apparatus controls functionalities associated to said first hardware apparatus via voice commands at said second hardware apparatus.

7. A computer software system having a set of instructions stored in one or more non-transitory computer-readable medium for controlling at least one digital computer in performing desired functions comprising:
    a set of instructions formed into each of a plurality of modules, each modules comprising:
    a process for enabling the reception of an electromagnetic signal from an electromagnetic source associated to a first hardware apparatus by a plurality of antennas embedded into a second hardware apparatus, wherein said plurality of antennas exhibit, at least in part, an asymmetric radiation pattern;
    a process for enabling determining, at least in part by exploiting said asymmetric radiation pattern, via said second hardware apparatus as a result of said reception of said electromagnetic signal from said electromagnetic source associated to said first hardware apparatus by said plurality of antennas whether a spatial condition is satisfied by said first hardware apparatus; and
    a process for enabling, upon fulfillment of said spatial condition, at least temporarily, by said first hardware apparatus, at least one functionality selected form the group consisting of:
    an exchange of information between said first hardware apparatus and said second hardware apparatus, the execution of commands by said second hardware apparatus, the execution of commands by said first hardware apparatus, the reception of information associated to said first hardware apparatus, the reception of information associated to said second hardware apparatus, a pairing between said first hardware apparatus and said second hardware apparatus, and combinations thereof.

8. The computer software system of claim 7, wherein said determining whether said spatial condition is satisfied is accomplished, at least in part, by means of data provided by at least one module selected from a group of modules comprising a gyroscope module, an accelerometer module, a compass module, and combinations thereof.

9. The computer software system of claim 7, wherein said first hardware apparatus and said second hardware apparatus are associated to hierarchical statuses such that said at least one functionality is affected, at least in part, by said hierarchical statuses when said hierarchical statuses are compared to the hierarchical status of at least one another hardware apparatus emitting an additional electromagnetic signal that is received by at least said plurality of antennas.

10. The computer software system of claim 7, wherein at least two antennas of said plurality of antennas transmit discrete electromagnetic signals such that said first hardware apparatus is capable of determining whether said first hardware apparatus is the addressee of said discrete electromagnetic signals, at least in part, by comparing the data value of the signal strength of said discrete electromagnetic signals as received from said at least two antennas of said plurality of antennas.

11. The computer software system of claim 7, wherein said first hardware apparatus and said second hardware apparatus are components of a connected transportation system.

12. The computer software system of claim 7, wherein said pairing between said first hardware apparatus and said second hardware apparatus causes said second hardware-apparatus to download software such that the subsequent execution of said at least one functionality is expedited.

13. The computer software system of claim 7, wherein said second hardware apparatus receives indicia of nearby emitting electromagnetic sources and thus said second hardware apparatus prefetches data associated to said electromagnetic sources such that when said spatial condition is determined to be satisfied said at least one functionality is expedited.

14. An hardware apparatus, comprising:
   at least one processor; and at least one non-transitory computer-readable medium including a computer program code; the at least one non-transitory computer-readable medium and the computer program code configured to, with the at least one processor, cause the hardware apparatus to perform at least the following:
   enabling the reception of an electromagnetic signal from an electromagnetic source associated to a neighboring emitting hardware apparatus by a plurality of antennas embedded into said hardware apparatus, wherein said plurality of antennas exhibit, at least in part, an asymmetric radiation pattern;
   enabling determining, at least in part by exploiting said asymmetric radiation pattern, as a result of said reception of said electromagnetic signal from said electromagnetic source associated to said neighboring emitting hardware apparatus by said plurality of antennas whether a spatial condition is satisfied; and
   enabling, upon fulfillment of said spatial condition, at least one functionality selected form the group consisting of:
   an exchange of information between said neighboring emitting hardware apparatus and said hardware apparatus, the execution of commands by said hardware apparatus, the execution of commands by said neighboring emitting hardware apparatus, the reception of information associated to said neighboring emitting hardware apparatus, the reception of information associated to said hardware apparatus, a pairing between said hardware apparatus and said neighboring emitting hardware apparatus, and combinations thereof.

15. The hardware apparatus of claim 14, wherein an audio connection is established between said neighboring emitting hardware apparatus and said hardware apparatus.

16. The hardware apparatus of claim 14, wherein said determining whether a spatial condition is satisfied results, at least in part, in assigning said neighboring emitting hardware apparatus to one of a plurality of predetermined spatial sectors anchored to and surrounding said hardware apparatus.

17. The hardware apparatus of claim 14, wherein said hardware apparatus receives an input data from a user initiating a best effort routine to classify said neighboring emitting hardware apparatus into one of a plurality of predetermined spatial sectors anchored to and surrounding said hardware apparatus.

18. The hardware apparatus of claim 14, wherein said determining whether a spatial condition is satisfied is obtained, at least in part, by the training of a support vector machine.

19. The hardware apparatus of claim 14, wherein said electromagnetic signal from said electromagnetic source associated to said neighboring emitting hardware apparatus is a Bluetooth Low Energy signal.

20. The hardware apparatus of claim 14, wherein a Viterbi algorithm is employed to resolve a chain of states within a predetermined time window to determine whether said hardware apparatus should assign said neighboring emitting hardware apparatus to one of a plurality of predetermined spatial sectors anchored to and surrounding said hardware apparatus.

* * * * *